United States Patent [19]
Puri et al.

[11] Patent Number: 5,270,813
[45] Date of Patent: Dec. 14, 1993

[54] SPATIALLY SCALABLE VIDEO CODING FACILITATING THE DERIVATION OF VARIABLE-RESOLUTION IMAGES

[75] Inventors: Atul Puri, Riverdale, N.Y.; Andria H. Wong, Morristown, N.J.

[73] Assignee: AT&T Bell Laboratories, Murray Hill, N.J.

[21] Appl. No.: 908,132

[22] Filed: Jul. 2, 1992

[51] Int. Cl.[5] ...................... H04N 7/133; H04N 7/137
[52] U.S. Cl. ..................................... 358/136; 358/133
[58] Field of Search ........................ 358/133, 135, 136

[56] References Cited

U.S. PATENT DOCUMENTS 4,980,764  12/1990  Henot .................................. 358/133

OTHER PUBLICATIONS

International Standards Organization Committee Draft 11172-2, "Coding of Moving Pictures and Associated Audio for Digital Storage Media at up to about 1.5 Mbit/s," Nov. 1991.
"Video Coding Using the MPEG-1 Compression Standard," A. Puri, Proceedings of the Society for Information Display 92, May 1992, Boston.

Primary Examiner—Howard W. Britton
Attorney, Agent, or Firm—Robert P. Marley

[57] ABSTRACT

An adaptive technique for encoding and decoding which facilitates the transmission, reception, storage, or retrieval of a scalable video signal. The invention allows this scaling to be performed entirely in the spatial domain. In a specific embodiment of the invention this scaling is realized by adaptively encoding a video signal based upon a selection taken from among a multiplicity of predictions from previously decoded images, and a selection of compatible predictions obtained from up-sampling lower resolution decoded images of the current temporal reference. A technical advantage of the invention is that both the syntax and signal multiplexing structure of at least one encoded lower-resolution scale of video is compatible with the MPEG-1 standards.

72 Claims, 33 Drawing Sheets

FIG. 6B

| ANALYZER TYPE | REFERENCE | INPUT 1 | INPUT 2 | OUTPUT | BYPASS CONTROL |
|---|---|---|---|---|---|
| INTER/INTRA | ORIGINAL VIDEO INPUT SIGNAL | INTER PREDICTION | BLOCK AVERAGE | INTER/INTRA INDICATOR SIGNAL (INTER/INTRA) | DIS_INTER SIGNAL |
| DUAL/SINGLE FIELD MOTION COMPENSATED PREDICTION | ORIGINAL VIDEO INPUT SIGNAL | DUAL FIELD PREDICTION | SINGLE FIELD PREDICTION | DUAL/SINGLE FIELD MOTION COMPENSATION SIGNAL (DUAL/SINGLE_FIELD_MC) | DIS_DUAL SIGNAL |
| FIELD/FRAME MOTION COMPENSATED PREDICTION | ORIGINAL VIDEO INPUT SIGNAL | FIELD PREDICTION | FRAME PREDICTION | FIELD/FRAME MOTION COMPENSATION SIGNAL (FIELD/FRAME_MC) | DIS_FIELD_MC SIGNAL |
| SPATIAL/TEMPORAL PREDICTION | ORIGINAL VIDEO INPUT SIGNAL | SPATIAL PREDICTION | TEMPORAL PREDICTION | COMPATIBILITY SIGNAL (S_T_COMP) | DIS_SPATIAL SIGNAL |

SPATIALLY SCALABLE VIDEO CODING FACILITATING THE DERIVATION OF VARIABLE-RESOLUTION IMAGES

TECHNICAL FIELD

The invention relates to the encoding of video signals, and more particularly, encoding a video signal in a manner which permits images having a wide range of resolutions to be derived from a single encoded signal.

BACKGROUND OF THE INVENTION

Worldwide efforts are underway to improve the quality of video signal production, transmission, and reproduction because a great deal of commercial importance is being predicted for improved quality video systems. These efforts involve, at least in part, increasing the resolution with which images are converted into representative electrical signals by increasing the spatial and temporal sampling rates that are used to convert video images into electrical signals. This increase in resolution consequently means that more data about images must be produced, processed, and transmitted in a given interval.

Video images such as those images in the field of view of a television camera are scanned at a predetermined rate and converted into a series of electrical signals, each electrical signal representing a characteristic of a predetermined region of the image generally referred to as a picture element ("pel"), or pixel. A plurality of the pels taken together at a predetermined instant of time form what amounts to a still picture (i.e., a frame) representing the nature of the image at the predetermined instant of time. Increasing the quality of video signals produced in this manner involves, at least in part, the use of a larger number of smaller-size pels to represent a given image, and the production of a large number of images per unit of time.

As the number of pels for each video image and the rate at which images are produced increases, there is an increasing amount of video data which must be produced, transmitted, and received in a given interval. A number of data compression schemes have been proposed which attempt to transmit higher quality video images using the same numbers of bits and the same bit rates used for lower quality images. The Motion Picture Experts Group Phase 1 ("MPEG-1") standard provides a particular syntax and decoding process for one such scheme. This standard is set forth in International Standards Organization ("ISO") Committee Draft 11172-2, "Coding of Moving Pictures and Associated Audio for Digital Storage Media at up to about 1.5 Mbit/s", November 1991.

It may be desirable to obtain one or more lower resolution images from a single transmitted high-resolution video signal. For example, a video signal simultaneously transmitted to both high-definition television ("HDTV") and standard television receivers may have to provide images having a very high degree of resolution to the HDTV receivers, and images having a lesser degree of resolution to the standard receivers. Similarly, the degree of image resolution which need be obtained from a video signal displayed on a windowed computer screen must be varied with the size of a particular window in which it is displayed.

One known method of providing a video signal from which images of varying resolution may be derived is to simultaneously transmit a set of independent replicas of a video sequence; each replica being scaled for reproduction at a different level of resolution. This approach, referred to as "simulcasting", is simple, but requires an increased bandwidth to accommodate the transmission of multiple independent video images. A more bandwidth efficient alternative to simulcasting, is scalable video. Scalable video is a technique wherein a video signal is encoded and the resulting bit-sequence is partitioned so that a range of resolution levels may be derived from it depending upon the particular signal decoding scheme employed at a receiver.

Unfortunately, the encoding of scalable video is not provided for within the constraints of most video standards. A particular limitation of the MPEG-1 standard coding is its lack of provisions facilitating scalable video encoding.

SUMMARY OF THE INVENTION

The aforementioned problems are solved, in accordance with the principles of the invention, by employing a unique, adaptive video encoding and decoding technique which facilitates the transmission, reception, storage, or retrieval of a scalable video signal. The invention allows this scaling to be performed entirely in the spatial domain. In a specific embodiment of the invention this scaling is realized by adaptively encoding a video signal based upon a selection taken from among a multiplicity of predictions from previously decoded images, and a selection of compatible predictions obtained from up-sampling lower resolution decoded images of the current temporal reference.

A technical advantage of the invention is that both the syntax and signal multiplexing structure of at least one encoded lower-resolution scale of video is compatible with the MPEG-1 standards.

BRIEF DESCRIPTION OF THE DRAWING

In the drawing:

FIG. 6B is a table showing the reference, input, bypass control, and output signals for the analyzer of FIG. 6A;

DETAILED DESCRIPTION

Figure 1:
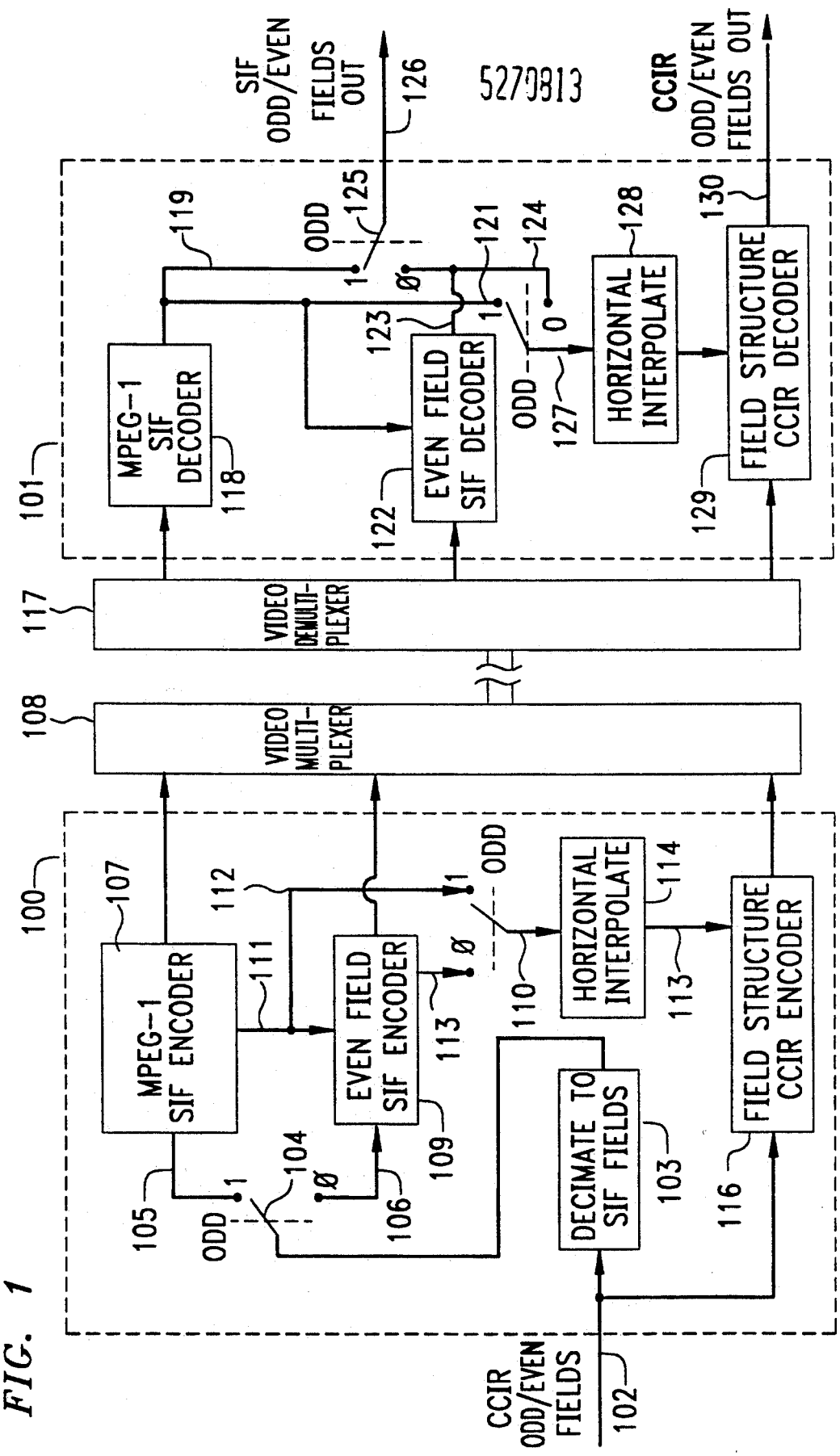
FIG. 1 shows, in simplified block diagram form, an illustration of a video signal encoding/decoding system which facilitates the field encoding and decoding of a three-layer spatially scalable digital video signal in accordance with one example of this invention.

FIG. 1 is a simplified block diagram showing an illustration of a video signal encoding/decoding system, in accordance with one example of this invention, which facilitates the field encoding and decoding of a digital video signal having three layers of spatial resolution. Signal encoding is performed within functional block 100, and signal decoding is performed within functional block 101. Layer 1 consists of MPEG-1 encoded SIF odd fields and produces an MPEG-1 compatible bitstream. Layer 2 consists of SIF even fields encoded using adaptive dual/single field motion compensated predictions. Layer 3 consists of CCIR-601 field-structured pictures which are encoded using an adaptive choice of temporal prediction from previous coded pictures, and a spatial prediction corresponding to a current temporal reference obtained by interpolating decoded layers 1 and 2. As in the encoding of layer 2, layer 3 is encoded using adaptive dual/single field motion compensated predictions (the spatially interpolated layer 1 and 2 images may be used as spatial prediction for CCIR-601 fields of corresponding parity).

As shown in FIG. 1, CCIR-601 digital video signals are input to functional block 100 via line 102. The digital video input signals are spatial and temporal samples of a video image and may be produced by scanning an image field and producing an electrical signal relating to the characteristics of the image field at predetermined points. The characteristics determined in the scanning operation are converted into electrical signals and digitized. The video input signals comprise a succession of digital words, each representing some information at a particular instant of time for a small region of the image field generally referred to as a pel. A complete set of digital representations for the image at a particular instant of time is called a frame. Each frame may be considered to be composed of two interlaced fields representing odd- and even-numbered horizontal lines in the image.

The digital video signal encoded and decoded by this invention may be a monochrome video signal or a color video signal. In the case of a monochrome video signal, each frame may comprise a set of digital representations of the brightness or intensity of a two-dimensional array of pels which make up a video image. In the case of a color video signal, each picture comprises not only a brightness component but also a color component. For example, in the CCIR-601 4:2:2 recommendation, a color video signal picture (i.e., a temporal sample of the image) may be composed of a luminance frame, Y, of 720 horizontal pels x 480 lines and two chrominance frames, Cb and Cr, at ½ resolution of 360 horizontal pels x 480 lines each. A sequence of such pictures may be transmitted at a rate of 29.97 pictures per second. The luminance or chrominance frame is formed as the interlaced union of the two constituent CCIR-601 fields, while CCIR-601 4:2:0 frames can be derived by filtering and sub-sampling the respective 4:2:2 CCIR-601 chrominance frames. 4:2:2 is a standard sampling structure for CCIR-601 video having a 4 to 2 to 2 sampling ratio of Y, Cb, and Cr, respectively. For the purpose of illustrating a specific example of the invention, the description below assumes that the digital video signal received via line 102 is a video signal in accordance with the CCIR-601 4:2:0 resolution. Those skilled in the art will appreciate that the principles of the invention are applicable to other types of video signals, such as HDTV video signals.

To assist in the description of the example of the invention shown in FIG. 1, some terminology should be defined. A typical block is an 8-horizontal-row by 8-vertical-column array of contiguous pels. Blocks may be groups of luminance data or groups of chrominance data. A typical macroblock is composed of four contiguous 8×8 luminance data blocks and the two 8×8 chrominance data blocks corresponding to the area of the image represented by the four luminance data blocks. A slice is one horizontal row of macroblocks starting at the left edge of the picture and ending at the right edge of the picture. A luminance frame is formed as an interlaced union of two CCIR-601 luminance fields. One field comprises even-numbered horizontal rows of pels and the other field comprises odd-numbered horizontal rows of pels.

In the example of the invention shown in FIG. 1, a plurality of picture types are encoded and decoded. Specifically, I-pictures, P-pictures, and B-pictures are encoded and decoded. I-pictures or intra-coded pictures are pictures which are encoded and decoded. I-pictures or intra-coded pictures are pictures which are encoded and decoded without reference to any other pictures (i.e., no temporal prediction is required). P-pictures, or predicted pictures are encoded in light of a previous pictures (namely in light of a temporal prediction from previously decoded I- or P- pictures). Motion compensation may be used to produce P-pictures. B-pictures, or bidirectionally predicted pictures are pictures which are encoded in light of characteristics of previously decoded I- or P-pictures and future decoded P-or I-pictures. As in the case of P-pictures, B-pictures may also be encoded by using motion compensation. In appropriate circumstances, P-pictures and B-pictures may have some of their blocks encoded in the same fashion that the blocks of the I-pictures are encoded, i.e., without reference to other pictures ("intra coding").

Figure 2A:
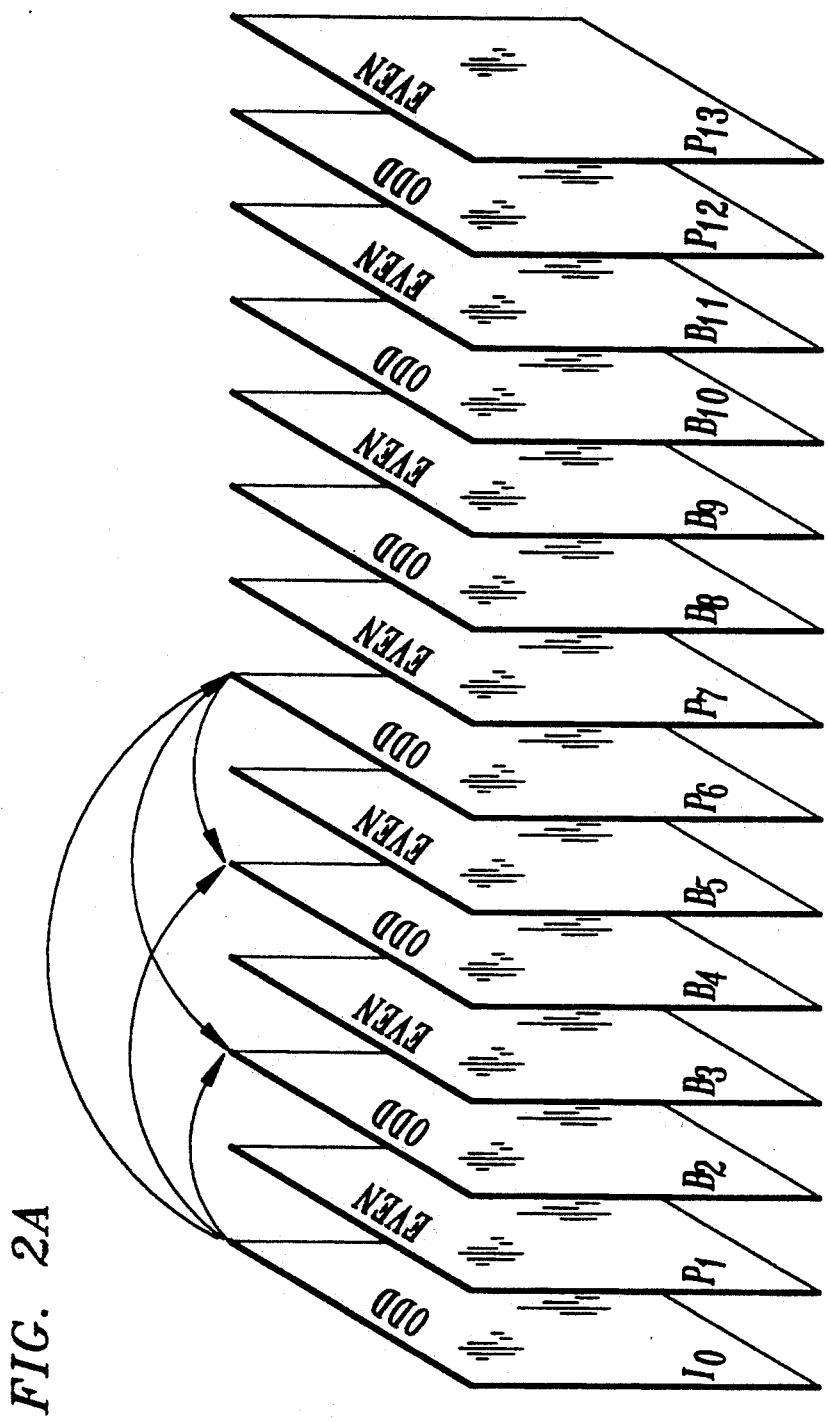
FIG. 2A is an illustration of a group-of-picture structure showing MPEG-1 type predictions which may be effected for odd field macroblocks.

A Group-of-Pictures (GOP) structure illustrating MPEG-1 type prediction options for macroblocks of odd fields only is shown in FIG. 2A. The even fields are drawn for completeness and are not used for prediction. An I-picture (I0) field does not require temporal prediction. P-picture fields require temporal prediction from the previously decoded I- or P- picture fields. In this example, P6 is predicted from I0. B-pictures are bidirectionally predicted from the previous I- or P-picture fields and the next P- or I- picture field. Both B2 and B4 are bidirectionally predicted from I0 and P6. In the coding/decoding systems to be described, MPEG-1 prediction is applied on the SIF odd field macroblocks to provide MPEG-1 compatibility.

Figure 2B:
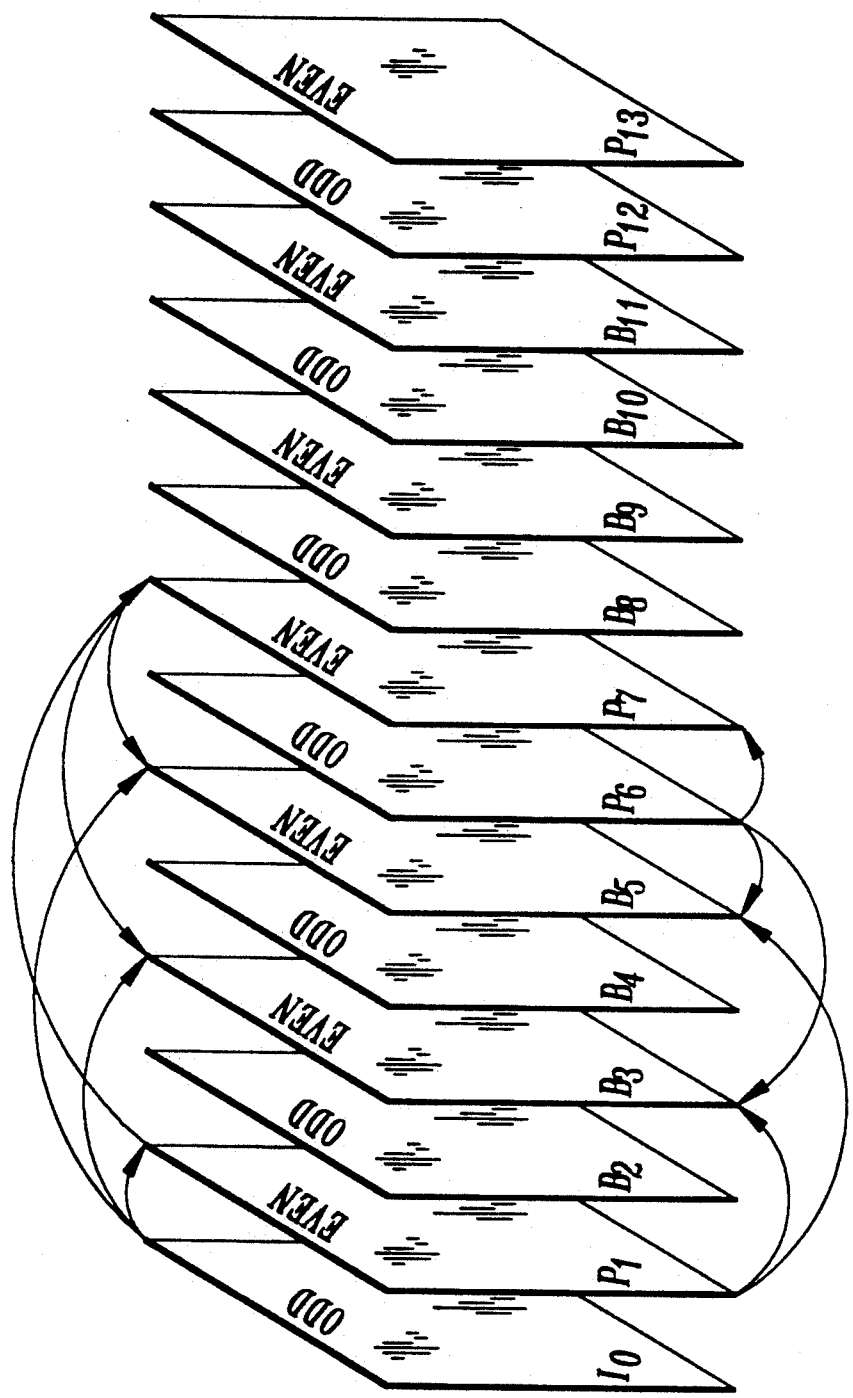
FIG. 2B in an illustration of a group-of-picture structure showing single-field predictions which may be effected even-field macroblocks in accordance with one example of this invention.

FIG. 2B shows a GOP structure of single field prediction options for macroblocks of even fields. P-picture macroblocks are predicted from either the immediate previously decoded odd field, or the immediate previously decoded even field, which belong to coded I- or P- picture fields (whichever gives a better prediction). In this example, macroblocks of P1 are predicted from I0 only, as I0 is the only field available for prediction. P7 is predicted from either P1 or P6 on a macroblock basis, whichever gives a better estimate. B-picture macroblocks are predicted bidirectionally from decoded I- or P- fields. In this example, macroblocks of B3 reference either I0 or P1 for forward prediction, and reference either P6 or P7 for backward prediction.

Figure 2C:
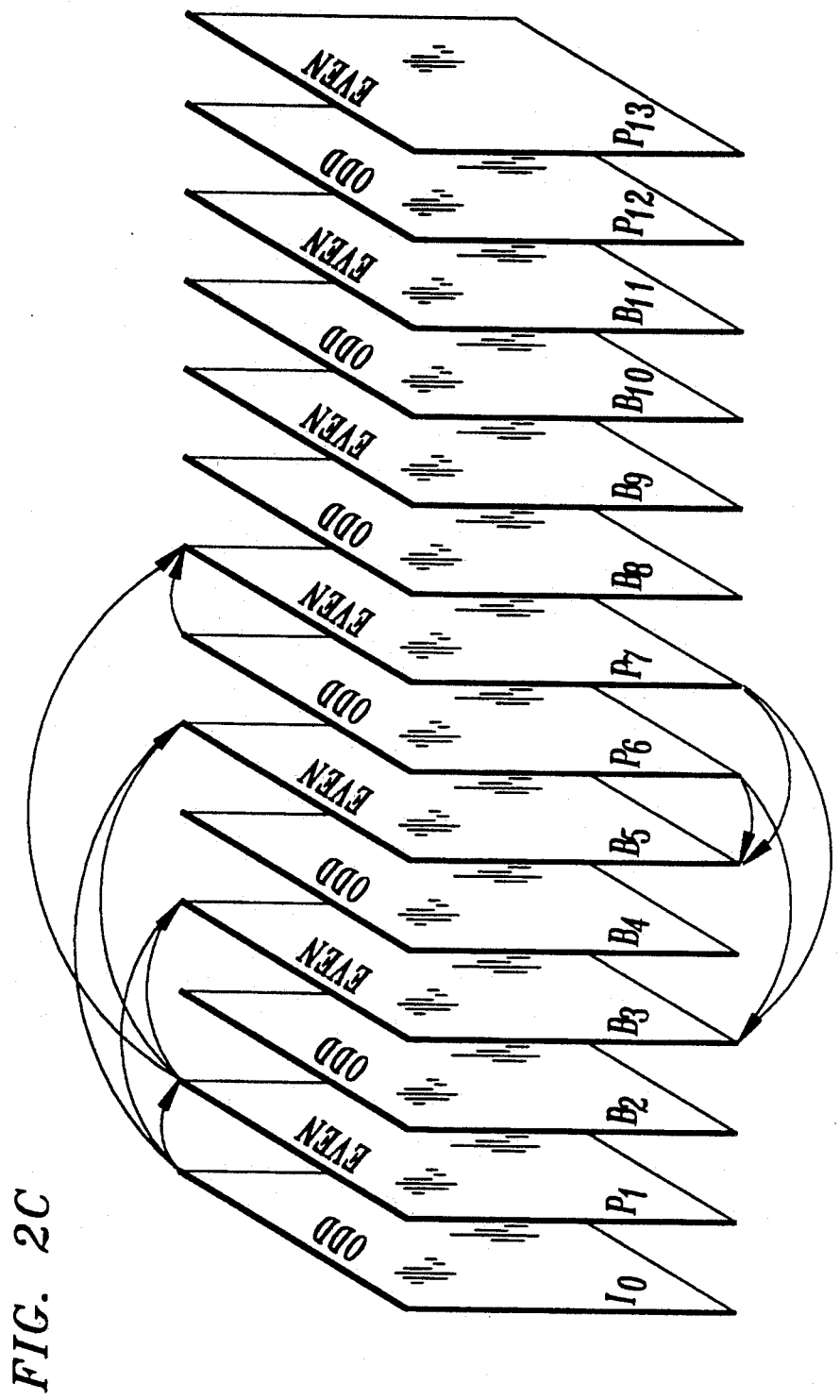
FIG. 2C in an illustration of a group-of-picture structure showing dual-field predictions which may be effected even-field macroblocks in accordance with one example of this invention.

The GOP structure of FIG. 2C shows dual field prediction options for macroblocks of even fields. P-picture macroblocks reference both the immediate previously decoded odd and even fields. The prediction used is the average of the predictions obtained from both of these referenced fields. In this example, P7 macroblocks reference both P1 and P6, and use the average of the predictions made from these referenced fields. B-picture macroblocks are predicted either in the forward direction or in the backward direction, but not both. They reference either the immediate previously decoded odd and even fields, or the immediate future decoded odd and even fields, which belong to coded I- or P- picture fields. Regardless of the direction, the prediction is the average of best prediction macroblocks of the two referenced fields.

As shown in FIG. 1, the digital video signal received on line 102 is decimated to SIF video by SIF decimator 103 for the encoding of layers 1 and 2. Such decimators are well-known in the art. The decimated video is output by decimator 103 to switch 104, which directs odd numbered horizontal rows (or slices) to line 105, and even numbered horizontal rows to line 106. The odd horizontal rows comprise an odd video field, the even horizontal rows comprise an even video field. The SIF odd fields are directed to MPEG-1 SIF encoder 107, where they are encoded and sent as a bitstream to video multiplexer 108 (this encoded bitstream corresponds to the first video layer). MPEG-1 SIF 107 encoder also outputs a decoded SIF odd signal to even field SIF encoder 109 and switch 110 via lines 111 and 112, respectively. Even field SIF encoder 109 encodes the SIF even fields into a bitstream (corresponding to the second video layer) which is output to video multiplexer 108. Even field SIF encoder 109 also outputs a decoded SIF even signal to switch 110 via line 113. Switch 110 allows either a decoded SIF odd field, or a decoded SIF even field to be input to horizontal interpolator 114 (a decoded SIF odd field is selected if an odd CCIR-601 field is being encoded, and a decoded SIF even field is selected if an even CCIR-601 field is being encoded). Horizontal interpolator 114 up-samples the odd and even fields received from encoders 107 and 109 to CCIR-601 resolution. This up-sampled signal is output via line 115 to field-structure CCIR-601 encoder 116, where it is used for obtaining a spatial prediction of the third video layer. Field-structure CCIR-601 encoder 114 encodes the CCIR-601 fields of the digital video signal received via line 102, with an adaptive selection between temporal and spatial picture predictions. The resulting encoded bitstream (corresponding to the third video layer) is output by field-structure CCIR-601 encoder 116 to video multiplexer 108.

Video multiplexer 108 multiplexes the encoded bitstreams into a single bitstream. This single bitstream is transmitted to video demultiplexer 117 where it is demultiplexed into individual bitstreams, one for each of the video layers. MPEG-1 SIF decoder 118 decodes the bitstream corresponding to the first video layer, thereby reconstituting an SIF odd field video signal which is output on lines 119, 120, and 121. Even field SIF decoder 122 decodes the bitstream corresponding to the second video layer (employing an optional prediction based upon the SIF odd fields decoded by MPEG-1 SIF decoder 118). This yields an SIF even field video signal which is output on lines 123 and 124. Switch 125 allows either a decoded SIF odd field, or a decoded SIF even field to be output on line 126 (depending upon which type of field is being decoded within functional block 101). Switch 127 allows either a decoded SIF odd field, or a decoded SIF even field to be input to horizontal interpolator 128 (a decoded SIF odd field is selected if an odd CCIR-601 field is being decoded, and a decoded SIF even field is selected if an even CCIR-601 field is being decoded). Horizontal interpolator 128 up-samples the odd and even fields received from decoders 118 and 122 to CCIR-601 resolution. Field-structured CCIR-601 decoder 129 decodes the bitstream corresponding to the third video layer (employing an optional spatial prediction based upon the interpolated decoded SIF odd and even fields from layers one and two) to reconstitute a CCIR-601 video signal which is output on line 130.

Figure 3:
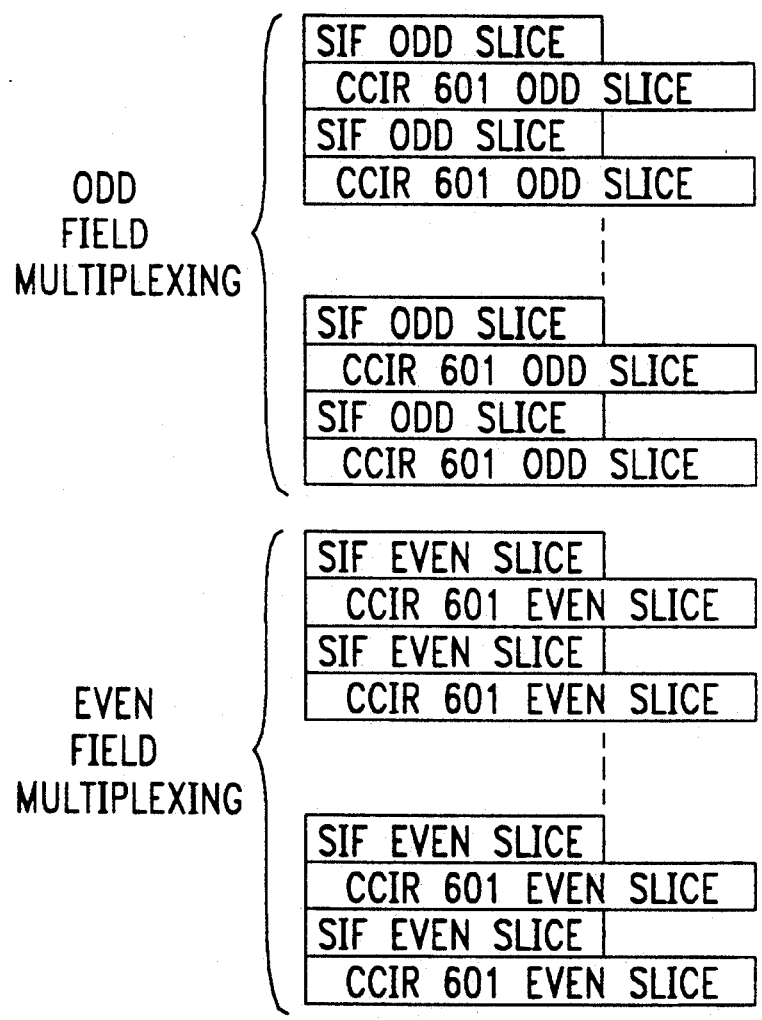
FIG. 3 is a pictorial representation of the slice structure employed in the three-layer spatially scalable digital video encoding performed in accordance with the example of the invention illustrated in FIG. 1.

A representation of the slice structure employed in the encoding performed within functional block 100 of FIG. 1 is shown in FIG. 3. The odd and even fields are encoded one after the other. Each SIF odd slice block may be used in the optional spatial prediction of blocks of CCIR-601 odd slice corresponding to the same spatial image. Similarly, SIF even slice blocks may be used in the optional spatial prediction of blocks of CCIR-601 even slices. The slices of the SIF odd, SIF even, CCIR-601 odd and CCIR-601 even fields must be multiplexed as shown for the images to be decoded correctly.

Figure 4A:
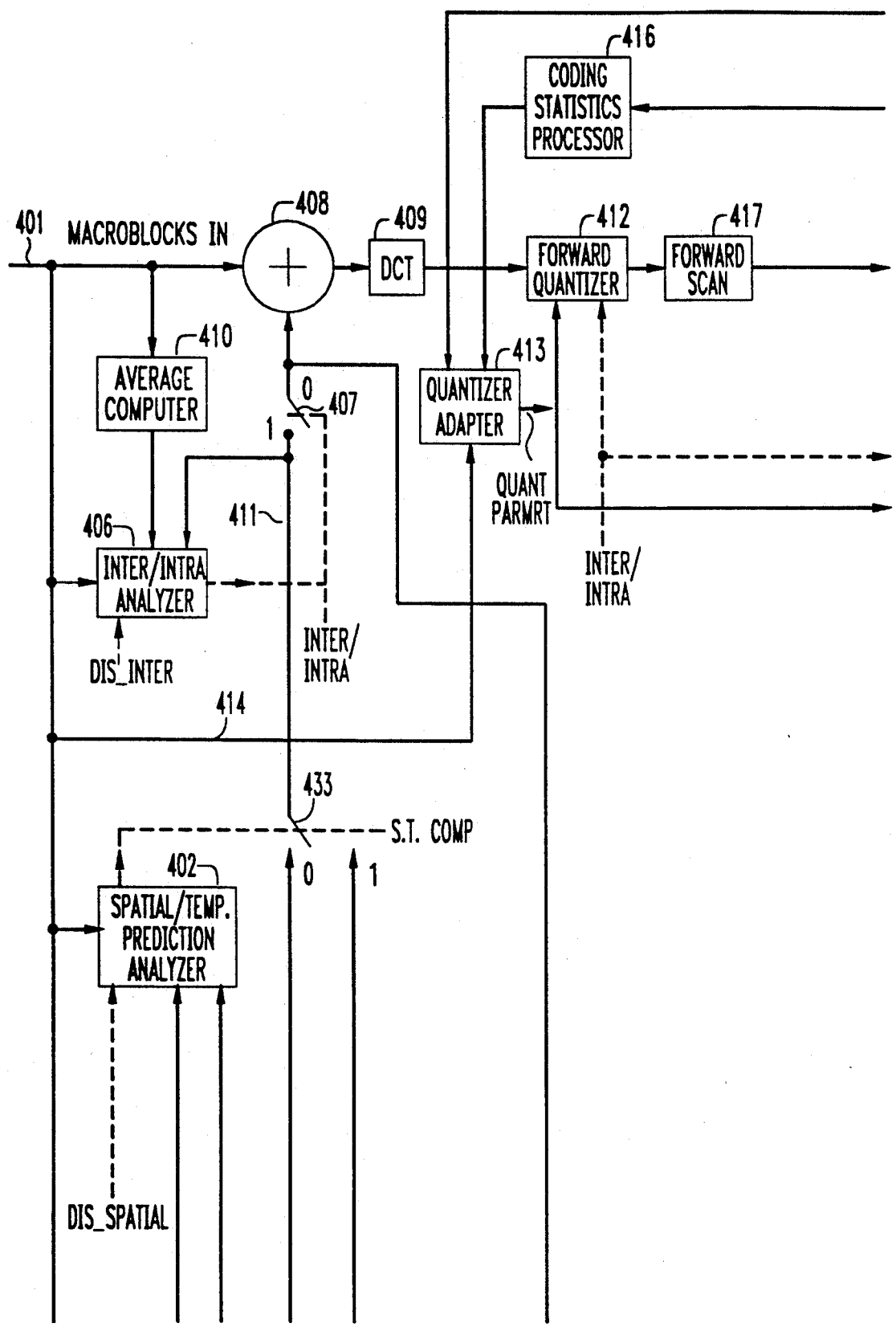
FIGS. 4A, 4B and 4C show, in simplified block diagram form, the internal architecture of a picture encoder which facilitates the encoding of a three-layer spatially scalable digital video signal in accordance with the example of the invention illustrated in FIG. 1.
Figure 4B:
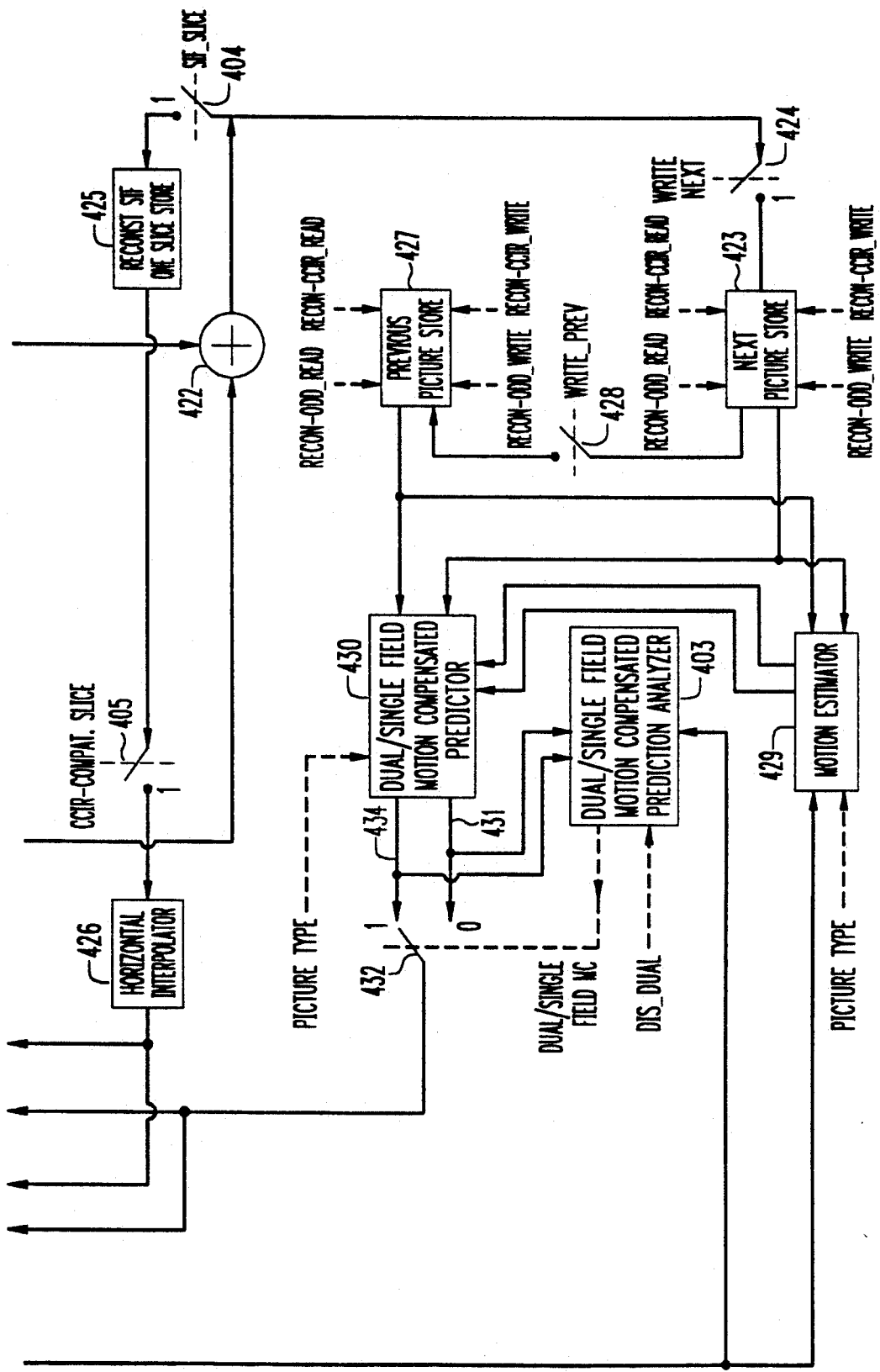
Figure 4C:
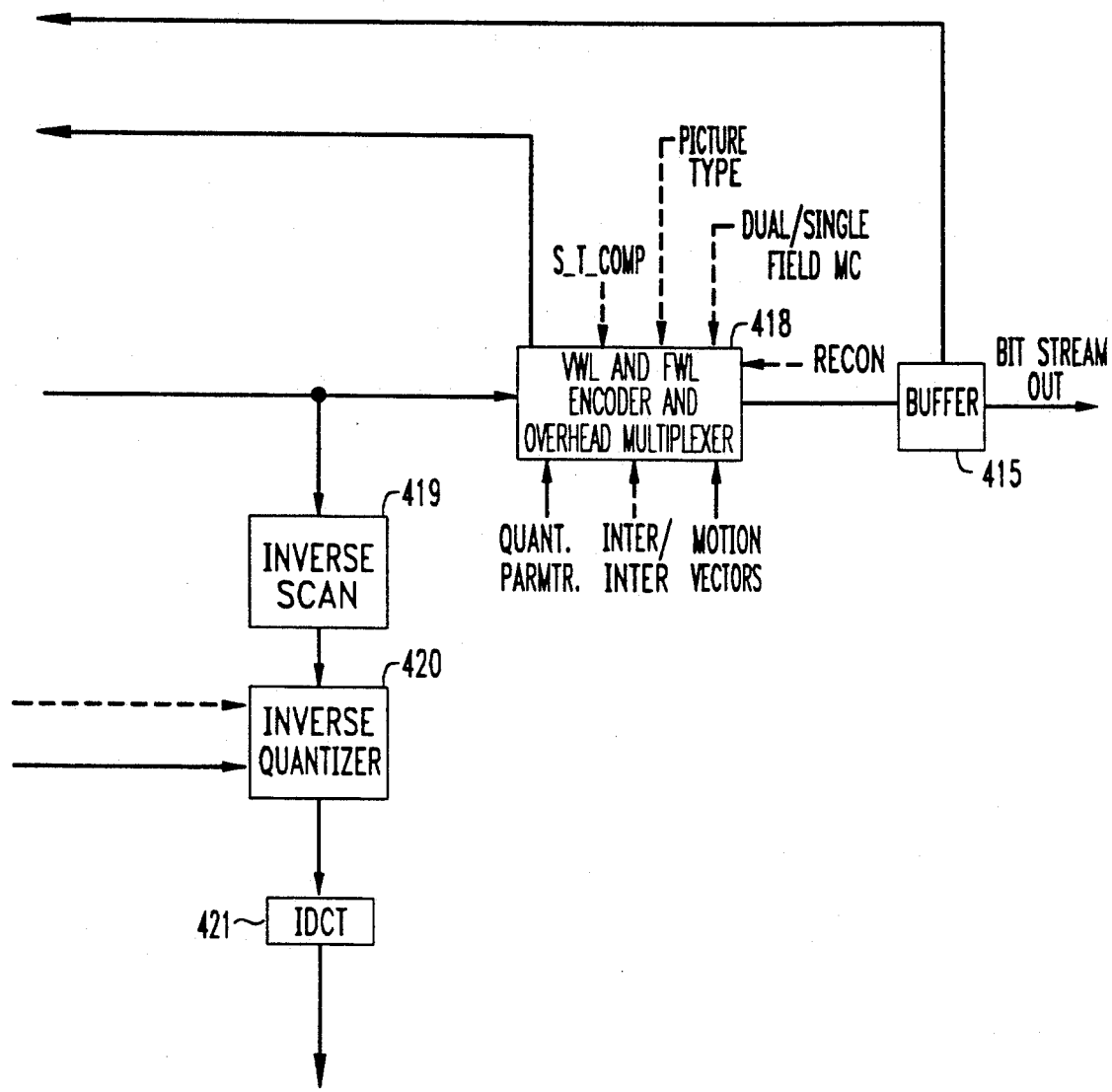
Figure 5:
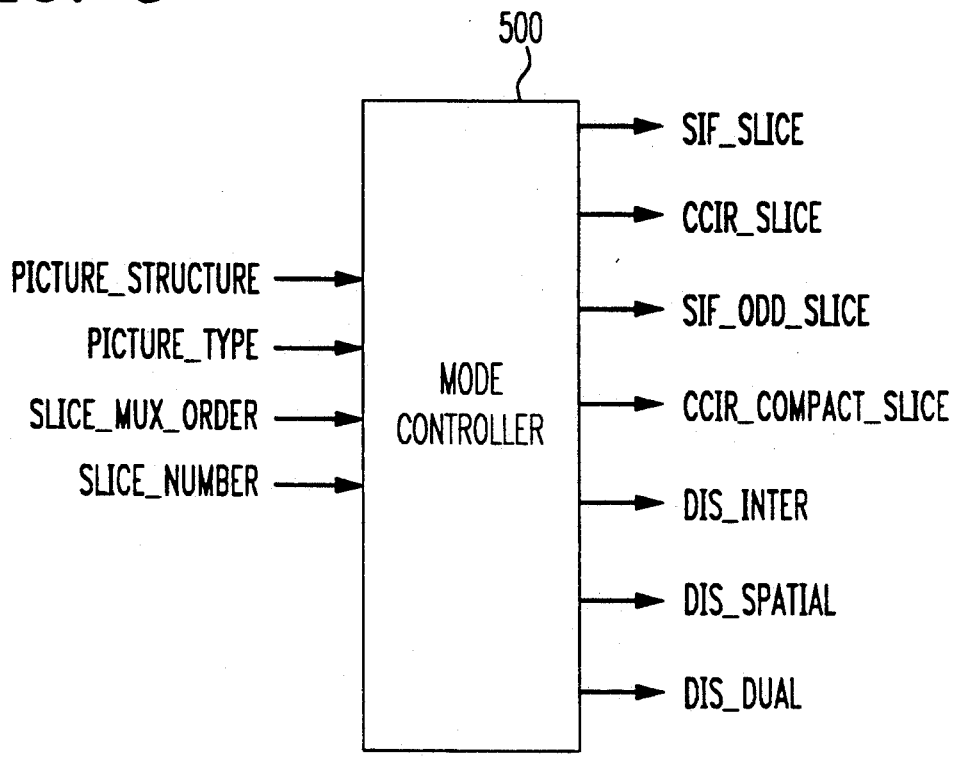
FIG. 5 shows in simplified block diagram form, a mode controller for the encoder of FIGS. 4A, 4B and 4C.

Although FIG. 1 shows three separate encoders being employed to accomplish the encoding of the three video layers, in a particular embodiment of the invention, the encoding for all three layers may be accomplished sequentially within a single adaptive encoder. FIGS. 4A, 4B and 4C show a simplified block diagram of the internal architecture of one example of such an adaptive picture encoder. As this encoder must perform three distinctly different types of encoding, certain analyzers and subsystems within it must be enabled and disabled as a function of the particular type of encoding being performed at a given time. This enabling/disabling is performed as function of control signals generated by a mode controller. Mode controller 500, shown in FIG. 5, generates the signals to control the mode of operation for the encoder of FIGS. 4A, 4B and 4C. Mode controller 500 receives input signals from an independently running processor (not shown in FIG. 5) which generates the input signals to cause a particular slice arrangement to be realized according to pre-programmed information and the type of picture being processed. The input signals provided to mode controller 500 include: picture_structure, which identifies whether a picture is frame-structured or field-structured; picture_type, which identifies an I-, P-, or B-picture; slice_mux_order, which identifies the slice multiplexing structure employed; and slice_number, which provides a count of the slice being processed. The output of mode controller 500 provides bi-level ("0" or "1") controls signals including: sif_slice ("1" when the current slice is form an SIF resolution image); sif_odd_slice ("1" when the current slice is from an SIF odd field); ccir_slice ("1" when the current slice is of CCIR-601 resolution); ccir_compat_slice ("1" when current slice is of CCIR-601 resolution and uses a compatible prediction); and bypass control signals dis_inter, dis_spatial, and dis_dual (which disable the inter/intra, spatial/temporal prediction, and dual/single field prediction analyzers).

Figure 6A:
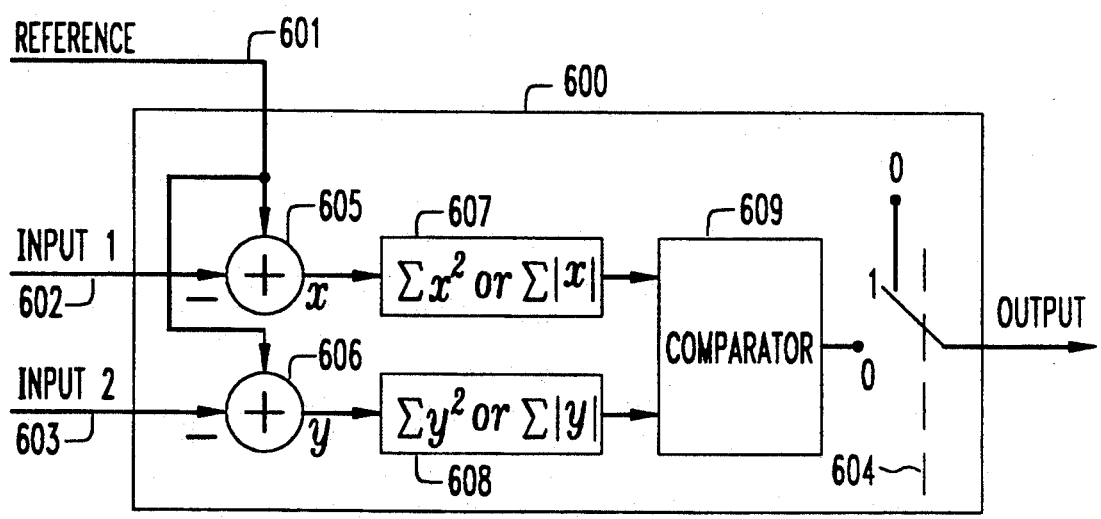
FIG. 6A shows, in simplified block diagram form, the basic architecture of an analyzer used within the picture encoder of FIGS. 4A, 4B and 4C.

The inter/intra, spatial/temporal prediction, and dual/single field motion compensated prediction ("dual/single field MCP") analyzers employed within the encoder of FIGS. 4A and 4B (as well as those analyzers employed within other encoders and decoders which will be discussed below) are all of the same basic configuration as analyzer 600 illustrated in FIG. 6A. Analyzer 600 accepts as input a reference signal on line 601, a first input signal ("Input 1") on line 602, a second input signal ("Input 2") on line 603, and a bypass signal on line 604. The reference signal is always the original video signal input to the particular encoder in which the analyzer is located. A signal indicative of the difference between the reference signal and the Input 1 signal is output by summing element 605. Similarly, a signal indicative of the difference between the reference signal and the Input 2 signal is output by differencing element 606. The energy in the signals output by differencing elements 605 and 606 is computed, respectively, by summing elements 607 and 608. This energy summation may be arrived at by any suitable method using either a sum of squares or sum of absolute value criteria. The energy summations are then fed to comparator 609. If the input from summing element 607 is smaller or equal to the input from summing element 608, the output of comparator 609 is "1". If the input from summing element 607 is greater than the input from summing element 608, the output of comparator 609 is "0". However, if the bypass signal input on line 604 is set to "1", the comparator output is bypassed, and the output of analyzer 600 is forced to "0". FIG. 6B is a table showing the various reference, Input 1, Input 2, bypass control, and output signals for the various types of analyzers employed within the encoders discussed below.

In performing the MPEG-1 SIF encoding (layer 1), the SIF odd field macroblocks output by SIF decimator 103 (FIG. 1) are received by the adaptive picture encoder of FIGS. 4A, 4B and 4C now line 401 (FIG. 4A). As MPEG-1 encoding does not use spatial or dual field prediction, mode controller 500 sets both the dis_spatial and dis_dual signals to "1". This effectively disables spatial/temporal prediction analyzer 402, and dual/single field MCP analyzer 403, resulting in the compatibility signal ("s_t_comp") being set to "0", and the dual/-single field motion compensation signal ("dual/single_ field_mc") being set to "0". In addition, the sif_slice and sif_odd_slice signals are set to "1", and the ccir_ compat_slice signal is set to "0" by mode controller 500. Respectively, these signals cause switch 404 to close and switch 405 to open.

If the current picture is an I-picture, mode controller 500 outputs a dis_inter bypass control signal of "1", thereby disabling inter/intra analyzer 406 so that it outputs a "0" inter/intra signal. This causes switch 407 to remain open so that differencer 408 receives a prediction of zero at its negative input. As a result, the input video signal on line 401 is passed, unaltered, through differencer 408 to discrete cosine transform circuit ("DCT") 409. If the current picture is not an I-picture, inter/intra analyzer 406 is not disabled, but rather employed to calculate the inter-coding prediction error and intra-coding variances. As shown in FIG. 6B, and intra-coding variance is calculated by computing the square of the difference between the original video signal (received on line 401 in FIG. 4A) and a signal representing the average energy of the original video signal (the average energy is computed by average computer 410 in FIG. 4A). Inter-coding prediction error variance is calculated by computing the square of the difference between the original video signal and an inter prediction signal received via line 411 (FIG. 4A). An inter/intra signal is generated so as to select whichever of these computed variances represents the smaller energy. The resulting inter/intra signal controls switch 407 and determines what differencer 408 will subtract from the video signal on line 401 before the signal is passed to DCT 409.

DCT 409 converts each 8×8 block into an 8×8 matrix of transform coefficients and passes the coefficients along to forward quantizer 412. Forward quantizer 412 quantizes each coefficient based on whether the current macroblock is intra or inter coded, and a quantization parameter ("quant-parmtr"). This quantization parameter (which controls the coarseness of the image being encoded) is determined in light of the characteristics of the digital input signal communicated to quantizer adapter 413 via line 414, the fullness of buffer 415, and in light of coding statistics compiled by coding statistics processor 416. The quantized coefficients are forward scanned by forward scanner 417 in an predetermined order that facilitates the encoding of the quantized data by variable/fixed word-length encoder and overhead multiplexer ("V/FWL encoder") 418. V/FWL encoder 418 encodes the quantized data and outputs it as a bitstream to buffer 415.

In addition to transmitting encoded transform coefficients, V/FWL encoder 418 also encodes and transmits a number of control signals and overhead data within the output bitstream, including: the quant-parmtr signal, the inter/intra signal, motion vectors, the picture_type signal, the s_t_comp signal output by spatial/temporal prediction analyzer 402, the dual/single_field_mc signal, and the recon_signals (which are employed in the decoding of the bitstream and will be discussed later). The V/FWL Encoder also provides coding statistics information to coding statistics processor 416. Buffer 415 outputs the received bitstream at the appropriate rate for acceptance by video multiplexer 108 (FIG. 1).

Within the adaptive picture encoder of FIG. 4, the SIF odd slice is locally decoded through the operations of inverse scanner 419, inverse quantizer 420, and inverse discrete cosine transform circuit ("IDCT") 421, which perform the inverse functions of forward scanner 417, forward quantizer 412, and DCT 409, respectively. The decoded error signal is added by summing element 422 to the prediction signal (evident at the negative input of differencer 408). The resulting signal is written to next picture store 423 via write_next switch 424, and to reconstructed SIF one-slice store ("recon slice store") 425 via switch 404. The signal does not reach horizontal interpolator 426 as switch 405 is open as a result of the "0" value of the ccir_compat_slice signal. Before the encoding of an I- or P-picture, the contents of next picture store 423 are transferred to previous picture store 427 via write_previous ("write_prev") switch 428.

Figure 7:
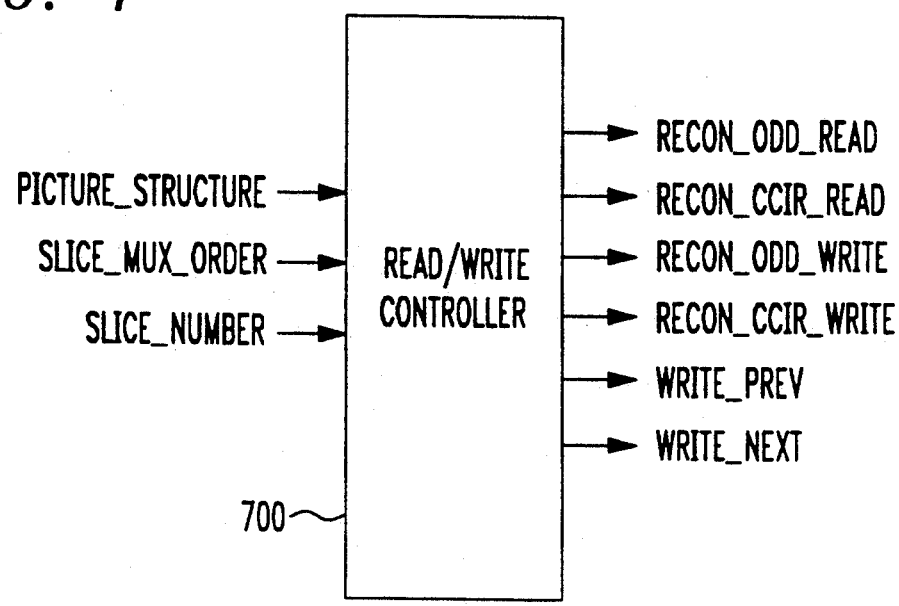
FIG. 7 shows, in simplified block diagram form, a read/write controller for the encoder of FIGS. 4A, 4B and 4C.

The states of write_next switch 424 and write_prev switch 428 are controlled by read/write controller 700 (FIG. 7). As with mode controller 500, read/write controller 700 receives input signals from an independently running processor (not shown in FIG. 7). The input signals provided to read/write controller 700 include: picture_structure; slice_mux_order; and slice_number (all of which were previously discussed). The output of read/write controller 700 provides bilevel ("0" or "1") control signals including: write_prev and write_next signals, which enable writing to the previous and next picture stores (427 and 423 of FIG. 4B); recon_odd_write and recon_ccir_write, which allow the storing of reconstructed odd field and CCIR-601 video to the previous and next picture stores (FIG. 4B); and recon_odd_read and recon_ccir_read, which allow odd field and CCIR-601 video to be read from the previous and next picture stores (FIG. 4B). Depending on whether recon_odd_write (or recon_odd_read) is enabled or disabled, the use of an "odd field" or an "even field" is indicated. All of these "recon_" signals are encoded into the bitstream by V/FWL encoder 418 (FIG. 4C).

Figure 4D:
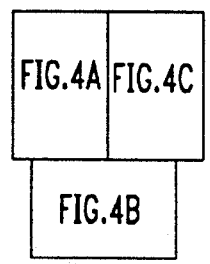
FIG. 4D illustrates the manner in which FIGS. 4A, 4B and 4C may be mated to obtain a full simplified block diagram of the internal architecture of a picture encoder which facilitates the encoding of a three-layer spatially scalable digital video signal in accordance with the example of the invention illustrated in FIG. 1.
Figure 8:
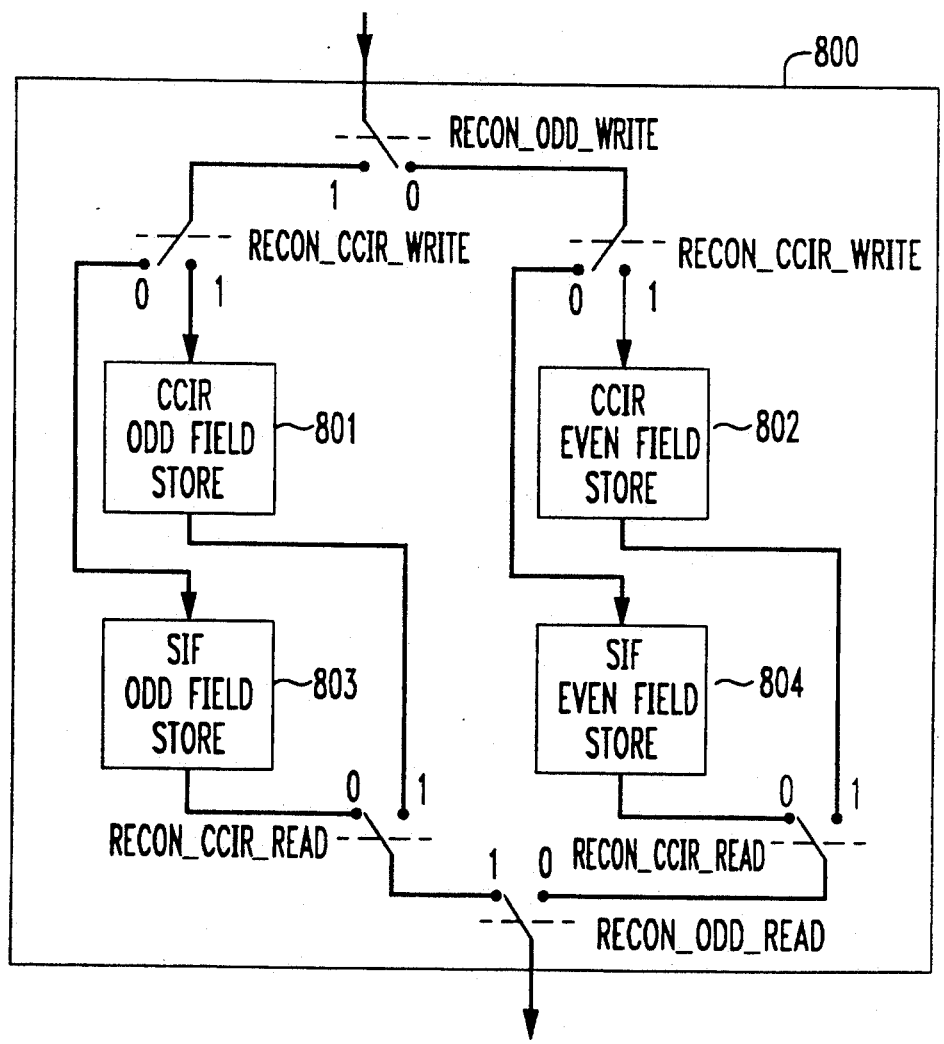
FIG. 8 shows, in simplified block diagram form, the internal architecture of a picture store within the encoder of FIGS. 4A, 4B and 4C.

FIG. 8 shows a simplified block diagram of a picture store (800), one such store is employed for storing a previous picture, and another for storing a next picture within the adaptive picture encoder of FIGS. 4D, 4B and 4C. As shown, picture store 800 contains a separate memory for CCIR-601 odd and even fields (801, 802), as well as separate memories for SIF odd and even fields (803, 804). Picture store 800 is configured to allow the storage and retrieval of pictures in response to read/-write signals generated by read/write controller 700.

If the current picture being processed by the adaptive picture encoder of FIG. 4 is a P- or B-picture, motion estimator 429 generates motion vectors by finding the best match of the odd-field macroblocks input on line 401 with the decoded reference odd-field images in next and previous picture stores 423 and 427. The motion vectors are sent to dual/single field motion compensated predictor ("dual/single field MC predictor") 430 which calculates a prediction of the video on line 401 based upon the received motion vectors, the contents of next and previous picture stores 423 and 427, and the picture_type signal. The prediction is output by dual/single field MC predictor 430 on line 431 and passed to switch 407 via switches 432 and 433 (as this is MPEG-1 encoding, dual/single_field_mc and s_t_comp are set to "0"). This completes the MPEG-1 encoding of an SIF odd slice.

As is shown in FIG. 3, the next slice to be encoded is a CCIR-601 odd slice. For encoding a CCIR-601 layer all modes are available and all analyzers are used (i.e., all "dis_" signals generated by mode controller 500 are set to "0"). The ccir_compat_slice signal generated by mode controller 500 is set to "1", and the sif_slice signal generated by mode controller 500 is set to "0". The macroblocks representing the CCIR-601 odd slice are received via line 401. As with previously described encoding scheme, signal differencer 408 outputs a prediction error macroblocks. Each 8×8 block within each prediction error macroblock is converted into an 8×8 matrix of transform coefficients by DCT 409. The coefficients are then quantized and forward scanned by forward quantizer 412 and forward scanner 417. They are then passed to V/FWL encoder 418, buffer 415, and video multiplexer 108 (FIG. 1), which perform as discussed earlier for MPEG-1 SIF odd coding.

In the local decoding loop of the encoder, the output of forward scanner is inverse scanned, inverse quantized and inverse transformed to reconstruct the quantized prediction error signal. This decoded error signal is added back to the prediction signal (evident at the negative input of differencer 408) by summing element 422 to generate a reconstructed CCIR-601 signal. This reconstructed signal is saved in next picture store 423.

The prediction signal for this macroblock was obtained through the following sequence of operations. Motion estimator 429 first compared the input macroblocks of CCIR-601 resolution on line 401 with the decoded reference CCIR-601 images within the previous and next picture stores 427 and 423. If it is an I-picture (as indicated by the picture_type signal, no motion estimation is performed. Motion estimator 429 computes two sets of motion vectors, one for dual field prediction mode and one for single field prediction mode. These motion vectors are sent to dual/single field MC predictor 430 which, based upon these vectors, computes the prediction for both cases (one being output on line 431, and the other on line 434). Dual/single field MCP analyzer 403 compares the two predictions and selects the one that gives a lower prediction error. A dual/single_field_mc signal is output by dual/single field MCP analyzer 403 so that switch 432 is directed to the output of dual/single field MC predictor 430 which offers the least prediction error. Since the ccir_compat_slice signal is set to "1", recon slice store 425 outputs the current SIF slice to horizontal interpolator 426 (which corresponds to horizontal interpolator 109 in FIG. 1). Spatial/temporal prediction analyzer 402 compares the interpolated SIF signal (spatial prediction) with the output of dual/single field MC predictor 430 (temporal prediction) to determine which signal gives a better estimate of the input video. Spatial/temporal prediction analyzer 402 outputs a compatibility signal (s_t_comp) to allow the best choice of spatial or temporal prediction to be passed to inter/intra analyzer 406. Inter/intra analyzer 406 determines whether intra-coding or inter-coding is to be used by comparing the variance of the signal on line 401 to the variance of the inter prediction signal computed using the prediction signal received via line 411. An inter/intra signal is generated so as to cause switch 407 to allow whichever of these signals corresponds to the lower of the two variances to be passed to differencer 408. The inter/intra signal opens switch 407 if intra-coding is selected or closes it if inter prediction is selected. This completes the loop for coding CCIR-601 odd slice.

The alternate encoding of SIF odd slices and CCIR-601 odd slices continues until the odd field is complete. Next the encoding of SIF even slices and CCIR-601 even slices is performed. The encoding of an SIF even slice is similar to that of a CCIR-601 slice except that for SIF even slice encoding the ccir_compat_slice signal generated by mode controller 500 is set to "0", and the dis_spatial signal generated by mode controller 500 is set to "1". This causes switch 405 to be opened and spatial/temporal prediction analyzer 402 to be disabled.

As shown in FIG. 3, after an SIF even slice is encoded, a CCIR-601 even slice is encoded. This encoding is similar to that of a CCIR-601 odd slice, but a reconstructed SIF even slice stored in recon slice store 425 is used as a basic for spatial prediction. The alternate encoding of SIF even slices and CCIR-601 even slices continues until the even field is complete.

As discussed above, during an odd-field, video multiplexer 108 (FIG. 1) receives the bitstreams related to the SIF odd, and CCIR-601 odd slices; whereas during an even field it receives SIF even, and CCIR-601 even slices. Video multiplexer 108 multiplexes these received signals and transmits them to video demultiplexer 115 (FIG. 1) where they are demultiplexed and passed on to decoders 116, 120 and 124 (FIG. 1).

Figure 9:
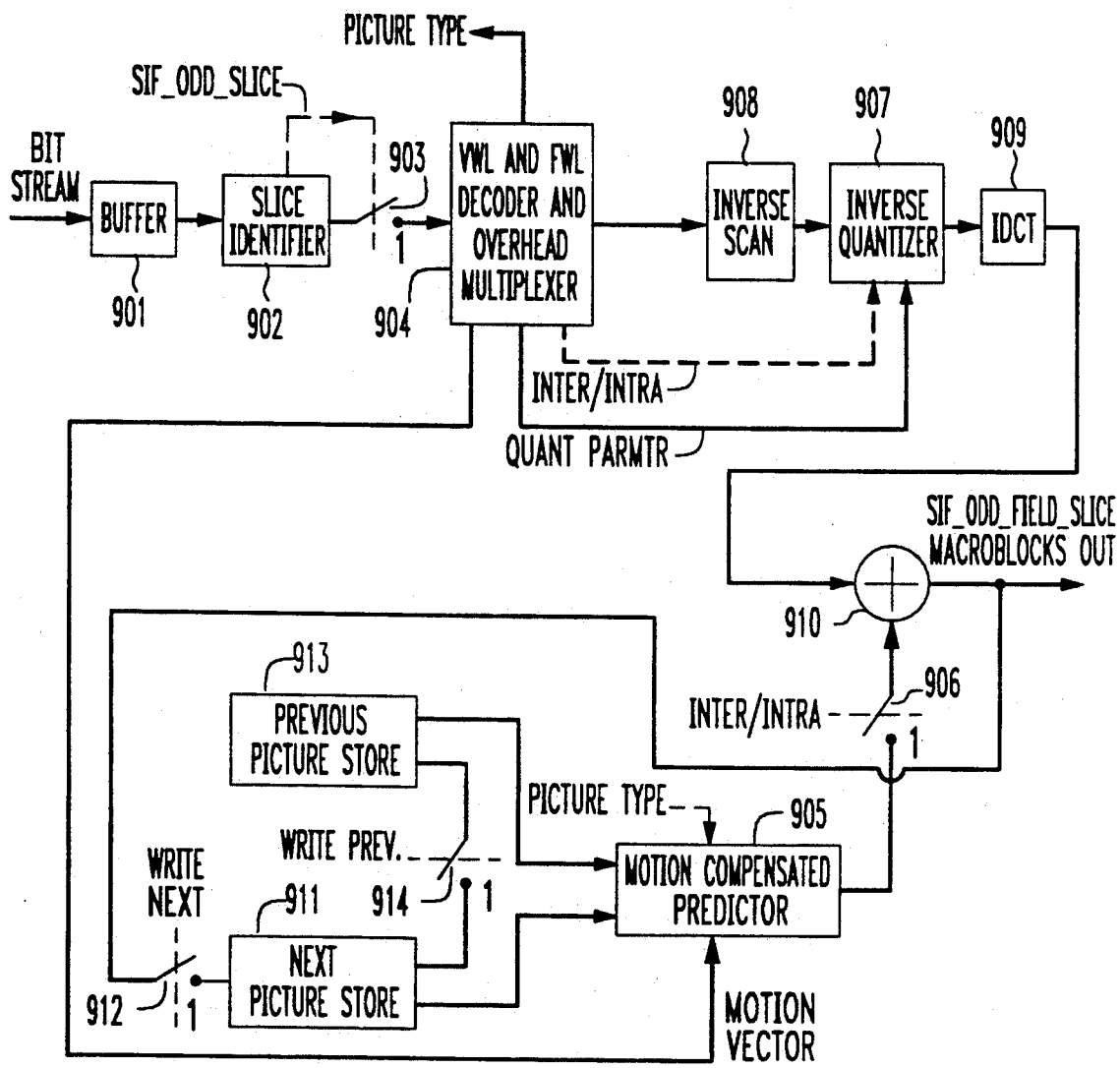
FIG. 9 shows, in simplified block diagram form, the internal architecture of a picture decoder which facilitates the decoding of a Source Intermediate Format ("SIF") odd digital video signal in accordance with the example of the invention illustrated in FIG. 1.

FIG. 9 shows a simplified block diagram of the internal architecture of a picture decoder which facilitates the decoding of a low-resolution layer digital video signal (MPEG-1) encoded by the encoder of FIGS. 4A, 4B and 4C. A bitstream containing coefficients representing an encoded video field is sent to buffer 901 from video demultiplexer 115 (FIG. 1). This bitstream also contains the control signals and overhead data transmitted by V/FWL encoder 418 (FIG. 4C). Buffer 901 passes this signal to slice identifier 902, which scans the bitstream for an sif_odd_slice signal of "1" (indicative of an SIF odd-field slice), and in response closes switch 903, and inputs the bitstream to variable/fixed word length decoder and overhead demultiplexer ("V/FWL decoder") 904. V/FWL decoder 904 decodes the control signals and overhead data within the bitstream, including: the picture_type signal, which is sent to motion compensated predictor 905; the motion vectors, which are sent to motion compensated predictor 905; the inter/intra signal, which is sent to switch 906 and to inverse quantizer 907; and the quant-parmtr signal, which is sent to inverse quantizer 907. The V/FWL decoder outputs the coefficient related data of the encoded video signal to inverse scanner 908 which rearranges the coefficients and passes them to the inverse quantizer 907. Based upon received control information, inverse quantizer 907 reverses the operation performed by forward quantizer 412 (FIG. 4A). The output of inverse quantizer 907 is inversely transformed by IDCT 909 and added, by summing element 910, to a prediction signal received from switch 906. The output of summing element 910 is the reconstructed SIF odd slice macroblock. This reconstructed macroblock is also stored in next picture store 911 if it is an I- or a P-picture. Write_next switch 912 is closed if the current field is an I- or P-picture (as determined from the picture_type signal). Before decoding of I- or P-picture, the contents of next picture store 911 are transferred to previous picture store 913 upon closing of write_prev switch 914.

Motion compensated predictor 905 computes the prediction of the current signal based on the picture_type signal, the received motion vectors, and the contents of next and previous picture stores 911 and 913. This prediction signal is added to the SIF odd slice macroblock passing through summing element 910 if the current picture being decoded is inter coded (inter-/intra set to "1", and switch 906 closed). However, if the current picture being decoded is intra coded (inter-/intra set to "0", and switch 906 opened), a signal of zero is added to the reconstructed SIF odd slice macroblock passing through summing element 910.

Figure 10:
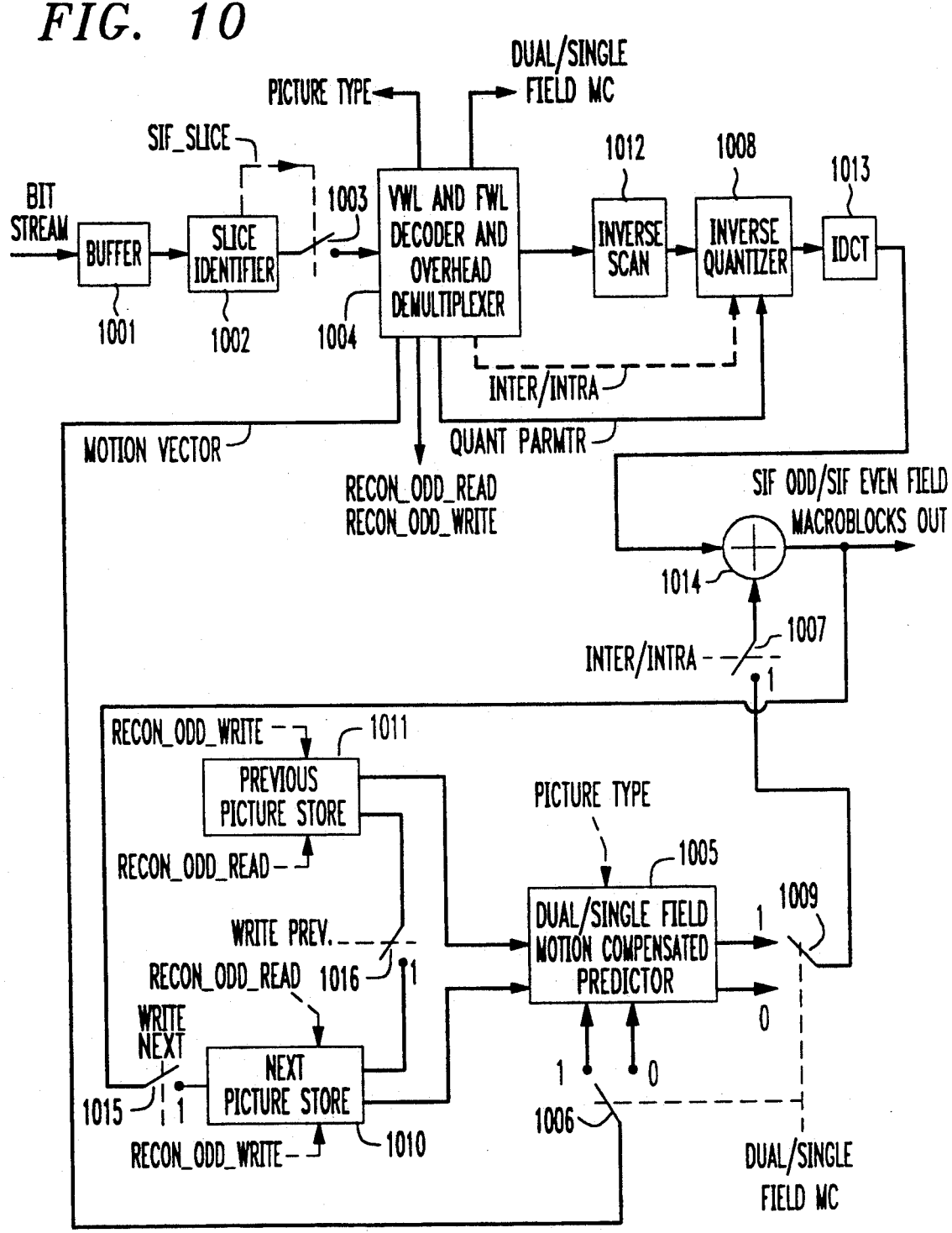
FIG. 10 shows, in simplified block diagram form, the internal architecture of a picture decoder which facilitates the decoding of SIF odd and SIF even digital video signals in accordance with the example of the invention illustrated in FIG. 1.

FIG. 10 shows a simplified block diagram of the internal architecture of a picture decoder which facilitates the decoding of an intermediate-resolution digital video signal encoded by the encoder of FIGS. 4A, 4B and 4C. This decoder can decode both SIF odd and SIF even fields, and functions in a manner similar to that of the decoder of FIG. 9. An incoming bitstream passes through buffer 1001 and slice identifier 1002. Slice identifier 1002 scans the bitstream for an sif_slice_start_code. Upon finding this start code, slice identifier 1002 sets sif_slice signal to "1" (indicative of an SIF odd or even bitstream), and in response closes switch 1003, and inputs the bitstream to V/FWL decoder 1004. V/FWL decoder 1004 decodes the control signals and overhead data within the bitstream, including: the picture_type signal, which is sent to dual/single field MC predictor 1005; the motion vectors, which are sent to switch 1006; the inter/intra signal, which is sent to switch 1007 and inverse quantizer 1008; the quan_parmtr signal, which is sent to inverse quantizer 1008; the dual/single_field_mc signal, which controls switches 1006 and 1009; and the recon_odd_write and recon_odd_read signals which are sent to next and previous pictures stores 1010 and 1011. For an SIF slice macroblock, V/FWL decoder 1004 output the coefficient related data of encoded video to inverse scanner 1012, inverse quantizer 1008, and IDCT 1013. The output of IDCT 1013 is added, by summing element 1014, to a prediction signal received from switch 1007. The resulting decoded SIF slice macroblock is written into next picture store 1010 via write_next switch 1015 if it is an I- or a P-picture. Before decoding of I- or P-picture, the contents of next picture store 1010 are transferred to previous picture store 1011 via the closing of write_prev switch 1016. The dual/single_field_mc signal directs the motion vectors output by V/FWL decoder 1004 to the appropriate input of dual/single field MC predictor 1005, which computes a prediction for the selected mode. If an inter-coded picture is being decoded, switch 1007 passes the prediction data to summing element 1014, where it is added to the output signal of IDCT 1014. However, if the current picture being decoded is intra coded (inter/intra set to "0", and switch 1007 opened), a signal of zero is added to the reconstituted macroblock passing through summing element 1014.

Figure 11:
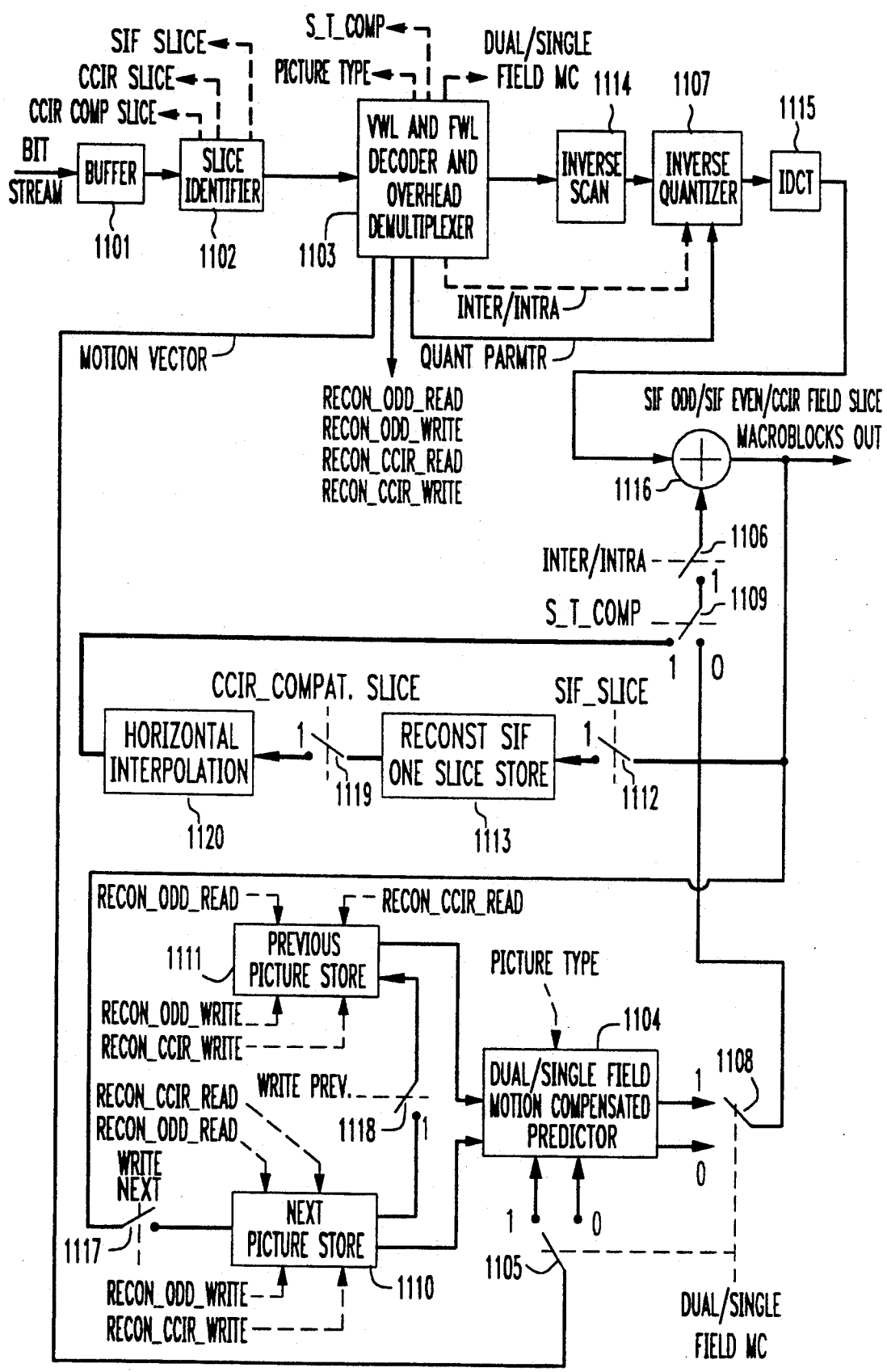
FIG. 11 shows, in simplified block diagram form, the internal architecture of a picture decoder which facilitates the decoding of SIF odd, SIF even, CCIR-601 odd, and CCIR-601 even digital video signals in accordance with the example of the invention illustrated in FIG. 1.

FIG. 11 shows a simplified block diagram of the internal architecture of a picture decoder which facilitates the decoding of a high-resolution digital video signal encoded by the encoder of FIGS. 4A, 4B and 4C. This decoder can decode SIF odd, SIF even, and all CCIR-601 fields. An incoming bitstream passes through buffer 1101 and slice identifier 1102. Slice identifier 1102 scans the bitstream for an sif_slice_start code, and upon finding it sets the sif_slice signal to "1" (indicative of an SIF odd or even slice), the ccir_slice signal to "1" (indicative of a CCIR-601 odd or even slice), and the ccir_compat_slice signal to "1" (indicative of a CCIR-601 slice encoded using a compatible prediction). The bitstream is then passed to V/FWL decoder 1103. V/FWL decoder 1103 decodes the control signals and overhead data within the bitstream, including: the picture_type signal, which is sent to dual/single field MC predictor 1104; the motion vectors, which are sent to switch 1105; the inter/intra signal, which is sent to switch 1106 and inverse quantizer 1107; the quan_parmtr signal, which is sent to inverse quantizer 1107; the dual/single_field_mc signal, which controls switches 1105 and 1108; the s_t_comp signal, which controls switch 1109; and the recon_odd_write, recon_odd_read, recon_ccir_write, and recon_ccir_read signals which are sent to next and previous pictures stores 1110 and 1111.

The decoding of SIF odd and SIF even slices is performed by this decoder in primarily the same manner as in the decoder of FIG. 10, and will not be discussed in detail. However, the decoder of FIG. 11 performs one additional step in SIF decoding. When the current slice being decoded is an SIF slice, switch 1112 is closed and a reconstructed SIF slice is stored in recon slice store 1113. This stored slice will spatially interpolated and used for spatial prediction.

The decoding of a CCIR-601 slice macroblock is performed in response to the detection of a ccir_slice_start_code or a ccir_compat_slice_start_code by slice identifier 1102, the ccir_slice signal and/or the ccir_compat_slice signal is set to "1". In decoding a CCIR-601 slice macroblock, the V/FWL decoder outputs the coefficient related data of encoded video signal to inverse scanner 1114, inverse quantizer 1107, and IDCT 1115. The output of IDCT 1115 is added, by summing element 1116, to a prediction signal received from switch 1106. The resulting decoded CCIR-601 slice macroblock is written into next picture store 1110 via write_next switch 1117 if it is an I- or a P-picture. Before decoding of I- or P-picture, the contents of next picture store 1110 are transferred to previous picture store 1111 via the closing of write_prev switch 1118. The dual/single_field_mc signal directs the motion vectors output by V/FWL decoder 1103 to the appropriate input of dual/single field MC predictor 1104, which computes a prediction for the selected mode. Switch 1119 is closed for all CCIR-601 slices which employ spatial prediction (indicated by a ccir_compat_slice signal of "1"). When switch 1119 is closed, the SIF slice in recon slice store 1113 is interpolated by horizontal interpolator 1120 and passed to switch 1109. Switch 1109 allows either the spatial prediction consisting of the interpolated reconstructed SIF slice, or the temporal prediction output by dual/single field MC predictor 1104 to be used for the current CCIR-601 signal (depending upon the s_t_comp signal decoded by V/FWL decoder 1103). If an inter-coded picture is being decoded, switch 1106 passes the prediction data to summing element 1116 where it is added to the signal output by IDCT 1115. However, if the current picture being decoded is intra coded (inter/intra set to "0", and switch 1106 opened), a signal of zero is added to the reconstituted macroblock passing through summing element 1116.

Figure 12:
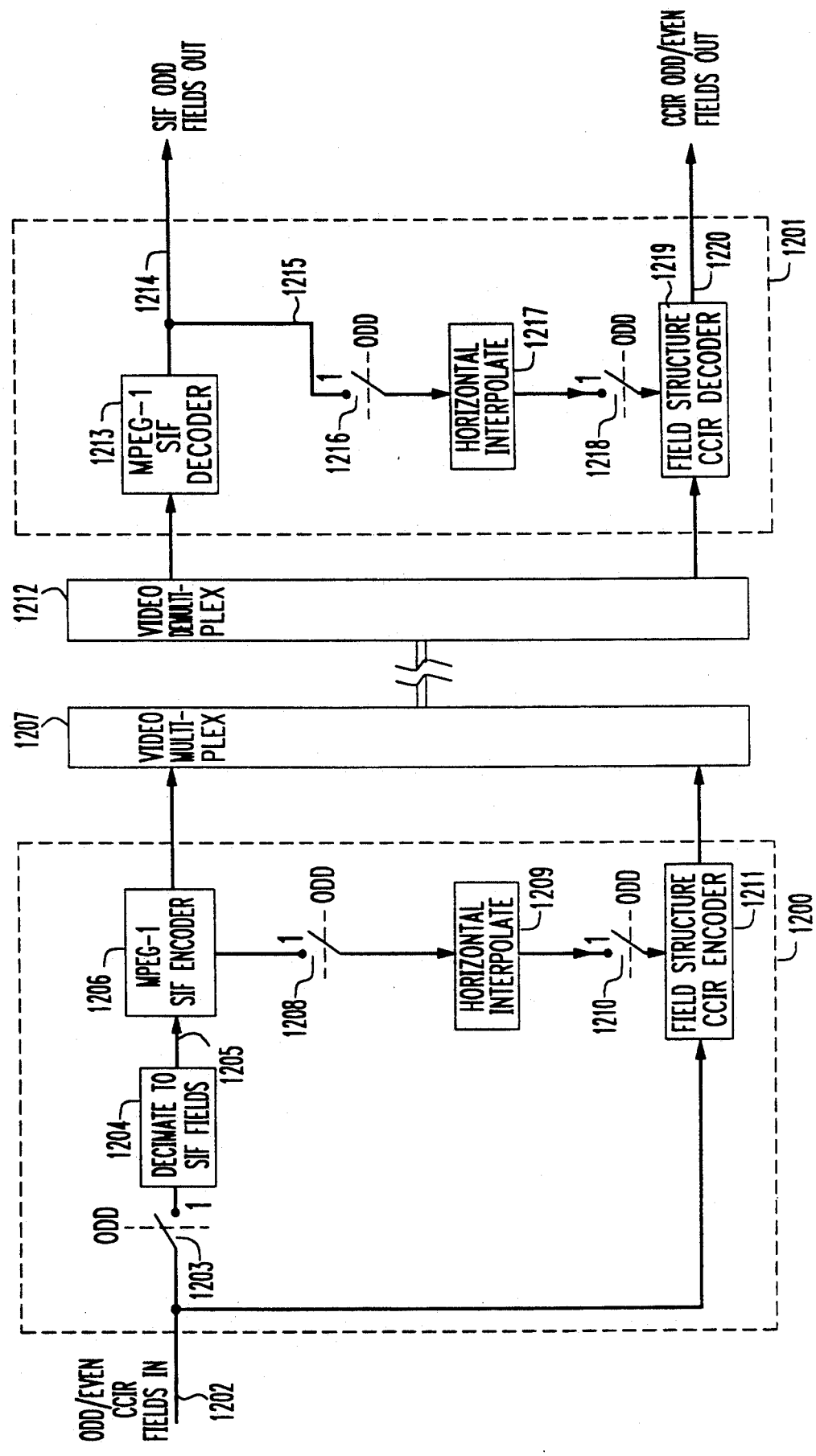
FIG. 12 shows, in simplified block diagram form, an illustration of a video signal encoding/decoding system which facilitates the field encoding and decoding of a two-layer spatially scalable digital video signal in accordance with one example of this invention.

A video signal encoding/decoding system, in accordance with a second example of the invention, is shown in FIG. 12. This system facilitates the field encoding and decoding of a digital video signal having two layers of spatial resolution. Signal encoding is performed within functional block 1200, and signal decoding is performed within functional block 1201. Layer 1 consists of MPEG-1 encoded SIF odd fields and produces an MPEG-1 compatible bitstream. Layer 2 consists of CCIR-601 field-structure pictures (the odd field of which are encoded using an adaptive choice of temporal prediction from previous coded pictures, and a spatial prediction corresponding to a current temporal reference obtained by spatially interpolating decoded layer 1).

As shown in FIG. 12, CCIR-601 digital video signals are input to functional block 1200 via line 1202. Switch 1203 allows only the odd fields within the input video signal to be passed to SIF decimator 1204, where they are decimated to SIF video for the encoding of layer 1. Such decimators are well-known in the art. SIF decimator 1204 outputs decimated odd field macroblock slices via line 1205. The SIF odd fields are directed to MPEG-1 SIF encoder 1206, where they are encoded and sent as a bitstream to video multiplexer 1207 (this encoded bitstream corresponds to the first video layer). MPEG-1 SIF encoder 1206 also outputs a decoded SIF odd signal to switch 1208. When an odd field is being decoded, switch 1208 allows the decoded SIF odd fields to be input to horizontal interpolator 1209. Horizontal interpolator 1209 up-samples the SIF odd fields to CCIR-601 resolution, and outputs them to switch 1210. This up-sampled signal is passed by switch 1211 to field-structure CCIR-601 encoder 1211, where it is used as spatial prediction of the CCIR odd slices. Field-structure CCIR-601 encoder 1211 encodes the odd CCIR-601 fields of the digital video signal received via line 1202, with an adaptive selection between temporal and spatial picture predictions on a macroblock basis. Even CCIR-601 fields cannot be similarly encoded as even field SIF video is not available to provide a spatial prediction, so they are encoded by temporal prediction alone. The resulting encoded bitstreams, first for odd and then for even fields are output to video multiplexer 1207.

Video multiplexer 1207 multiplexes the encoded bitstreams and transmits them to video demultiplexer 1212, where they are demultiplexed into individual bitstreams. MPEG-1 SIF decoder 1213 decodes the bitstream corresponding to the first video layer, thereby reconstituting an SIF odd field video signal which is output on lines 1214 and 1215. When an odd field is being decoded, switch 1216 allows the decoded SIF odd field on line 1215 to be input to horizontal interpolator 1217. Horizontal interpolator 1217 up-samples the odd fields received from decoder 1213 to CCIR-601 resolution. The up-sampled signal is passed by switch 1218 to field-structure CCIR-601 encoder 1219, where it is used as spatial prediction of the CCIR odd slices. For odd fields, field-structure CCIR-601 decoder 1219 decodes the bitstream corresponding to the second video layer (employing an optional spatial prediction based upon the interpolated decoded SIF odd fields from layer one) to reconstitute CCIR-601 odd fields which are output on line 1220. For even fields, CCIR-601 field structure decoder 1219 simply uses temporal predictions from previously decoded CCIR-601 even fields; no spatial prediction is used.

Figure 13:
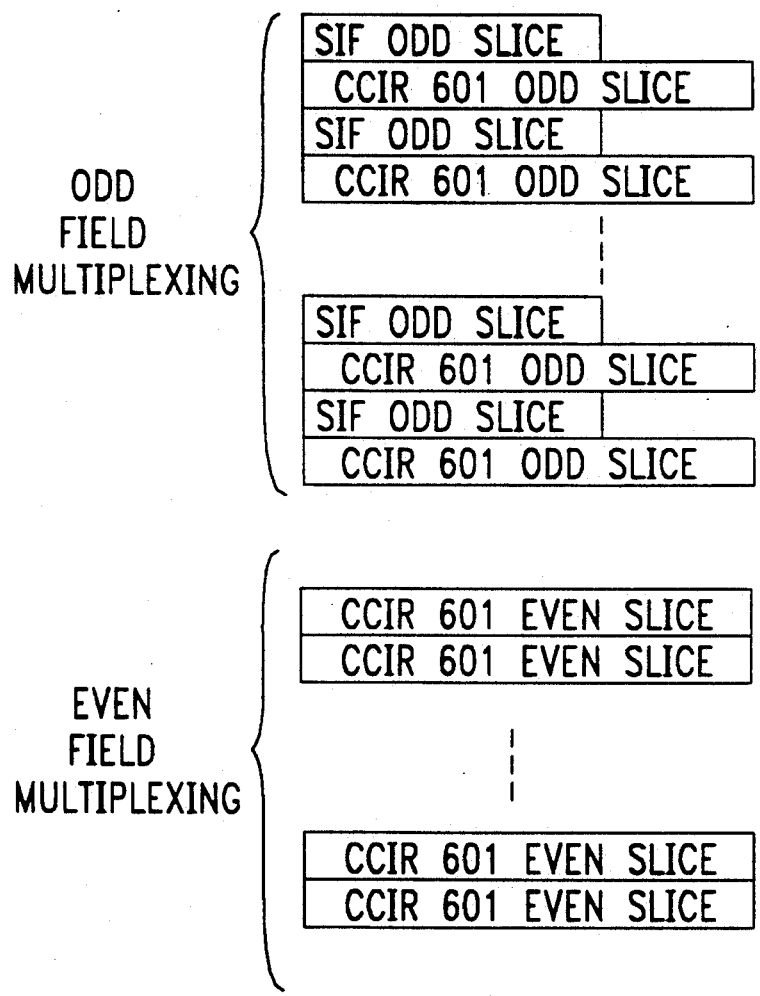
FIG. 13 is a pictorial representation of the slice structure employed in the two-layer spatially scalable digital video encoding performed in accordance with the example of the invention illustrated in FIG. 12.

A representation of the slice structure employed in the encoding performed within functional block 1200 of FIG. 12 is shown in FIG. 13. The odd and even fields are encoded one after the other. Each SIF odd slice is used to spatially predict the CCIR-601 odd slice corresponding to the same spatial image. The slices of the SIF odd, CCIR-601 odd and CCIR-601 even fields must be multiplexed as shown for the images to be decoded correctly.

Although FIG. 12 shows two separate encoders being employed to accomplish the encoding of the two video layers, the encoding for both layers may be performed sequentially within a single adaptive encoder. An example of such an adaptive encoder is shown in FIGS. 4A, 4B and 4C. The MPEG-1 encoding is performed in a manner identical to the MPEG-1 (first layer) encoding of odd SIF fields for the previously described three layer example the invention. The second layer encoding in this two-layer example of the invention is performed in a manner similar to that described for the encoding of the CCIR-601 odd and even slices in the three layer example of the invention. However, since SIF even slices are not available, the CCIR-601 even slices are encoded without spatial prediction.

The decoding performed within decoder 1210 may be accomplished by employing a decoder like that shown in FIG. 9. The process for decoding is the same as that described for decoding the low-resolution SIF odd layer digital video signal (MPEG-1) in three layer example of the invention.

The decoder shown in FIG. 11 may be employed to facilitate the decoding performed within decoder 1214. The process for decoding is the similar to that described for decoding the high-resolution CCIR-601 digital video signal in three layer example of the invention. However, as SIF even slices are not available in this two layer example of the invention, the CCIR-601 even slices are decoded without the benefit of spatial prediction.

Figure 14:
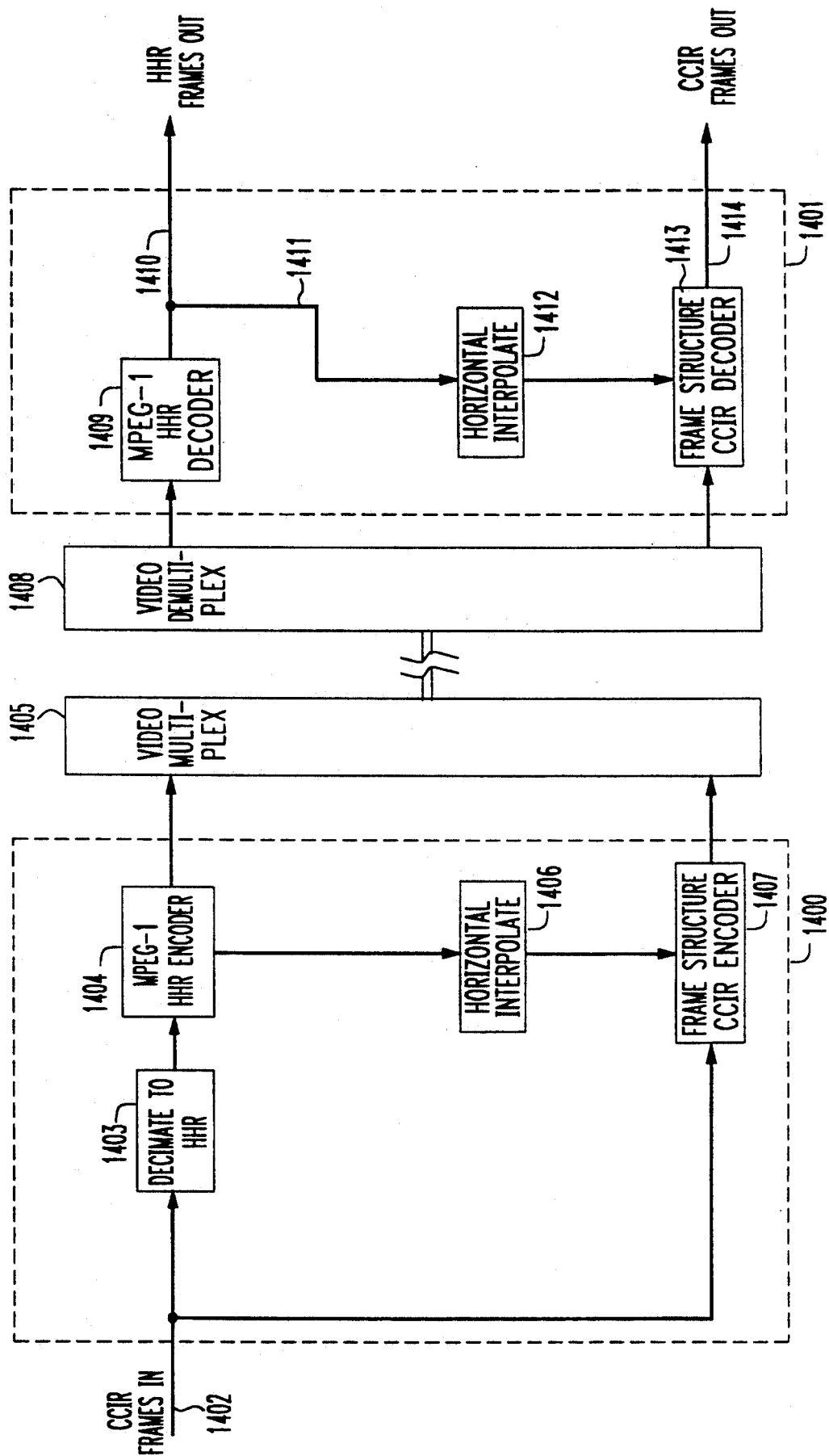
FIG. 14 shows, in simplified block diagram form, an illustration of a video signal encoding/decoding system which facilitates the frame encoding and decoding of a two-layer spatially scalable digital video signal in accordance with one example of this invention.

A third example of this invention is facilitated by the video signal encoding/decoding system illustrated in FIG. 14. In this particular example two layers of video are encoded: a first layer consisting of MPEG-1 compatibly encoded HHR frames, and a second layer consisting of CCIR-601 frames encoded using adaptive choice of temporal prediction from previous coded pictures and spatial prediction (obtained by interpolating a decoded HHR layer) corresponding to current temporal reference. As shown, CCIR-601 digital video signals are input to functional block 1400 via line 1402. The video input signals comprise a succession of digital words, each representing some information at a particular instant of time for a pel. A complete set of digital representations for an image at a particular instant of time is called a frame. The digital video signal received on line 1402 is decimated to HHR video frames by decimator 1403. Such decimators are well-known in the art. Decimator 1403 outputs the HHR video to MPEG-1 HHR encoder 1404, where it is encoded and sent as a bitstream to video multiplexer 1405 (this encoded bitstream corresponds to the first video layer). MPEG-1 HHR encoder 1404 also outputs a decoded HHR video signal to horizontal interpolator 1406. Horizontal interpolator 1406 up-samples the HHR fields received from encoder 1404 to CCIR-601 resolution. Frame-structure CCIR-601 encoder 1407 encodes the CCIR-601 frames of the digital video signal received via line 1402, with an adaptive selection on a macroblock basis between temporal and spatial picture predictions. The up-sampled signal output by horizontal interpolator 1406 is used for obtaining a spatial prediction, and an adaptive dual/single field or frame prediction mode is used for temporal prediction. The resulting encoded bitstream (corresponding to the second video layer) is output by frame-structure CCIR-601 encoder 1407 to video multiplexer 1405.

Video multiplexer 1405 multiplexes the encoded bitstreams and transmits them to video demultiplexer 1408, where they are demultiplexed into individual bitstreams. MPEG-1 HHR decoder 1409 decodes the bitstream corresponding to the first video layer, thereby reconstituting an HHR video signal which is output on lines 1410 and 1411. Horizontal interpolator 1412 up-samples the HHR frames received from decoder 1409 to CCIR-601 resolution. Frame-structure CCIR-601 decoder 1413 decodes the bitstream corresponding to the second video layer (employing a spatial prediction based upon the interpolated decoded layer on HHR frames received from interpolator 1412) to reconstitute a CCIR-601 video signal which is output on line 1414.

Figure 15:
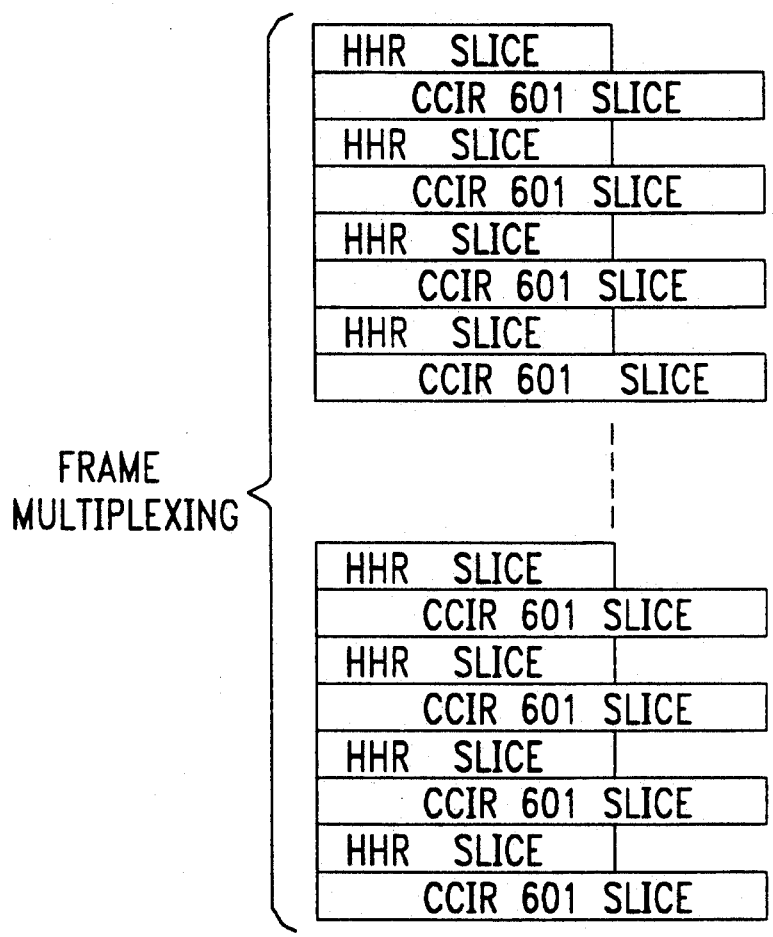
FIG. 15 is a pictorial representation of the slice structure employed in the two-layer spatially scalable digital video encoding performed in accordance with the example of the invention illustrated in FIG. 14.

A representation of the slice structure employed in the encoding performed within functional block 1400 of FIG. 14 is shown in FIG. 15. The HHR and CCIR-601 frame slices are encoded alternately. Since each CCIR-601 slice block makes use of the corresponding HHR slice blocks for optional spatial prediction, the HHR slice blocks are encoded first, before the CCIR-601 slice blocks. Similarly, the HHR slice blocks are decoded first, before decoding the corresponding CCIR-601 slice blocks.

Figure 16A:
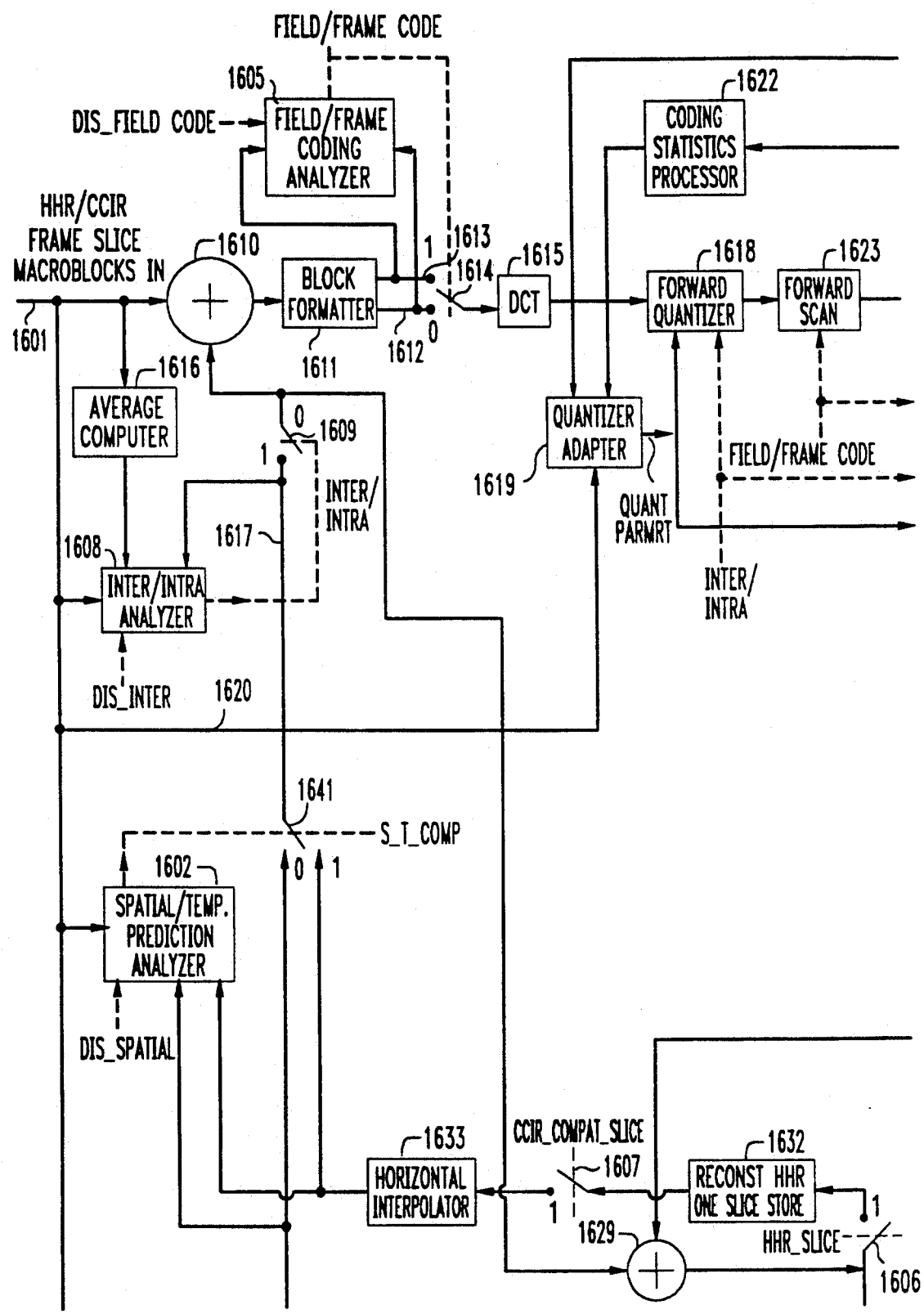
FIGS. 16A, 16B and 16C show, in simplified block diagram form, the internal architecture of a picture encoder which facilitates the encoding of a two-layer spatially scalable digital video signal in accordance with the example of the invention illustrated in FIG. 14.
Figure 16B:
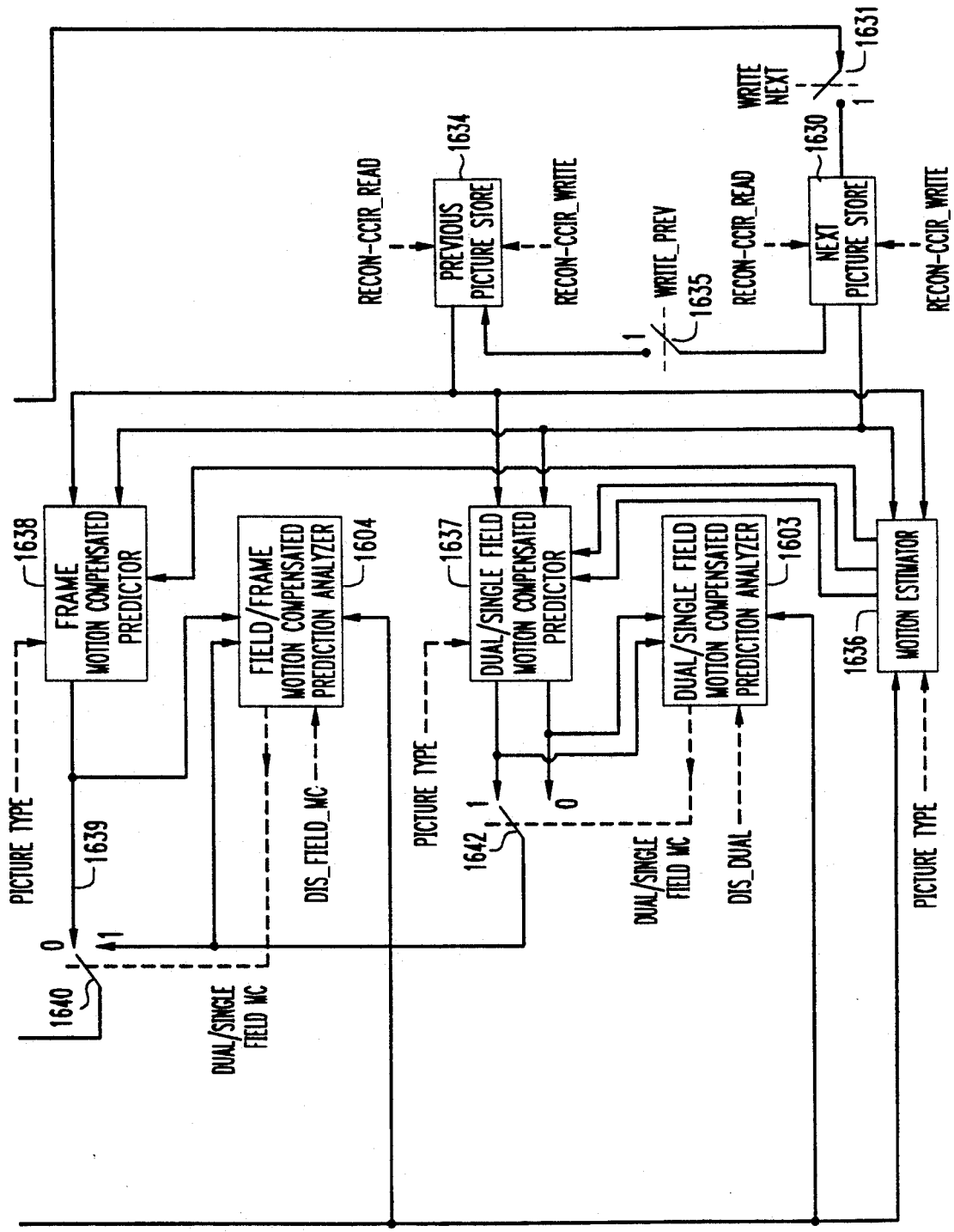
Figure 16C:
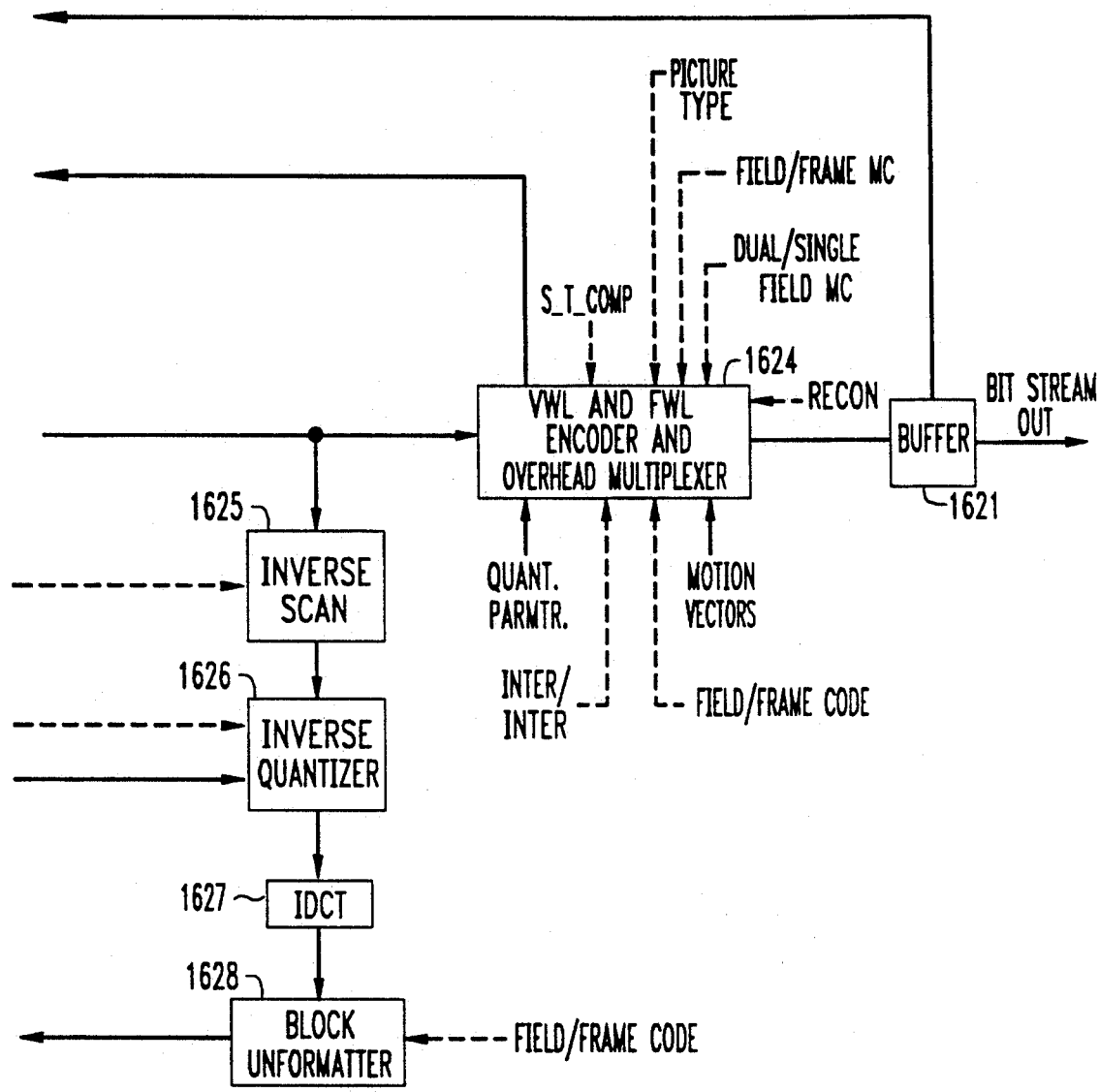
Figure 16D:
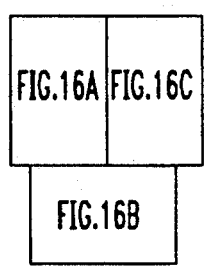
FIG. 16D illustrates the manner in which FIGS. 16A, 16B and 16C may be mated to obtain a full simplified block diagram of the internal architecture of a picture encoder which facilitates the encoding of a two-layer spatially scalable digital video signal in accordance with the example of the invention illustrated in FIG. 14.
Figure 17:
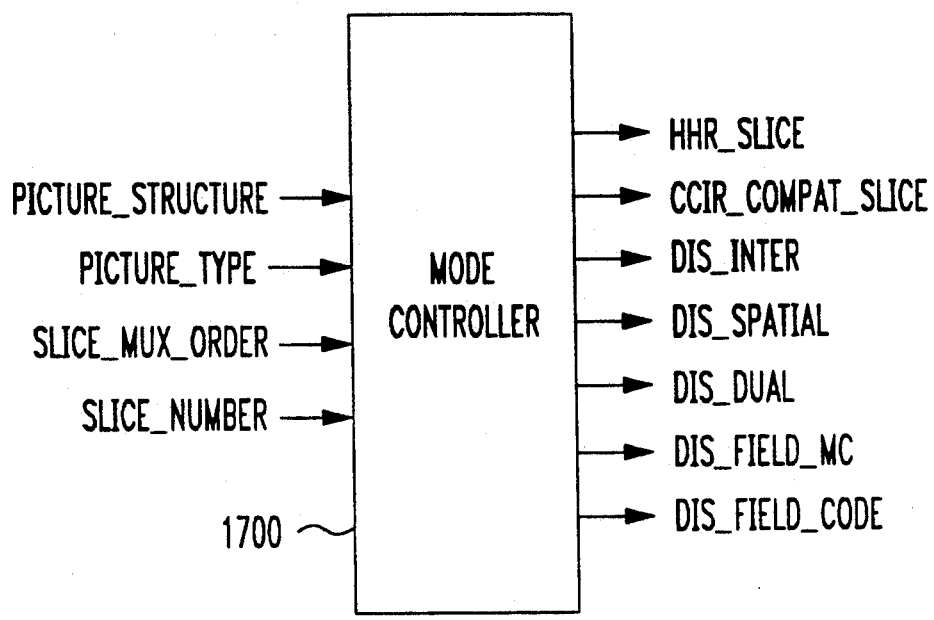
FIG. 17 shows, in simplified block diagram form, a mode controller for the encoder of FIGS. 16A, 16B and 16C.

Although FIG. 14 shows two separate encoders being employed to accomplish the two layer video encoding, the encoding for both layers may be accomplished sequentially within a single adaptive encoder. FIGS. 16A, 16B and 16C shows a simplified block diagram of the internal architecture of such an adaptive encoder. As this encoder must perform two types of encoding, certain analyzers and sub-systems within it must be enabled and disabled as a function of the particular type of encoding being performed at a given time. This enabling/disabling is performed as function of control signals generated by a mode controller. Mode controller 1700, shown in FIG. 17, generates the signals to control the mode of operation for the encoder of FIG. 16A, 16B and 16C. Mode controller 1700 receives the same input signals as previously described mode controller 500. The output of mode controller 1700 provides bi-level ("0" or "1") control signals including: hhr_slice ("1" when the current slice is from an HHR frame); ccir_compat_slice ("1" when current slice is of CCIR-601 resolution and uses a compatible prediction); and bypass control signals dis_inter, dis_spatial, dis_dual, dis_field_mc, and dis_field_code (which disable specific modes in the inter/intra, spatial/temporal prediction, dual/single field prediction, and field/frame prediction analyzers, and the field/frame coding detector).

In performing the MPEG-1 HHR encoding (layer 1), the HHR frame macroblocks output by decimator 1403 (FIG. 14) are received by the adaptive picture encoder of FIGS. 16A, 16B and 16C via line 1601. As MPEG-1 encoding does not use spatial, field, or frame prediction, mode controller 1700 sets the dis_spatial, dis_dual, dis_field_mc, and dis_field_code signals to "1". This effectively disables spatial/temporal prediction analyzer 1602, dual/single field MCP analyzer 1603, field/frame motion compensated prediction ("field/frame MCP") analyzer 1604, and places field/frame coding detector 1605 in a frame mode. As a result, the compatibility signal ("s_t_comp"), the dual/single field motion compensation signal ("dual/single_field_mc"), and the field/frame motion compensation signal ("field/frame_mc") are set to zero. In addition, the hhr_slice signal is set to "1", and the ccir_compat_slice signal is set to "0" by mode controller 1700. Respectively, these signals cause switch 1606 to close and switch 1607 to open.

If the current picture is an I-picture, mode controller 1700 outputs a dis_inter bypass control signal of "1", thereby disabling inter/intra analyzer 1608 so that it outputs a "0" inter/intra signal. This causes switch 1609 to remain open so that differencer 1610 receives a prediction signal of zero at its negative input As a result, the input video signal on line 1601 is passed, unaltered, through differencer 1610 to block formatter 1611. Block formatter 1611 formats the received signal in frame block format (output on line 1612) and field block format (output on line 1613). Since field/frame_code signal is set to "0" switch 1612 is placed in contact with line 1612, and the frame block formatted signal from line 1612 is passed to DCT 1615. If the current picture is not an I-picture, inter/intra analyzer 1608 is not disabled, but rather employed to calculate the inter-coding prediction error and intra-coding error variances. Intra-coding error variance is calculated by computing the square of the difference between the original video signal (received on line 1601) and a signal representing the average energy of the original video signal (the average energy is computed by average computer 1616). Inter-coding prediction error is calculated by computing the square of the difference between the original video signal and an inter prediction signal received via line 1617. An inter/intra signal is generated so as to select whichever of these computed variances represents the smaller energy. The resulting inter/intra signal controls switch 1609 and determines what differencer 1610 will subtract from the video signal on line 1601 before the signal is passed to block formatter 1611.

DCT 1615 converts each 8×8 block into an 8×8 matrix of transform coefficients and passes the coefficients along to forward quantizer 1618. Forward quantizer 1618 quantizes each coefficient based on whether the current macroblock is intra or inter coded, and a quant-parmtr signal. This quant-parmtr signal is determined in light of the characteristics of the digital input signal communicated to quantizer adapter 1619 via line 1620, the fullness of buffer 1621, and in light of coding statistics compiled by coding statistics processor 1622. The quantized coefficients are forward scanned by forward scanner 1623 and passed to V/FWL encoder 1624. V/FWL encoder 1624 encodes the quantized data and outputs it as a single bitstream to buffer 1621.

In addition to transmitting encoded transform coefficients, V/FWL encoder 1624 also encodes and transmits a number of control signals and overhead data within the output bitstream, including: the quant-parmtr signal, the inter/intra signal, motion vectors, the picture—type signal, the s—t—comp signal, the dual/-single—field—mc signal, the field/frame—mc signal, the field/frame—code signal, and recon—signals (which are employed in the decoding of the bitstream and will be discussed later). The V/FWL Encoder also provides coding statistics information to coding statistics processor 1622. Buffer 1621 outputs the received bitstream at the appropriate rate for acceptance by video multiplexer 1405 (FIG. 14).

The HHR slice is locally decoded within the adaptive decoder of FIGS. 16A, 16B and 16C via inverse scanner 1625, inverse quantizer 1626, IDCT 1627, and block unformatter 1628. The decoded signal is added by summing element 1629 to the prediction signal (evident at the negative input of differencer 1610). The resulting signal is written to next picture store 1630 via write—next switch 1631, and to reconstructed HHR one-slice store ("recon slice store") 1632 via switch 1606. The signal does not reach horizontal interpolator 1633 as switch 1607 is open (the ccir—compat—slice signal is set to "0". Before the encoding of an I- or P-picture, the contents of next picture store 1630 are transferred to previous picture store 1634 via write—prev switch 1635.

Figure 18:
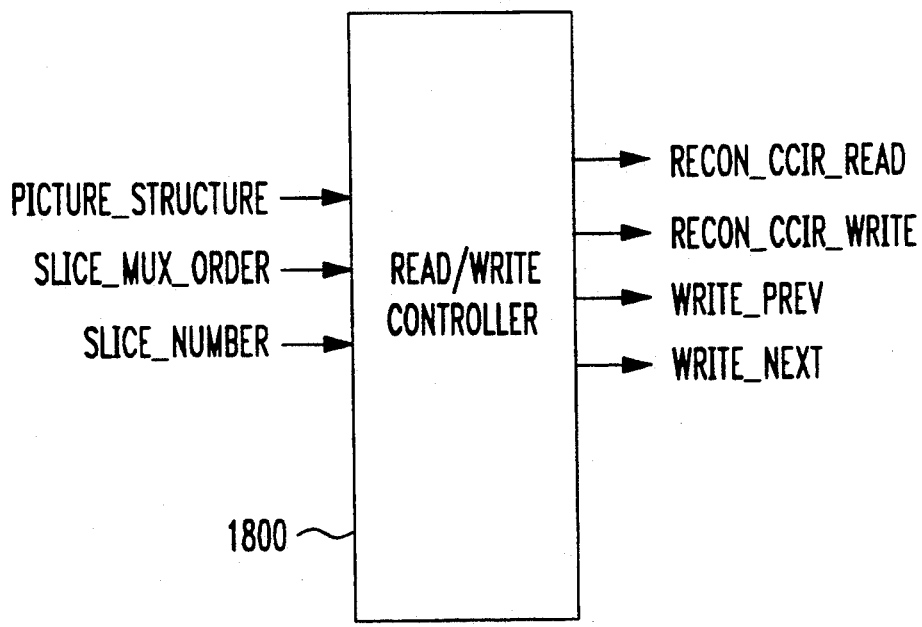
FIG. 18 shows, in simplified block diagram form, a read/write controller for the encoder of FIGS. 16A, 16B and 16C.

The states of write—next switch 1631 and write—prev switch 1635 are controlled by read/write controller 1800 (FIG. 18). An independently running processor (not shown) provides read/write controller 1800 with the following input signals: picture—structure; slice—mux—order; and slice—number. The output of read/-write controller 1800 provides bi-level ("0" or "1") control signals including: write—prev and write—next signals (which enable writing to previous and next picture stores); and recon—ccir—write and recon—ccir—read (which allow the storage and retrieval of reconstructed CCIR-601 frames within previous and next picture stores).

Figure 19:
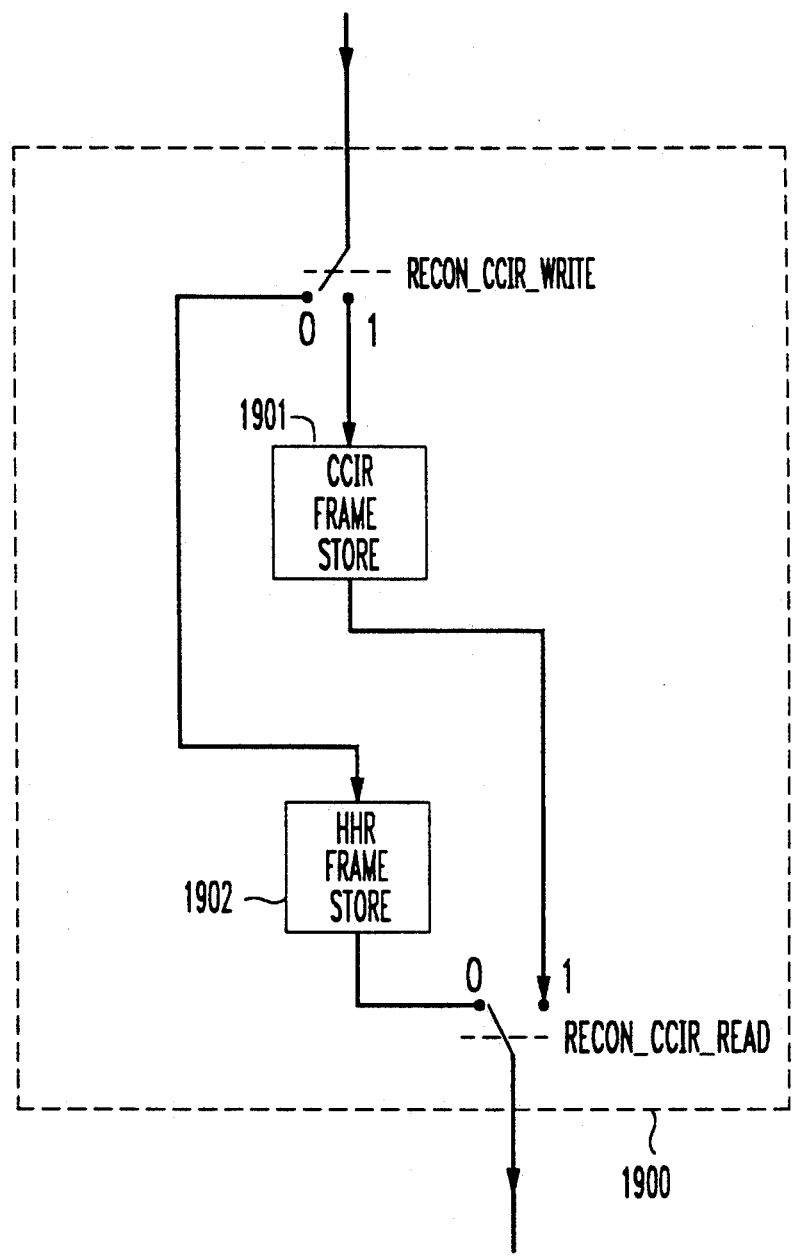
FIG. 19 shows, in simplified block diagram form, the internal architecture of a picture store within the encoder of FIGS. 16A, 16B and 16C.

FIG. 19 shows a simplified block diagram of a picture store (1900). One such store is employed for storing a previous picture, and another for storing a next picture within the adaptive picture encoder of FIG. 16. As shown, picture store 1900 contains a separate memory for CCIR-601 frames (1901) and HHR frames (1902). Picture store 1900 is configured to allow the storage and retrieval of pictures in response to read/write signals generated by read/write controller 1800. The recon—ccir—write and recon—ccir—read signals are set to "1" if the current video signal is CCIR.

If the current picture being processed by the adaptive picture encoder of FIGS. 16A, 16B and 16C is a P- or B-picture, motion estimator 1636 generates frame, single field, and dual field motion vectors based on the picture—type signal, and a comparison of the HHR macroblocks input on line 1601 with the decoded reference HHR images in next and previous picture stores 1630 and 1634. The single and dual field motion vectors are not necessary in this mode, and only the frame motion vectors are sent to frame MC predictor 1638. Frame MC predictor 1638 calculates predictions of the video on line 1601. The prediction output by frame MC predictor 1638 on line 1639 is passed to switch 1609 via switches 1640 and 1641 (dual/single—field—mc and s—t—comp are set to "0"). This completes the MPEG-1 encoding of an HHR frame slice.

As is shown in FIG. 15, the next slice to be encoded is a CCIR-601 frame slice. For CCIR-601 encoding all analyzers are enabled (i.e., all "dis—" signals generated by mode controller 1700 are set to "0") and all modes are employed. The hhr—slice signal generated by mode controller 1700 is set to "0". Differencer1610 subtracts either a prediction or "0" (in the case of intra-coding) from the incoming CCIR-601 signal, and outputs the result to block formatter 1611. Block formatter 1611 formats the received signal in frame block format (output on line 1612) and field block format (output on line 1613). Field/frame coding detector 1605 selects the field or frame formatted block that contains the higher line correlation, and generates the appropriate field/-frame—code to pass that block to DCT 1615, forward quantizer 1618, forward scanner 1623, and V/FWL encoder 1624. The bitstream from V/FWL encoder 1624 is fed to buffer 1621 for output to video multiplexer 1405 (FIG. 14).

The output of the forward scanner is locally decoded by inverse scanner 1625, inverse quantizer 1626, IDCT 1627, and block unformatter 1628. This decoded error signal is added to the prediction signal (evident at the negative input of differencer 1610) by summing element 1629. If an I- or P- picture is being encoded, switch 1631 is closed by read/write controller 1800 and the output of summing element 1629 is placed in next picture store 1630. Prior to encoding an I-or P- picture, the contents of next picture store 1630 are transferred to the previous picture store 1634 via write—prev switch 1635.

A temporal prediction is arrived at as follows. Motion estimator 1636 computes frame, single field, and dual field vectors based on the picture—type control signal, and a best match of the CCIR-601 macroblocks input on line 1601 with the decoded reference images in next and previous picture stores 1630 and 1634. The single and dual field motion vectors are sent to dual/single field MC predictor 1637, and the frame motion vectors are sent to frame MC predictor 1638. Both dual/single field MC predictor 1637 and frame MC predictor 1638 calculate temporal predictions of the video on line 1601. Dual/single field MCP analyzer 1603 selects either the dual or single field prediction, whichever has lower energy in the error signal, and generates the appropriate dual/single—field—mc signal to cause that prediction to be passed to switch 1640 via switch 1642. Field/frame MCP analyzer 1604 selects either the frame prediction from frame MC predictor 1638, or the field prediction provided by dual/single MCP analyzer 1603, whichever has lower energy in the error signal, and generates the appropriate field/-frame—mc signal to cause that prediction to be passed to switch 1641 via switch 1640.

When the current CCIR-601 frame slice uses compatible prediction (ccir—compat—slice="1") switch 1607 is closed and the reconstructed HHR slice stored in recon slice store 1632 is interpolated by horizontal interpolator 1633. The output of horizontal interpolator 1633, which is passed to switch 1641, provides a spatial prediction for the video input on line 1601.

Spatial/temporal prediction analyzer 1602 compares the interpolated HHR signal (spatial prediction) with the signal provided by switch 1640 (temporal prediction) to determine which signal gives a better estimate of the input video. Spatial/temporal prediction analyzer 1602 outputs a compatibility signal (s—t—comp) which controls switch 1641 and allows the best choice of spatial or temporal prediction to be passed to inter/intra analyzer 1608. Inter/intra analyzer 1608 then selects between intra-coding and inter-coding, and is to be used by comparing the variance of the signal on line 1601 to the variance of the inter prediction error signal computed using the prediction signal received via line 1617. An inter/intra signal is generated so as to cause switch 1609 to allow the appropriate signal corresponding to the lower of the two variances to be passed to differencer 1610. The inter/intra signal opens switch 1609 if intra-coding is selected, or closes it if inter-coding is selected. This completes the loop for coding CCIR-601 frame slice.

As discussed above, video multiplexer 1405 (FIG. 14) receives the bitstreams related to the HHR and CCIR-601 slices. Video multiplexer 1405 multiplexes these received signals and transmits them to video demultiplexer 1408 (FIG. 14), where they are demultiplexed and passed on to decoders 1409 and 1413 (FIG. 14).

Figure 20:
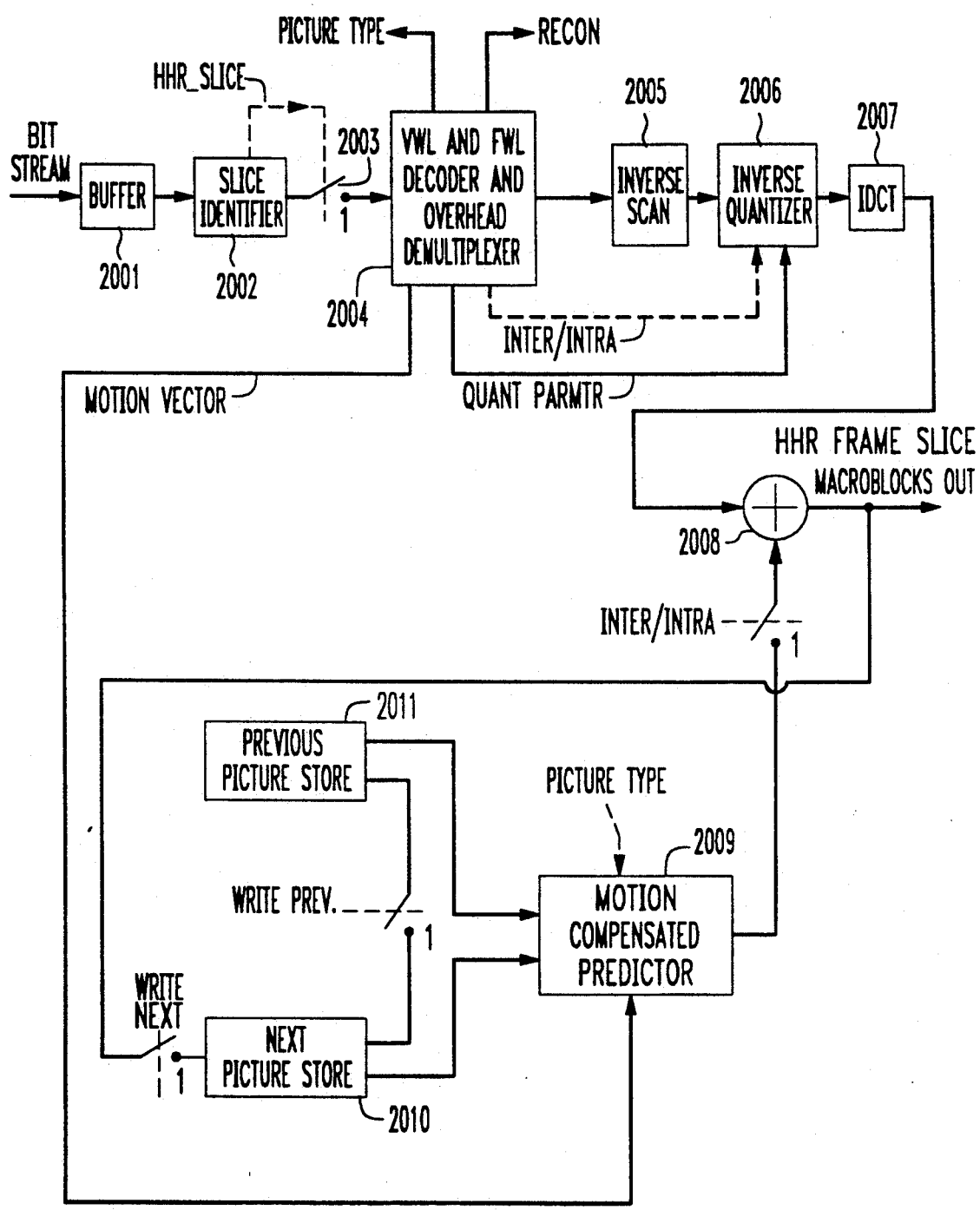
FIG. 20 shows, in simplified block diagram form, the internal architecture of a picture decoder which facilitates the decoding of a Half Horizontal Resolution ("HHR") digital video signal in accordance with the example of the invention illustrated in FIG. 14.

The internal architecture of a picture decoder which facilitates the decoding of the MPEG-1 HHR digital video signal encoded by the encoder of FIGS. 16A, 16B and 16C is shown in FIG. 20. This decoder includes buffer 2001, slice identifier 2002, switch 2003, V/FWL encoder 2004, inverse scanner 2005, inverse quantizer 2006, IDCT 2007, summing element 2008, motion compensated predictor 2009, next picture store 2010, and previous picture store 2011. The operation of this decoder is basically identical to that of the previously described MPEG-1 SIF odd decoder shown in FIG. 9. The primary difference being that components within this MPEG-1 HHR decoder are adapted to decode HHR frames as opposed to SIF odd fields. Switch 2003 responds to the hhr_slice signal generated by slice identifier 2002, just as switch 903 of the decoder of FIG. 9 responded to the sif_odd_slice signal.

Figure 21:
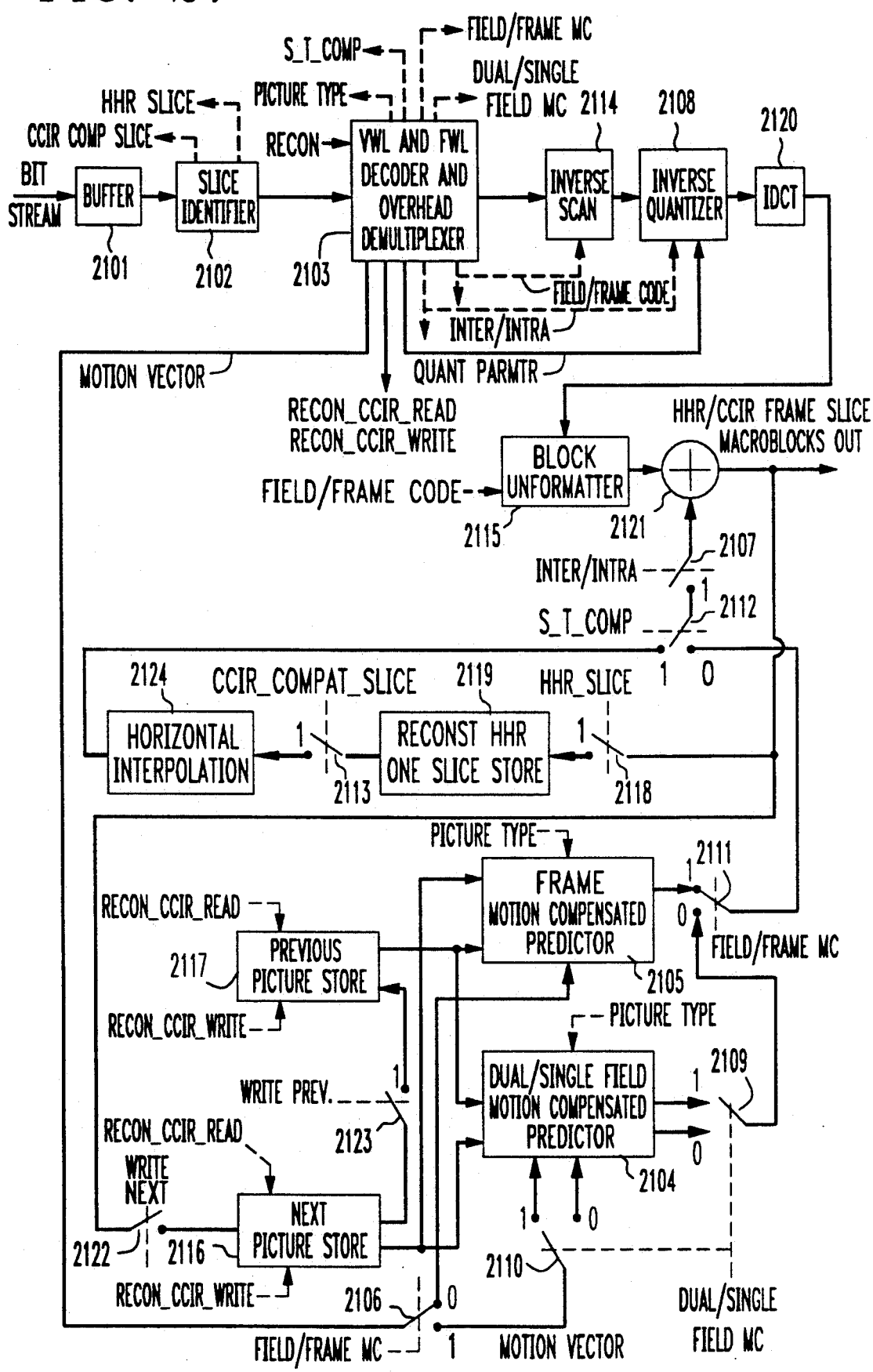
FIG. 21 shows, in simplified block diagram form, the internal architecture of a picture decoder which facilitates the decoding of HHR and CCIR-601 digital video signals in accordance with the example of the invention illustrated in FIG. 14.

FIG. 21 shows a simplified block diagram of the internal architecture of a picture decoder which facilitates the decoding of a CCIR-601 digital video signal encoded by the encoder of FIGS. 16A, 16B and 16C. This decoder is able to decode both HHR and CCIR-601 frame-structured layers. An incoming bitstream passes through buffer 2101 and slice identifier 2102. Slice identifier 2102 scans the bitstream for an hhr_slice_start_code. Upon finding this code, the hhr_slice signal is set to "1" (indicative of an HHR slice). Slice identifier 2102 also scans the bitstream for a ccir_compat_slice_start_code, and upon finding it sets the ccir_compat_slice signal is set to "1" (indicative of a CCIR-601 slice encoded using a compatible prediction). The bitstream is then passed to V/FWL decoder 2103. V/FWL decoder 2103 decodes the control signals and overhead data within the bitstream, including: the picture_type signal, which is sent to dual/single field MC predictor 2104 and frame MC predictor 2105; the motion vectors, which are sent to switch 2106; the inter/intra signal, which is sent to switch 2107 and inverse quantizer 2108; the quan_parmtr signal, which is sent to inverse quantizer 2108; the dual/single_field_mc signal, which controls switches 2109 and 2110; the field/frame_mc signal, which controls switches 2106 and 2111; the s_t_comp signal, which controls switch 2112; the ccir_compat_slice signal, which controls switch 2113; the field/frame_code signal, which is sent to inverse scanner 2114 and block unformatter 2115; and the recon_ccir_write, and recon_ccir_read signals which are sent to next and previous pictures stores 2116 and 2117. Since this decoder can decode both layers, the output may consist of HHR frames or CCIR-601 frames.

The decoding of HHR slices is performed by this decoder in primarily the same manner as in the decoder of FIG. 20, and will not be discussed in detail. However, the decoder of FIG. 21 performs one additional step in HHR decoding. When the current slice being decoded is an HHR slice, switch 2118 is closed and a reconstructed HHR slice is stored in recon slice store 2119. This stored slice will be used as a basis for spatial prediction.

The decoding of a CCIR-601 slice macroblock is performed when a ccir_compat_slice_start_code is detected by slice identifier 2102. Upon detection of this code the ccir_compat_slice signal is set to "1". In decoding a CCIR-601 slice macroblock, the V/FWL decoder outputs the coefficient related data of the encoded video to inverse scanner 2114, inverse quantizer 2108, IDCT 2120, and block unformatter 2115. The output of block unformatter 2115 is added, by summing element 2121, to a prediction signal received from switch 2107. The resulting decoded CCIR-601 slice macroblock is written into next picture store 2116 via write_next switch 2122 if it is an I- or P- picture. Before decoding of I- or P-picture, the contents of next picture store 2116 are transferred to previous picture store 2117 via the closing of write_prev switch 2123. By controlling switch 2106, the field/frame_mc signal directs the motion vectors output by V/FWL decoder 2103 to either frame MC predictor 2105 or dual/single field MC predictor 2104. If the motion vectors are routed to dual/single field MC predictor 2104, the dual/single_field_mc signal directs the motion vectors to the appropriate input of dual/single field MC predictor 2104. Dual/single field MC predictor 2104 then computes a prediction for the selected mode and passes that prediction to switch 2111. If the motion vectors are routed to frame/field MC predictor 2105, then frame/field MC predictor 2105 computes a prediction for the selected mode which is passed to switch 2111. Switch 2111 responds to the field/frame_mc signal to route the appropriate prediction to switch 2112.

Switch 2113 is closed for all CCIR-601 slices as they employ spatial prediction (indicated by a ccir_compat_slice signal of "1"). When switch 2113 is closed, the HHR slice in recon slice store 2119 is interpolated by horizontal interpolator 2124 and passed to switch 2112. Switch 2112 allows either the interpolated reconstructed HHR slice, or the estimate sent from switch 2111 to be used as a spatial prediction for the current CCIR-601 signal (depending upon the s_t_comp signal decoded by V/FWL decoder 2103). If an inter-coded picture is being decoded, switch 2107 passes the prediction to summing element 2121, where it is added to the signal output by block unformatter 2115. However, if the current picture being decoded is intra coded (inter/intra set to "0", and switch 2107 opened), a signal of zero is added to the reconstituted macroblock passing through summing element 2121.

Figure 22:
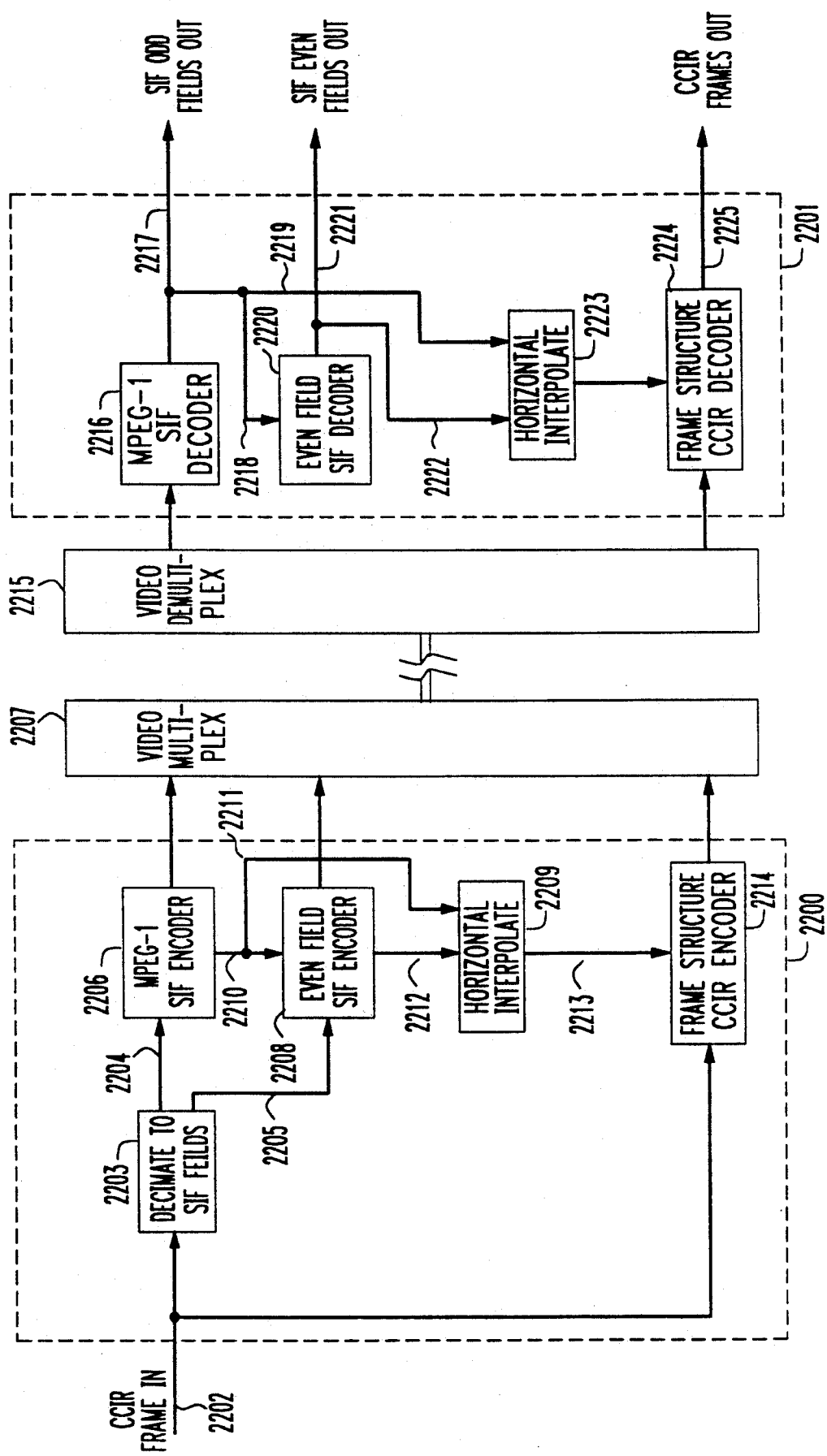
FIG. 22 shows, in simplified block diagram form, an illustration of a video signal encoding/decoding system which facilitates frame-based CCIR-601 and field based SIF encoding and decoding of a three-layer spatially scalable digital video signal in accordance with one example of this invention.

Yet another example of this invention is facilitated by the video signal encoding/decoding system illustrated in FIG. 22 which encodes and decodes of a digital video signal having three layers of spatial resolution. Signal encoding is performed within functional block 2200, and signal decoding is performed within functional block 2201. Layer 1 consists of MPEG-1 encoded SIF odd fields and produces an MPEG-1 compatible bitstream. Layer 2 consists of SIF even fields encoded using adaptive dual/single field motion compensated predictions. Layer 3 consists of CCIR-601 frame-structured pictures which are encoded using an adaptive choice of temporal prediction from previously decoded pictures of the same resolution, and a spatial prediction corresponding to a current temporal reference obtained by interpolating decoded SIF resolution layers 1 and 2. Since layer 3 is frame-structured, it may use adaptive frame/dual/single field prediction modes for temporal prediction.

As shown in FIG. 1, CCIR-601 digital video signals are input to functional block 2200 via line 2202. The digital video signal received on line 2202 is decimated to SIF video by SIF decimator 2203 for the encoding of layers 1 and 2. SIF decimator 2203 outputs decimated odd numbered horizontal rows via line 2204, and even numbered horizontal rows via line 2205. The odd horizontal rows comprise an odd video field, the even horizontal rows comprise an even video field. The SIF odd fields are directed to MPEG-1 SIF encoder 2206, where they are encoded and sent as a bitstream to video multiplexer 2207 (this encoded bitstream corresponds to the first video layer). MPEG-1 SIF 2206 encoder also outputs a decoded SIF odd signal to even field SIF encoder 2208 and horizontal interpolator 2209 via lines 2210 and 2211, respectively. Even field SIF encoder 2208 encodes the SIF even fields into a bitstream (corresponding to the second video layer) which is output to video multiplexer 2207. Even field SIF encoder 2208 also outputs a decoded SIF even signal to horizontal interpolator 2209 via line 2212. Horizontal interpolator 2209 up-samples the odd and even fields received from encoders 2206 and 2208 to CCIR-601 resolution. This up-sampled signal is output via line 2213 to frame-structure CCIR-601 encoder 2214, where it is used for obtaining a spatial prediction of the third video layer. Frame-structure CCIR-601 encoder 2214 encodes the CCIR-601 frames of the digital video signal received via line 2202, with a block-wise adaptive selection between temporal and spatial predictions. The resulting encoded bitstream (corresponding to the third video layer) is output by frame-structure CCIR-601 encoder 2214 to video multiplexer 2207.

Video multiplexer 2207 multiplexes the three encoded bitstreams into a single bitstream. This single bitstream is transmitted to video demultiplexer 2215 where it is demultiplexed into three individual bitstreams, one for each of the three video layers. MPEG-1 SIF decoder 2216 decodes the bitstream corresponding to the first video layer, thereby reconstructing an SIF odd field video signal which is output on lines 2217, 2218, and 2219. Even field SIF decoder 2220 decodes the bitstream corresponding to the second video layer (employing an optional block-wise prediction based upon the SIF odd fields decoded by MPEG-1 SIF decoder 2216). This yields an SIF even field video signal which is output on lines 2221 and 2222. This SIF even field video may be re-interlaced with the SIF odd field video output by MPEG-1 SIF decoder 2216 to obtain HHR resolution. Horizontal interpolator 2223 up-samples the odd and even fields received from decoders 2216 and 2220 to CCIR-601 resolution. Frame-structured CCIR-601 decoder 2224 decodes the bitstream corresponding to the third video layer (employing an optional spatial prediction based upon the interpolated decoded SIF odd and even fields from layers one and two) to reconstitute a CCIR-601 video signal which is output on line 2225.

Figure 23:
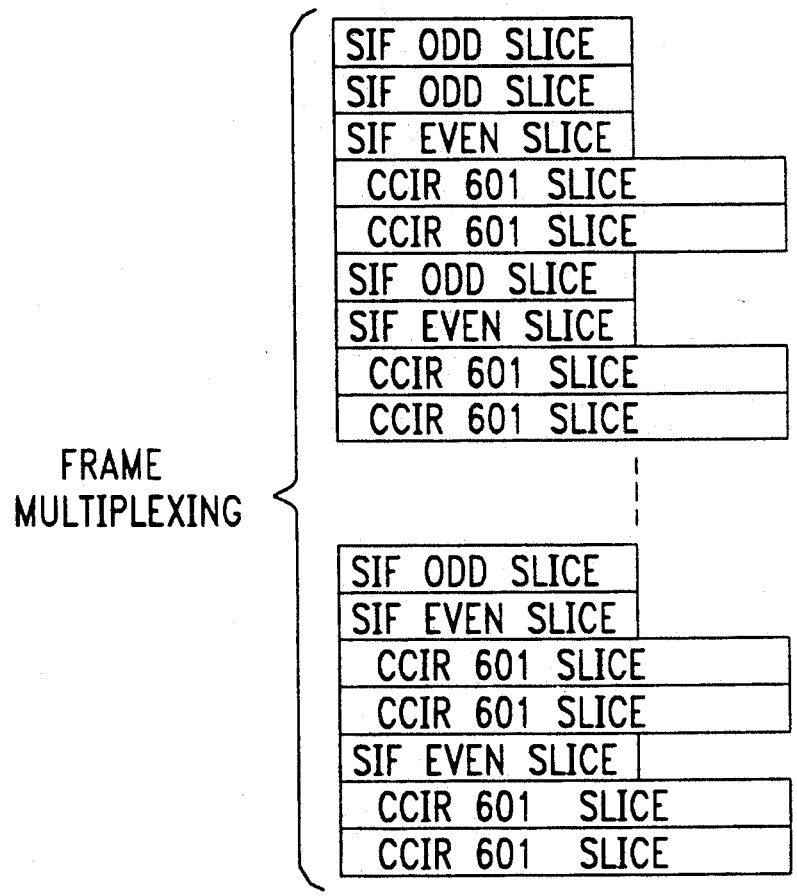
FIG. 23 is a pictorial representation of the slice structure employed in the three-layer spatially scalable digital video encoding performed in accordance with the example of the invention illustrated in FIG. 22.

A representation of the slice structure employed in the encoding performed within functional block 2200 of FIG. 22 is shown in FIG. 23. The frame-structure coding of layer 3 requires odd and even fields of a frame to be presented to the encoder at the same time (as opposed to one field after another). Therefore, the SIF odd and even field slices have to be coded and multiplexed alternately. The CCIR-601 slices are frame slices; i.e., each slice contains lines from both odd and even fields. The SIF odd fields are coded referencing SIF odd fields only (MPEG-1), but the SIF even fields are coded referencing both SIF odd and even fields for temporal prediction. To encode a SIF even slice, three contiguous SIF odd slices must be available to cover the motion range required for temporal prediction of the SIF even slice. This necessitates encoding two SIF odd slices at the start of each frame. Encoding of the first SIF even slice within a frame requires only two reconstructed odd slices. The two SIF odd slices and one SIF even slice provide enough reconstructed data for the spatial prediction of two corresponding CCIR-601 frame slices. Following the encoding of the two CCIR-601 frame slices, one SIF odd slice is encoded, which together with the two previous SIF odd slices provides enough temporal reference for the second SIF even slice. The second SIF odd and even slices can be used for spatial prediction for the third and fourth CCIR-601 frame slices. At this point in the frame, the slice pattern of SIF odd/SIF even/CCIR-601 frame/CCIR-601 frame is repeated until the end of the frame is reached. However, there is a slight irregularity in this pattern at the very end of a frame. Within the final set of slices in a frame the SIF odd slice is omitted. This compensates for the two contiguous SIF odd slices which were are encoded at the beginning of each frame.

Figure 24A:
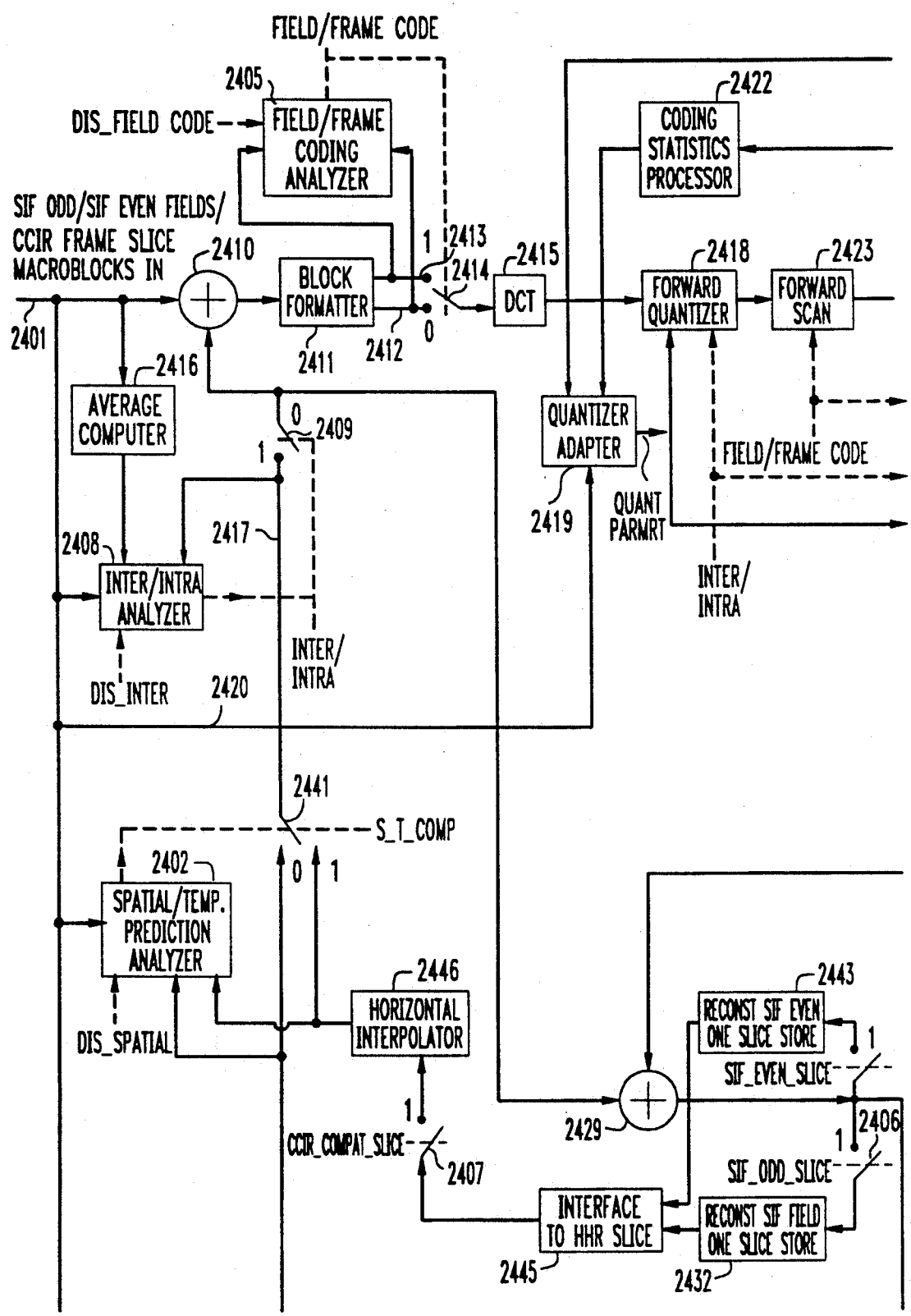
FIGS. 24A, 24B and 24C show, in simplified block diagram form, the internal architecture of a picture encoder which facilitates the encoding of a three-layer spatially scalable digital video signal in accordance with the example of the invention illustrated in FIG. 22.

Although FIG. 22 shows three separate encoders being employed to accomplish the encoding of the three video layers, the encoding for all three layers may be accomplished sequentially within a single adaptive encoder. FIGS. 24A, 24 and 24C shows a simplified block diagram of the internal architecture of one example of such an adaptive picture encoder. As this encoder must perform three distinctly different types of encoding, certain analyzers and sub-systems within it must be enabled and disabled as a function of the particular type of encoding being performed at a given time. This enabling/disabling is performed as function of control signals generated by a mode controller. Mode controller 2500, shown in FIG. 25, generates the signals to control the mode of operation for the encoder of FIGS. 24A, 24B and 24C. Mode controller 2500 receives the same input signals as previously described mode controllers 500 and 1700. The output of mode controller 2500 provides bi-level ("0" or "1") control signals including: sif_odd_slice ("1" when the current slice is from an SIF odd field); sif_even_slice ("1" when the current slice is from an SIF even field); ccir_compat_slice ("1" when current slice is of CCIR-601 resolution and uses a compatible prediction); and bypass control signals dis__inter, dis_spatial, dis_dual, dis_field_mc, and dis__field_code (which disable specific modes in the inter-/intra, spatial/temporal prediction, dual/single field prediction, and field/frame prediction analyzers, and a field/frame coding detector).

Figure 24B:
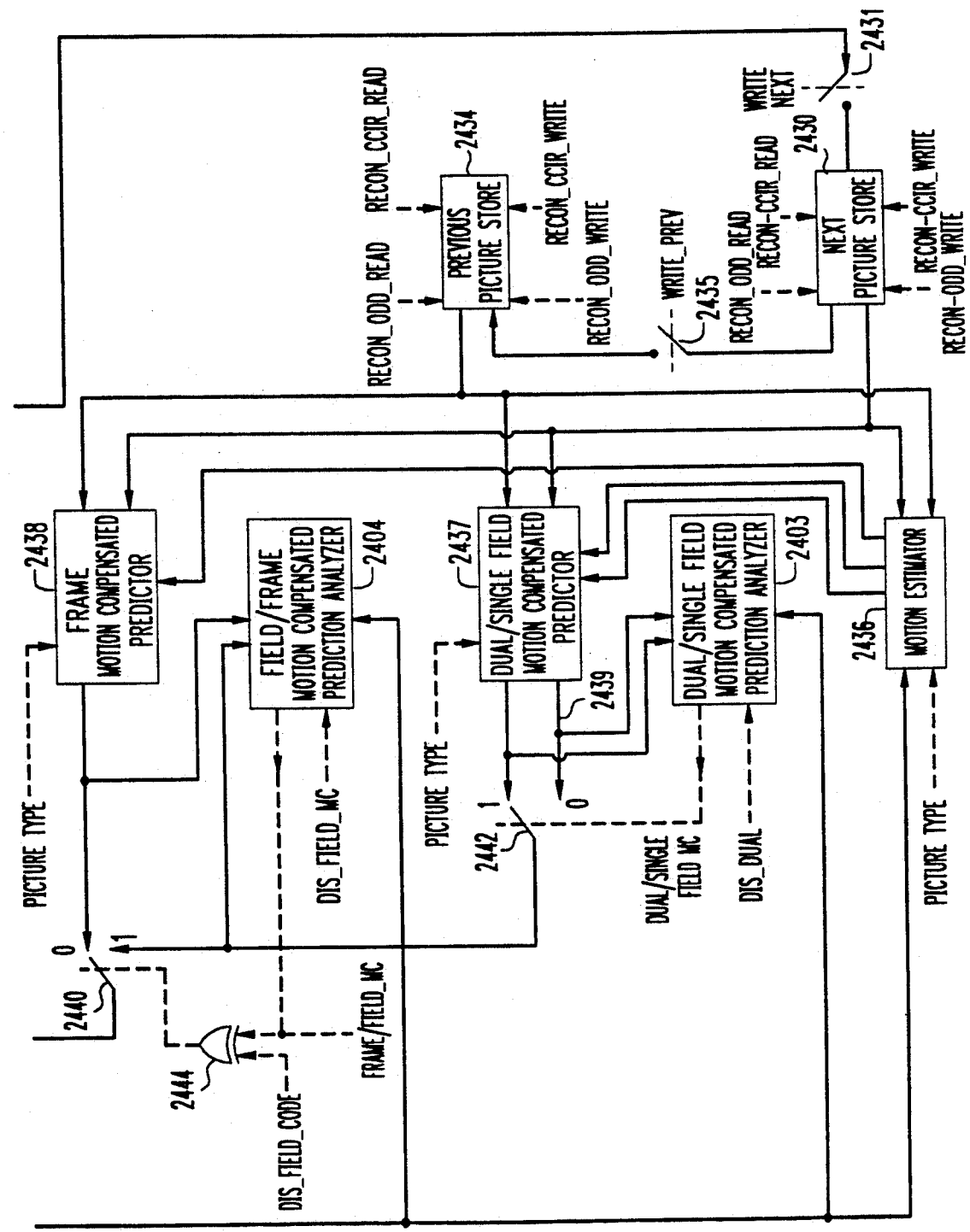
Figure 24C:
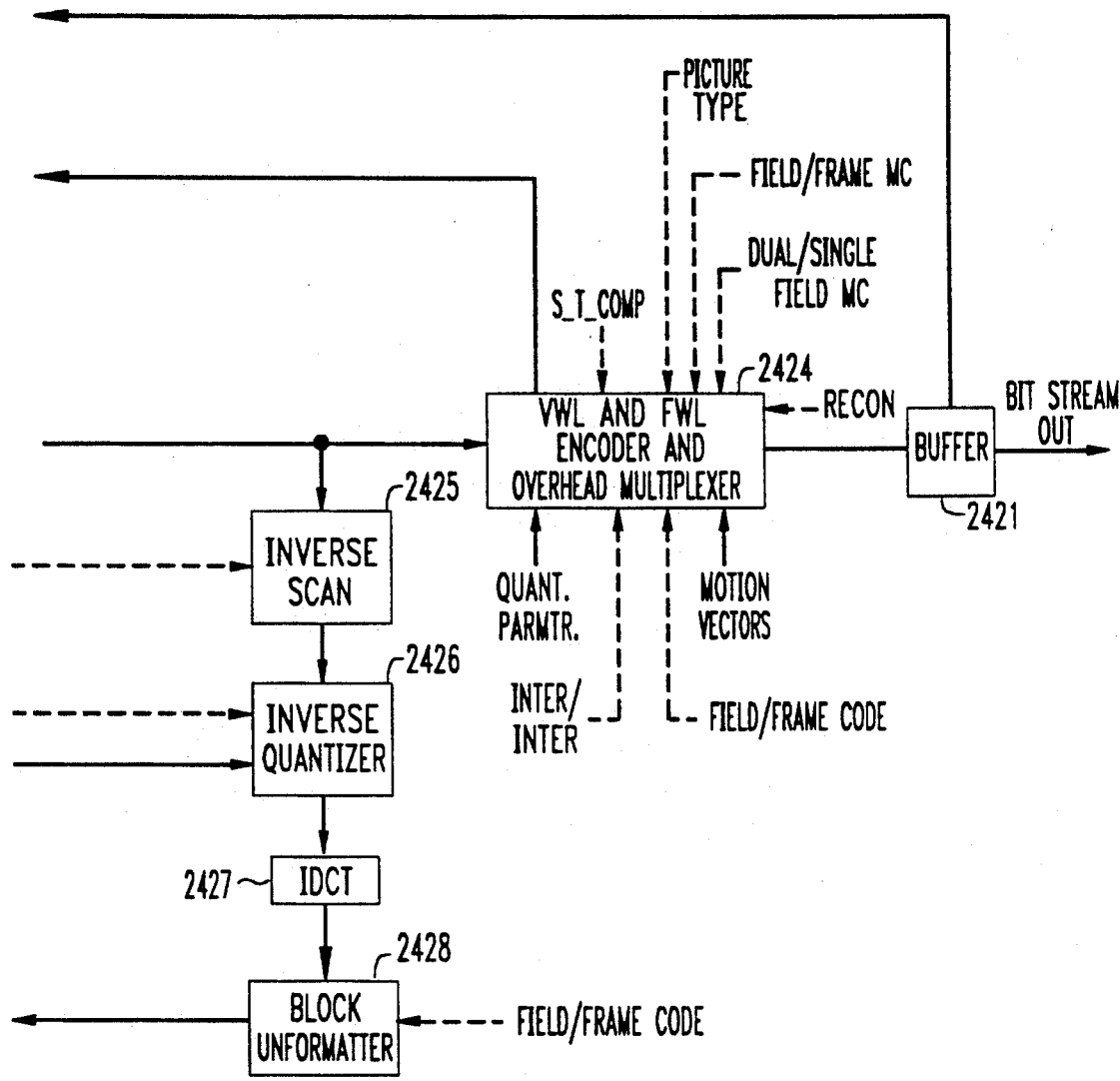
Figure 24D:
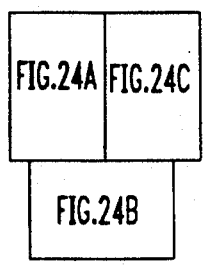
FIG. 24D illustrates the manner in which FIGS. 24A, 24B and 24C may be mated to obtain a full simplified block diagram of the internal architecture of a picture encoder which facilitates the encoding of a three-layer spatially scalable digital video signal in accordance with the example of the invention illustrated in FIG. 22.
Figure 25:
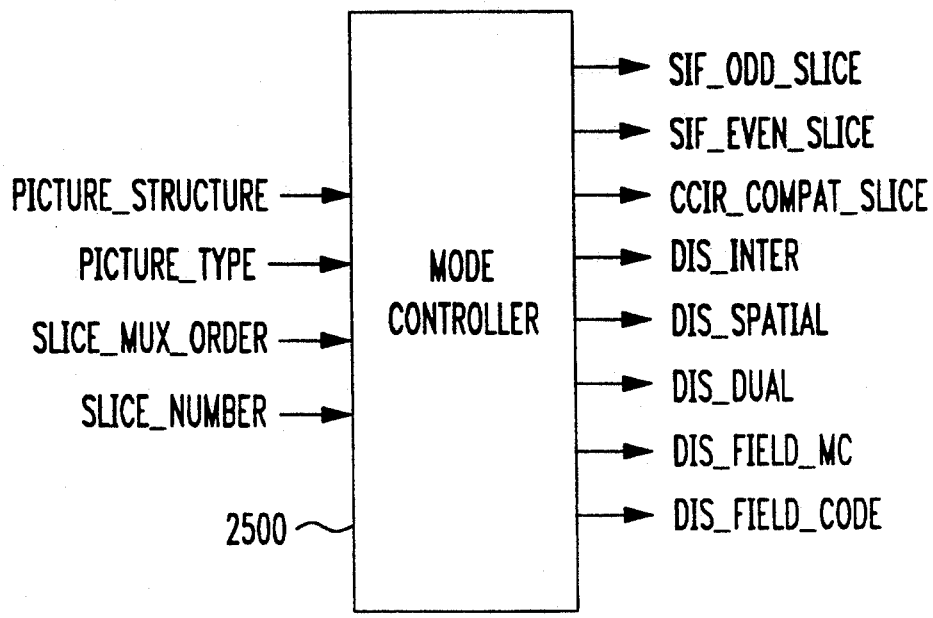
FIG. 25 shows, in simplified block diagram form, a mode controller for the encoder of FIGS. 24A, 24B and 24C.

In performing the MPEG-1 SIF odd encoding (layer 1), the SIF odd macroblocks output by decimator 2203 (FIG. 22) are received by the adaptive picture encoder of FIGS. 24A, 24B and 24C via line 2401. As MPEG-1 encoding does not use spatial prediction, dual-field prediction, frame prediction, or field coding, mode controller 2500 sets the dis_spatial, dis_dual, and dis_field_code signals to "1". This effectively disables spatial/- temporal prediction analyzer 2402, dual/single field MCP analyzer 2403, field/frame MCP analyzer 2404, and places field/frame coding detector 2405 in a frame mode. As a result, the compatibility signal ("s_t_comp"), the dual/single field motion compensation signal ("dual/single_field_mc"), and the field/frame motion compensation signal ("field/frame_mc") are set to zero. In addition, the sif_odd_slice signal is set to "1", and the ccir_compat_slice signal is set to "0" by mode controller 2500. Respectively, these signals cause switch 2406 to close and switch 2407 to open.

If the current picture is an I-picture, mode controller 2500 outputs a dis_inter bypass control signal of "1", thereby disabling inter/intra analyzer 2408 so that it outputs a "0" inter/intra signal. This causes switch 2409 to remain open so that different 2410 receives a prediction signal of zero at its negative input. As a result, the input video signal on line 2401 is passed, unaltered, through differencer 2410 to block formatter 2411. Block formatter 2411 formats the received signal in frame block format (output on line 2412) and field block format (output on line 2413). Since field/frame_code signal is set to "0" switch 2414 is placed in contact with line 2412, and the frame block formatted signal is passed to DCT 2415. If the current picture is not an I-picture, inter/intra analyzer 1608 is not disabled, but rather employed to calculate the inter-coding prediction error and intra-coding error variances. Intra-coding error variance is calculated by comparing the square of the difference between the original video signal (received on line 2401) and a signal representing the average energy of the original video signal (the average energy is computed by average computer 2416). Inter-coding prediction error variance is calculated by computing the square of the difference between the original video signal and an inner prediction signal received via line 2417. An inter/intra signal is generated so as to select whichever of these computed variances represents the smaller energy. The resulting inter/intra signal controls switch 2409 and determines what differencer 2410 will subtract from the video signal on line 2401 before the signal is passed to block formatter 2411.

DCT 2415 converts each 8×8 block into an 8×8 matrix of transform coefficients and passes the coefficients along to forward quantizer 2418. Forward quantizer 2418 quantizes each coefficient based on whether the current macroblock is intra or inter coded, and a quant-parmtr signal. This quant-parmtr signal is determined in light of the characteristics of the digital input signal communicated to quantizer adapter 2419 via line 2420, the fullness of buffer 2421, and in light of coding statistics compiled by coding statistics processor 2422. The quantized coefficients are forward scanned by forward scanner 2423 and passed to V/FWL encoder 2424. V/FWL encoder 2424 encodes the quantized data and outputs it as a data within the output bitstream, including: the quant-parmtr signal, the single bitstream to buffer 2421.

In addition to transmitting encoded transform coefficients, V/FWL encoder 2424 also encodes and transmits a number of control signals and overhead data within the output bitstream, including: the quant-parmtr signal, the inter/intra signal, motion vectors, the picture_type signal, the s_t_comp signal, the dual/single_field_mc signal, the field/frame_mc signal, the field/frame_code signal, and recon_signals (which are employed in the decoding of the bitstream and will be discussed later). The V/FWL Encoder also provides coding statistics information to coding statistics processor 2422. Buffer 2421 outputs the received bitstream at the appropriate rate for acceptance by video multiplexer 2207 (FIG. 22).

The SIF odd slice is locally decoded within the adaptive decoder of FIGS. 24A, 24B and 24C via inverse scanner 2425, inverse quantizer 2426, IDCT 2427, and block unformatter 2428. The decoded signal is added by summing element 2429 to the prediction signal (evident at the negative input of differencer 2410). The resulting signal is written to next picture store 2430 via write_next switch 2431 (if it is an I- or a P- picture), and to reconstructed SIF odd two-slice store ("odd slice store") 2432 via switch 2406. Odd slice store 2432 has to be capable of storing two SIF odd slices because at the beginning of every new frame, two odd slices must be encoded before they are used for spatial prediction of the CCIR-601 layer. Before the encoding of an I- or P-picture, the contents of next picture store 2430 are transferred to previous picture store 2434 via write_prev switch 2435.

Figure 26:
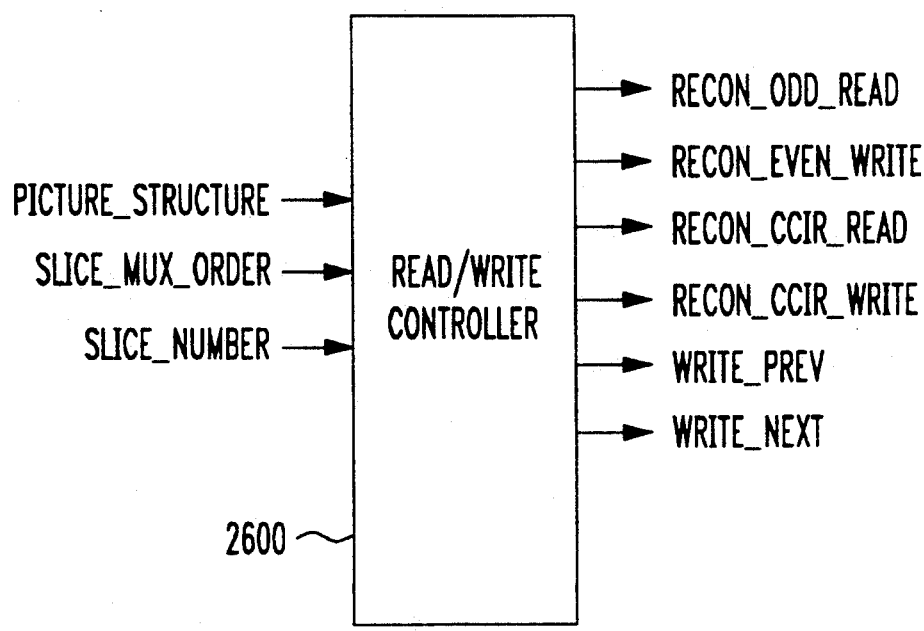
FIG. 26 shows, in simplified block diagram form, a read/write controller for the encoder of FIGS. 24A, 24B and 24C.

The states of write_next switch 2431 and write_prev switch 2435 are controlled by read/write controller 2600 (FIG. 26). An independently running processor (not shown) provides read/write controller 2600 with the following input signals: picture_structure; slice_mux_order; and slice_number. The output of read/write controller 2600 provides bi-level ("0" or "1") control signals including: write_prev and write_next signals (which enable writing to previous and next picture stores); recon_odd_write and recon_odd_read (which allow the storage and retrieval of reconstructed SIF odd fields within previous and next picture stores); and recon_ccir_write and recon_ccir_read (which allow the storage and retrieval of reconstructed CCIR-601 frames within previous and next picture stores).

Figure 27:
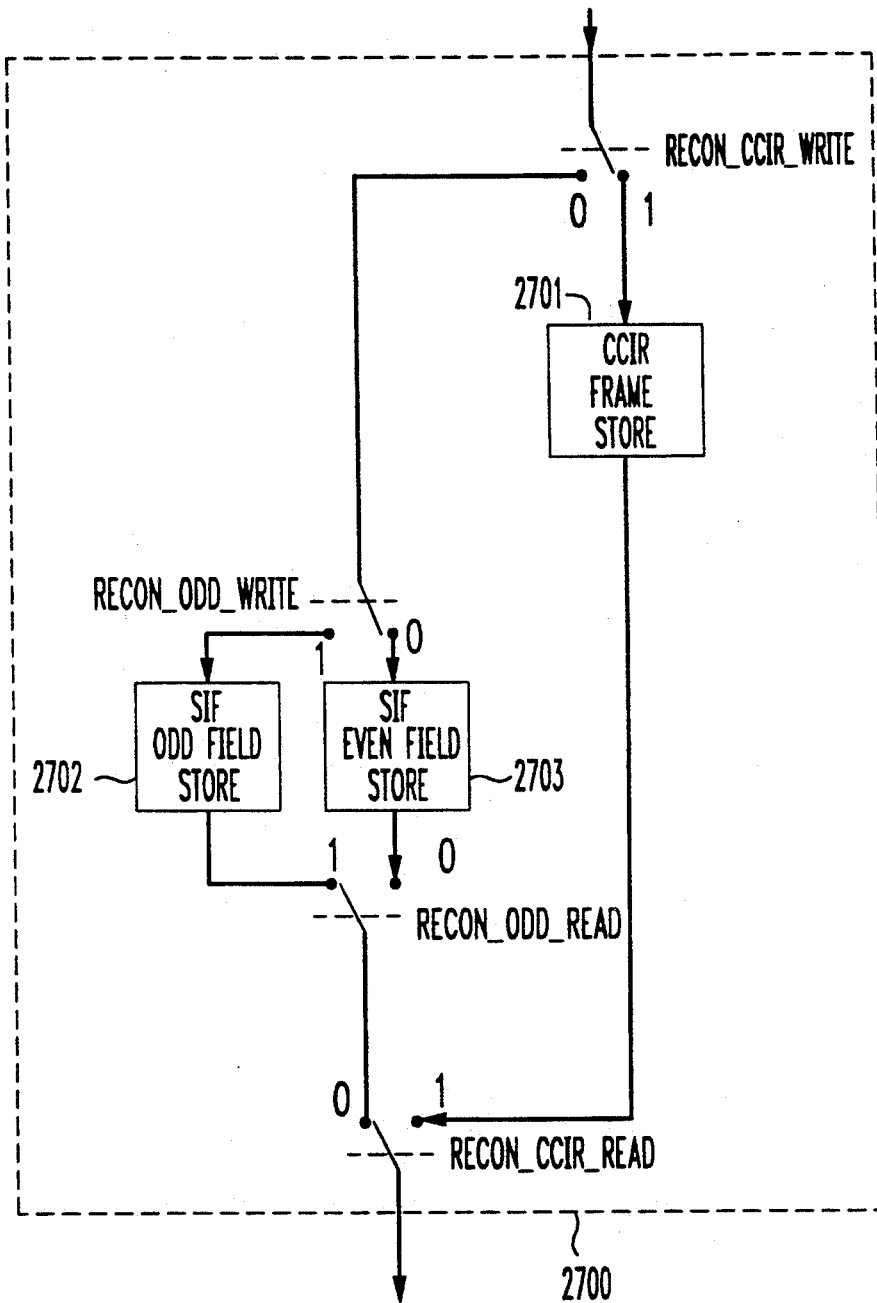
FIG. 27 shows, in simplified block diagram form, the internal architecture of a picture store within the encoder of FIGS. 24A, 24B and 24C.

FIG. 27 shows a simplified block diagram of a picture store (2700). One such store is employed for storing a previous picture, and another for storing a next picture within the adaptive picture encoder of FIGS. 24A, 24B and 24C. As shown, picture store 2700 contains separate memories for CCIR-601 frames (2701), SIF odd fields (2702), and SIF even fields (2703). Picture store 2700 is configured to allow the storage and retrieval of pictures in response to read/write signals generated by read/write controller 2600. The recon_ccir_write and recon_ccir_read signals are set to "1" if the current video signal is CCIR, otherwise they are set to "0". Likewise, the recon_odd_write and recon_odd_read signals are set to "1" if the current video signal is SIF odd, otherwise they are set to "0".

If the current picture being processed by the adaptive picture encoder of FIGS. 24A, 24B and 24C is a P- or B-picture, motion estimator 2436 generates frame, single field, and dual field motion vectors based on the picture_type signal, and a comparison of the SIF odd macroblocks input on line 2401 with the decoded reference images in next and previous picture stores 2430 and 2434. The single and dual field motion vectors are sent to dual/single field MC predictor 2437, and the frame motion vectors are sent to frame MC predictor 2438. Both dual/single field MC predictor 2437 and frame MC predictor 2438 calculate predictions of the video on line 2401. However, only the prediction output by dual/single field MC predictor 2437 on line 2439 is passed to switch 2409 via switches 2442, 2440 and 2441 (dis_dual and dis_field_code being set to "1", and s_t_comp being set to "0"). This completes the MPEG-1 encoding of an SIF odd slice. Although, at the beginning of a frame, this encoding would be repeated, as the encoding of two successive SIF odd slices would be required.

The SIF even encoding performed by the encoder of FIGS. 24A, 24B and 24C is very similar to that described above for the SIF odd slices. The primary difference between the two encoding processes is that the sif_even_slice signal is set to "1", and the sif_odd_slice signal is set to "0" by mode controller 2500. As a result, the signal output by summing element 2429 is written to next picture store 2430 via write_next switch 2431, and to reconstituted SIF even one-slice store ("even slice store") 2443 via switch 2406.

Upon completion of the encoding of the SIF odd and SIF even slices, a CCIR-601 frame slice is encoded. For CCIR-601 encoding all analyzers are enabled (i.e., all "dis_" signals generated by mode controller 2500 are set to "0") and all modes are employed. The sif_odd_slice and sif_even_slice signals generated by mode controller 2500 are set to "0". Differencer 2410 subtracts either a prediction or "0" (in the case of intra-coding) from the incoming CCIR-601 signal on line 2401, and outputs the result to block formatter 2411. Block formatter 2411 formats the received signal in frame block format (output on line 2412) and field block format (output on line 2413). Field/frame coding detector 2405 selects the field or frame formatted block that contains the higher line correlation, and generates the appropriate field/frame_code to pass that block to DCT 2415, forward quantizer 2418, forward scanner 2423, and V/FWL encoder 2424. The bitstream from V/FWL encoder 2424 is fed to buffer 2421 for output to video multiplexer 2207 (FIG. 22).

The output of the forward scanner is locally decoded by inverse scanner 2425, inverse quantizer 2426, IDCT 2427, and block unformatter 2428. This decoded error signal is added to the prediction signal (evident at the negative input of differencer 2410) by summing element 2429. If an I- or P- picture is being encoded, switch 2431 is closed by read/write controller 2600 and the output of summing element 2429 is placed in next picture store 2430. Prior to encoding an I- or P- picture, the contents of next picture store 2430 are transferred to the previous picture store 2434 via write_prev switch 2435.

A temporal prediction is arrived at as follows. Motion estimator 2436 computes frame, single field, and dual field vectors based on the picture_type signal, and a comparison of the CCIR-601 macroblocks input on line 2401 with the decoded reference images in next and previous picture stores 2430 and 2434. The single and dual field motion vectors are sent to dual/single field MC predictor 2437, and the frame motion vectors are sent to frame MC predictor 2438. Both dual/single field MC predictor 2437 and frame MC predictor 2438 calculate predictions of the video on line 2401. Dual/single field MCP analyzer 2403 selects either the dual or single field prediction (whichever contains a lower energy in the error signal), and generates the appropriate dual/-single_field_mc signal to cause that prediction to be passed to switch 2440 via switch 2442. Field/frame MCP analyzer 2404 selects either the frame prediction from frame MC predictor 2438, or the best of the field predictions provided by dual/single MCP analyzer 2403 (whichever contains a lower energy in the error signal), and generates the appropriate field/frame_mc signal to cause that prediction to be passed to switch 2441 via switch 2440. As the dis_field_code signal is set to "0" by mode controller 2500, the frame_field_mc signal output by field/frame MCP analyzer 2404 will determine the output of OR-gate 2444, and therefore the state of switch 2440.

When the current CCIR-601 frame slice uses compatible prediction (ccir_compat_slice="1") switch 2407 is closed and a reconstructed HHR slice from HHR interleaver 2445 is passed to horizontal interpolator 2446. HHR interleaver 2445 constructs this HHR slice from the contents of odd slice store 2432 and even slice store 2443. The output of horizontal interpolator 2446, which is passed to switch 2441 and spatial/temporal prediction analyzer 2402, provides a spatial prediction for the video input on line 2401.

Spatial/temporal prediction analyzer 2402 compares the interpolated HHR signal (spatial prediction) with the signal provided by switch 2440 (temporal prediction) to determine which signal gives a better estimate of the input video. Spatial/temporal prediction analyzer 2402 outputs a compatibility signal (s_t_comp) which controls switch 2441 and allows the best estimate to be passed to inter/intra analyzer 2408. Inter/intra analyzer 2408 then selects between intra-coding and inter-coding, and by computing the variance of the signal on line 2401 and the variance of the inter prediction signal received via line 2417. An inter/intra signal is generated so as to cause switch 2409 to allow whichever of the best prediction to be passed to differencer 2410. The inter/intra signal opens switch 2409 if intra-coding is selected, or closes it if inter-coding is selected. This completes the loop for coding CCIR-601 frame slice. However, since odd slice store 2432 and even slice store 2443 contain enough data for spatially predicting two CCIR-601 frame slices, two CCIR-601 slices are consecutively encoded before encoding of the next SIF odd slice.

As discussed above, video multiplexer 2207 (FIG. 22) receives the bitstreams related to the SIF odd, SIF even and CCIR-601 slices. Video multiplexer 2207 multiplexes these received signals and transmits them to video demultiplexer 2215 (FIG. 22) where they are demultiplexed and passed on to decoders 2216, 2220, and 2224 (FIG. 22).

The decoding of the SIF odd slices encoded by the encoder of FIGS. 24A, 24B and 24C is performed by decoder 2216 (FIG. 22). As both the configuration and operation of this decoder are identical to that of the decoder illustrated in FIG. 9, the specifics of this decoding will not be discussed. Likewise, since the configuration and operation of SIF even decoder 2220 are identical to that of the decoder illustrated in FIG. 10, a detailed discussion of the operation of decoder 2220 is unnecessary.

Figure 28:
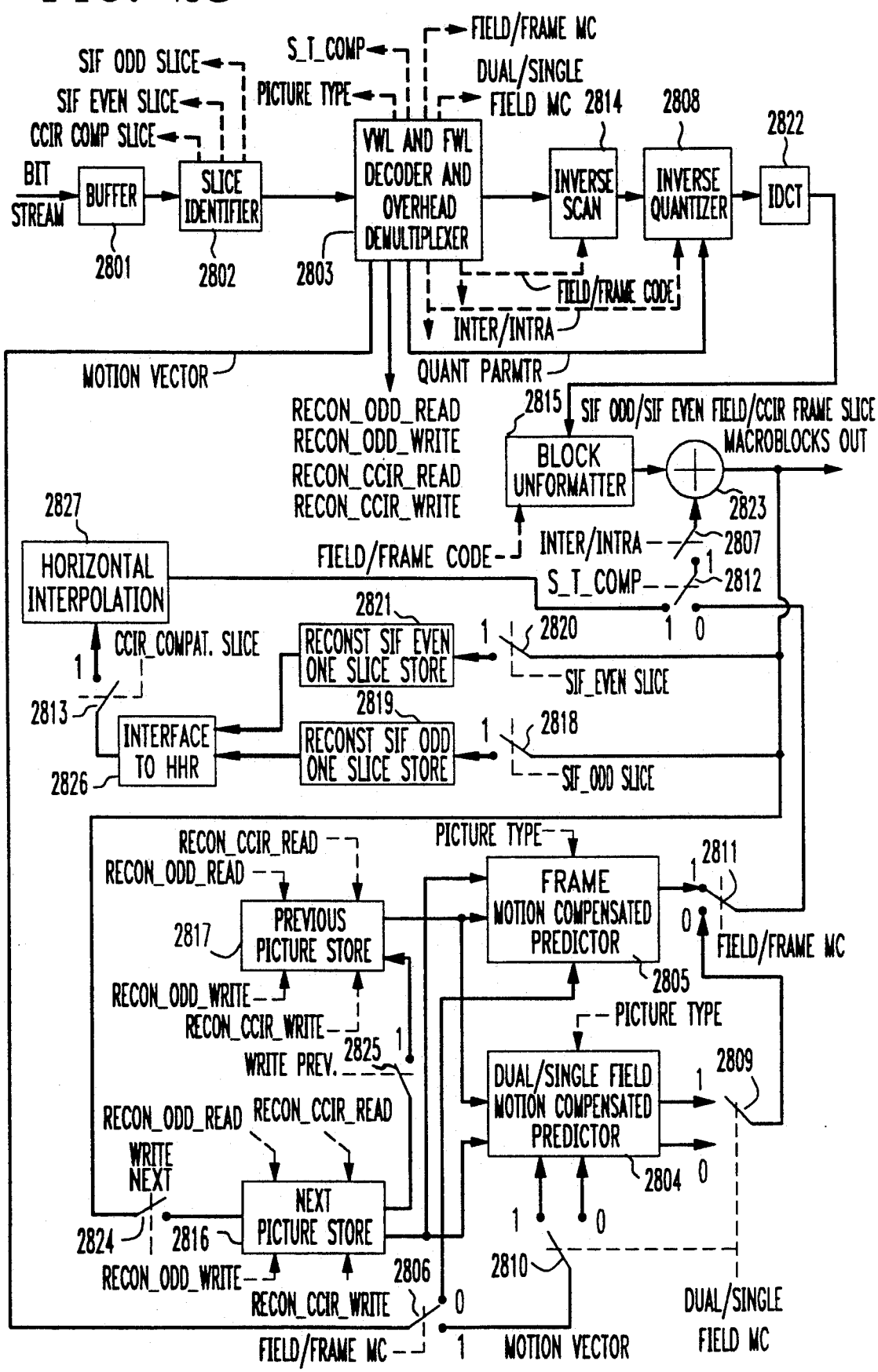
FIG. 28 shows, in simplified block diagram form, the internal architecture of a picture decoder which facilitates the decoding of CCIR-601, SIF odd, and SIF even digital video signals in accordance with the example of the invention illustrated in FIGS. 24A, 24B and 24C.

FIG. 28 shows a simplified block diagram of the internal architecture of a picture decoder which facilitates the decoding of a CCIR-601, SIF odd, and SIF even digital video signals encoded by the encoder of FIGS. 24A, 24B and 24C. An incoming bitstream passes through buffer 2801 and slice identifier 2802. Slice identifier 2802 scans the bitstream for an sif_odd_slice_start code and an sif_even_slice_start_code. Upon finding these codes, the sif_odd_slice signal is set to "1" (indicative of an SIF odd slice) and the sif_even_slice signal is set to "1" (indicative of an SIF even slice). Slice identifier 2802 also scans the bitstream for a ccir_compat_slice_start_code. Upon finding this code the ccir_compat_slice signal is set to "1" (indicative of a CCIR-601 slice encoded using a compatible prediction).

The bitstream is then passed to V/FWL decoder 2803. V/FWL decoder 2803 decodes the control signals and overhead data within the bitstream, including: the picture_type signal, which is sent to dual/single field MC predictor 2804 and frame MC predictor 2805; the motion vectors, which are sent to switch 2806; the inter/intra signal, which is sent to switch 2807 and inverse quantizer 2808; the quan_parmtr signal, which is sent to inverse quantizer 2808; the dual/single_field_mc signal, which controls switches 2809 and 2810; the field/frame_mc signal, which controls switches 2806 and 2811; the s_t_comp signal, which controls switch 2812; the ccir_compat_slice signal, which controls switch 2813; the field/frame_code signal, which is sent to inverse scanner 2814 and block unformatter 2815; and the recon_odd_write, recon_odd_read, recon_ccir_write, and recon_ccir_read signals which are sent to next and previous pictures stores 2816 and 2817.

The decoding of SIF odd and even slices is performed by this decoder in primarily the same manner as in the decoders of FIGS. 9 and 10, respectively, and will not be discussed in detail. However, the decoder of FIG. 28 performs an additional step in SIF odd and even decoding. When the current slice being decoded is an SIF odd slice, switch 2818 is closed and reconstruction of the SIF odd slice is stored in reconstituted SIF odd two-slice store ("odd slice store") 2819. When the current slice being decoded is an SIF even slice, switch 2820 is closed and a reconstruction of the SIF even slice is stored in reconstituted SIF even slice store ("even slice store") 2821. These stored slices will be used as a basis for spatial prediction.

The decoding of a CCIR-601 slice macroblock is performed when a ccir_compat_slice_start_code is detected by slice identifier 2802 (ccir_compat_slice is set to "1"). In decoding a CCIR-601 slice macroblock, the bitstream is passed through inverse scanner 2814, inverse quantizer 2808, IDCT 2822, and block unformatter 2815. The output of block unformatter 2815 is added, by summing element 2823, to a prediction signal received from switch 2807. The resulting decoded CCIR-601 slice macroblock is written into next picture store 2816 via write_next switch 2824 if it is an I- or a P- picture. Before decoding of I- or P-picture, the contents of next picture store 2816 are transferred to previous picture store 2817 via the closing of write_prev switch 2825. By controlling switch 2806, the field/frame_mc signal directs the motion vectors output by V/FWL decoder 2803 to either frame MC predictor 2805 or dual/single field MC predictor 2804. If the motion vectors are routed to dual/single field MC predictor 2804, the dual/single_field_mc signal directs the motion vectors to the appropriate input of dual/single field MC predictor 2804. Dual/single field MC predictor 2804 then computes a prediction for the selected mode and passes that prediction to switch 2811. If the motion vectors are routed to frame/field MC predictor 2805, then frame/field MC predictor 2805 computes a prediction for the selected mode which is passed to switch 2811. Switch 2811 responds to the field/frame_mc signal to route the appropriate prediction to switch 2812.

Switch 2813 is closed for all CCIR-601 slices which employ spatial prediction (indicated by a ccir_compat_slice signal of "1"). When switch 2813 is closed, a reconstructed HHR slice from HHR interleaver 2826 is passed to horizontal interpolator 2827. HHR interleaver 2826 constructs this HHR slice from the contents of odd slice store 2819 and even slice store 2821. The output of horizontal interpolator 2827, which is passed to switch 2812, provides a spatial prediction for the video input to buffer 2801. Switch 2812 allows either the interpolated reconstructed HHR slice, or the estimate sent from switch 2811 to be used as a spatial prediction for the current CCIR-601 signal (depending upon the s_t_comp signal decoded by V/FWL decoder 2803). If an inter-coded picture is being decoded, switch 2807 passes the prediction data to summing element 2823 where it is added to the signal output by block unformatter 2815. However, if the current picture being decoded is intra coded (inter/intra set to "0", and switch 2807 opened), a signal of zero is added to the reconstituted macroblock passing through summing element 2823. Since this decoder can decode all three layers, the output may consist of SIF odd, SIF even, or CCIR-601 macroblocks.

The above-described invention provides a practical method for encoding and decoding video signals in a manner which allows the transmission, reception, storage, or retrieval of a video signal providing multiple layers of resolution. It will be understood that the particular methods described are only illustrative of the principles of the present invention, and that various modifications could be made by those skilled in the art without departing from the scope and spirit of the present invention, which is limited only by the claims that follow. Such modifications would include encoding and decoding schemes involving more than three resolution layers, or schemes that apply the principles of the invention to code progressive (i.e., non-interlaced) video (such as that being proposed as an HDTV standard).

We claim:

1. Apparatus for encoding digital video signals, comprising:
   means for receiving a digital video input signal including a succession of digital representations related to picture elements of a first video image;
   means for coding a reduced resolution digital signal related to the picture elements of said first video image, employing in said coding, if said first video image is not the initial image for which an input signal was received, a prediction of said first video image based upon a previously coded video image from a previously received input signal;
   means for producing a temporal prediction of said first video image from said reduced resolution digital signal;
   means for producing a spatial prediction of said first video image based upon said temporal prediction produced from said reduced resolution digital signal; and
   means for coding a second digital signal related to the picture elements of said first video image, adapted to determine if an estimate based upon said temporal prediction of said first video image, or an estimate based upon said spatial prediction of said first video image will be employed in the encoding of said second digital signal.

2. The apparatus of claim 1 wherein said reduced resolution digital signal is of a format which is compatible with Motion Picture Experts Group Phase 1 standards.

3. The apparatus of claim 1 wherein said means for coding said second digital signal determines on a block basis if an estimate based upon said temporal prediction of said first video image, or an estimate based upon said spatial prediction of said first video image will be employed in the encoding of said second digital signal.

4. Method for encoding digital video signals, comprising the steps of:

receiving a digital video input signal including a succession of digital representations related to picture elements of a first video image;

coding a reduced resolution digital signal related to the picture elements of said first video image, employing in said coding, if said first video image is not the initial image for which an input signal was received, a prediction of said first video image based upon a previously coded video image from a previously received input signal;

producing a temporal prediction of said first video image from said reduced resolution digital signal;

producing a spatial prediction of said first video image based upon said temporal prediction produced from said reduced resolution digital signal; and coding a second digital signal related to the picture elements of said first video image, adapted to determine if an estimate based upon said temporal prediction of said first video image, or an estimate based upon said spatial prediction of said first video image will be employed in the encoding of said second digital signal.

5. The method of claim 4 wherein said reduced resolution digital signal is coded in format compatible with Motion Picture Experts Group Phase 1 standards.

6. The method of claim 4 wherein a determination as to employing an estimate based upon said temporal prediction of said first video image, or an estimate based upon said spatial prediction of said first video image is made on a block basis during the coding of said second digital signal.

7. Apparatus for encoding digital video signals, comprising:

means for receiving a digital video input signal including a succession of digital representations related to picture elements of at least two frames of a video image, each of said frames comprising a plurality of interlaced fields;

means for coding a reduced resolution digital signal related to the picture elements of a first field of a received frame, employing in said coding, if said received frame is not the initial frame received, a prediction of said first field based upon a previously coded field from a previously received frame;

means for producing a temporal prediction of said first field from said reduced resolution digital signal;

means for producing a spatial prediction of said first video field based upon said temporal prediction produced from said reduced resolution digital signal; and means for coding a second digital signal related to the picture elements of said first video field, adapted to determine if an estimate based upon said temporal prediction of said first video field, or an estimate based upon said spatial prediction of said first video field will be employed in the encoding of said second digital signal.

8. The apparatus of claim 7 wherein said reduced resolution digital signal is of a format which is compatible with Motion Picture Experts Group Phase 1 standards.

9. The apparatus of claim 7 wherein said means for coding said second digital signal determines on a block basis if an estimate based upon said temporal prediction of said first video field, or an estimate based upon said spatial prediction of said first video field will be employed in the encoding of said second digital signal.

10. Method for encoding digital video signals, comprising the steps of:

receiving a digital video input signal including a succession of digital representations related to picture elements of at least two frames of a video image, each of said frames comprising a plurality of interlaced fields;

coding a reduced resolution digital signal related to the picture elements of a first field of a received frame, employing in said coding, if said received frame is not the first initial received, a prediction of said first field based upon a previously coded field from a previously received frame;

producing a temporal prediction of said first field from said reduced resolution digital signal;

producing a spatial prediction of said first video field based upon said temporal prediction produced from said reduced resolution digital signal; and coding a second digital signal related to the picture elements of said first video field, adapted to determine if an estimate based upon said temporal prediction of said first video field, or an estimate based upon said spatial prediction of said first video field will be employed in the encoding of said second digital signal.

11. The method of claim 10 wherein said reduced resolution digital signal is coded in format compatible with Motion Picture Experts Group Phase 1 standards.

12. The method of claim 10 wherein a determination as to employing an estimate based upon said temporal prediction of said first video field, or an estimate based upon said spatial prediction of said first video field is made on a block basis during the coding of said second digital signal.

13. Apparatus for encoding digital video signals, comprising:

means for receiving a digital video input signal including a succession of digital representations related to picture elements of at least two frames of a video image, each of said frames comprising a plurality of interlaced odd and even fields;

means for coding a reduced resolution digital signal related to the picture elements of an odd field of a received frame, employing, if said received frame is not the initial frame received, a prediction of said odd field of said received frame based upon a previously coded odd field from a previously received frame;

means for producing a temporal prediction of said odd field of said received frame from said reduced resolution digital signal;

means for producing a spatial prediction of said odd field of said received frame based upon said temporal prediction produced from said reduced resolution digital signal; and means for coding a second digital signal related to the picture elements of said odd field of said received frame, adapted to determine if an estimate based upon said temporal prediction of said odd field of said received frame, or an estimate based upon said spatial prediction of said odd field of said received frame will be employed in the encoding of said second digital signal.

14. The apparatus of claim 13 wherein said reduced resolution digital signal is of a format which is compatible with Motion Picture Experts Group Phase 1 standards.

15. The apparatus of claim 13 wherein said means for coding said second digital signal determines on a block basis if an estimate based upon said temporal prediction of said odd field of said received frame, or an estimate based upon said spatial prediction of said odd field of said received frame will be employed in the encoding of said second digital signal.

16. Method for encoding digital video signals, comprising the steps of:
receiving a digital video input signal including a succession of digital representations related to picture elements of at least two frames of a video image, each of said frames comprising a plurality of interlaced odd and even fields;
coding a reduced resolution digital signal related to the picture elements of an odd field of a received frame, employing, if said received frame is not the initial frame received, a prediction of said odd field of said received frame based upon a previously coded odd field from a previously received frame;
producing a temporal prediction of said odd field of said received frame from said reduced resolution digital signal;
producing a spatial prediction of said odd field of said received frame based upon said temporal prediction produced from said reduced resolution digital signal; and
coding a second digital signal related to the picture elements of said odd field of said received frame, adapted to determine if an estimate based upon said temporal prediction of said odd field of said received frame, or an estimate based upon said spatial prediction of said odd field of said received frame will be employed in the encoding of said second digital signal.

17. The method of claim 16 wherein said reduced resolution digital signal is of a format which is compatible with Motion Picture Experts Group Phase 1 standards.

18. The method of claim 16 wherein a determination as to employing an estimate based upon said temporal prediction of said odd field of said received frame, or an estimate based upon said spatial prediction of said odd field of said received frame is made on a block basis during the coding of said second digital signal.

19. Apparatus for encoding digital video signals, comprising:
means for receiving a digital video input signal including a succession of digital representations related to picture elements of at least two frames of a video image, each of said frames comprising a plurality of interlaced odd and even fields;
means for coding a reduced resolution digital signal related to the picture elements of an even field of a received frame, employing, if said received frame is not the initial frame received, a prediction of said even field of said received frame based upon a previously coded even field from a previously received frame;
means for producing a temporal prediction of said even field of said received frame from said reduced resolution digital signal;
means for producing a spatial prediction of said even field of said received frame based upon said temporal prediction produced from said reduced resolution digital signal; and
means for coding a second digital signal related to the picture elements of said even field of said received frame, adapted to determine if an estimate based upon said temporal prediction of said even field of said received frame, or an estimate based upon said spatial prediction of said even field of said received frame will be employed in the encoding of said second digital signal.

20. The apparatus of claim 19 wherein said reduced resolution digital signal is of a format which is compatible with Motion Picture Experts Group Phase 1 standards.

21. The apparatus of claim 19 wherein said means for coding said second digital signal determines on a block basis if an estimate based upon said temporal prediction of said even field of said received frame, or an estimate based upon said spatial prediction of said even field of said received frame will be employed in the encoding of said second digital signal.

22. Method for encoding digital video signals, comprising the steps of:
receiving a digital video input signal including a succession of digital representations related to picture elements of at least two frames of a video image, each of said frames comprising a plurality of interlaced odd and even fields;
coding a reduced resolution digital signal related to the picture elements of an even field of a received frame, employing, if said received frame is not the initial frame received, a prediction of said even field of said received frame based upon a previously coded even field from a previously received frame;
producing a temporal prediction of said even field of said received frame from said reduced resolution digital signal;
producing a spatial prediction of said even field of said received frame based upon said temporal prediction produced from said reduced resolution digital signal; and
coding a second digital signal related to the picture elements of said even field of said received frame, adapted to determine if an estimate based upon said temporal prediction of said even field of said received frame, or an estimate based upon said spatial prediction of said even field of said received frame will be employed in the encoding of said second digital signal.

23. The method of claim 22 wherein said reduced resolution digital signal is of a format which is compatible with Motion Picture Experts Group Phase 1 standards.

24. The method of claim 22 wherein a determination as to employing an estimate based upon said temporal prediction of said even field of said received frame, or an estimate based upon said spatial prediction of said even field of said received frame is made on a block basis during the coding of said second digital signal.

25. Apparatus for encoding digital video signals, comprising:
means for receiving a digital video input signal including a succession of digital representations related to picture elements of at least two frames of a video image;

means for processing said received digital video input signal so as to obtain a signal representing a reduced resolution image of the received frame;

means for coding a reduced resolution digital signal related to the picture elements of said received frame, employing in said coding, if said received frame is not the initial frame received, a prediction of said received frame based upon a previously coded reduced resolution image of a previously received frame;

means for producing a temporal prediction of said received frame from said reduced resolution digital signal;

means for producing a spatial prediction of said received frame based upon said temporal prediction produced from said reduced resolution digital signal; and means for coding a second digital signal related to the picture elements of said received frame, adaptively employing an estimate based upon said temporal and said spatial predictions of said received frame.

26. The apparatus of claim 25 wherein said reduced resolution digital signal is of a format which is compatible with Motion Picture Experts Group Phase 1 standards.

27. The apparatus of claim 25 wherein said means for coding said second digital signal determines on a block basis if an estimate based upon said temporal prediction of said received frame, or an estimate based upon said spatial prediction of said received frame will be employed in the encoding of said second digital signal.

28. Method for encoding digital video signals, comprising the steps of:

receiving a digital video input signal including a succession of digital representations related to picture elements of at least two frames of a video image;

processing said received digital video input signal so as to obtain a signal representing a reduced resolution image of the received frame;

coding a reduced resolution digital signal related to the picture elements of said received frame, employing in said coding, if said received frame is not the initial frame received, a prediction of said received frame based upon a previously coded reduced resolution image of a previously received frame;

producing a temporal prediction of said received frame from said reduced resolution digital signal;

producing a spatial prediction of said received frame based upon said temporal prediction produced from said reduced resolution digital signal; and coding a second digital signal related to the picture elements of said received frame, adaptively employing an estimate based upon said temporal and said spatial predictions of said received frame.

29. The method of claim 28 wherein said reduced resolution digital signal is of a format which is compatible with Motion Picture Experts Group Phase 1 standards.

30. The method of claim 28 wherein a determination as to employing an estimate based upon said temporal prediction of said received frame, or an estimate based upon said spatial prediction of said received frame is made on a block basis during the coding of said second digital signal.

31. Apparatus for encoding digital video signals, comprising:

means for receiving a digital video input signal including a succession of digital representations related to picture elements of at least two frames of a video image, each of said frames comprising a plurality of interlaced odd and even fields;

means for coding a first reduced resolution digital signal related to the picture elements of an odd field of a received frame, employing, if said received frame is not the initial frame received, a prediction of said odd field of said received frame based upon a previously coded odd field from a previously received frame;

means for producing a temporal prediction of said odd field of said received frame from said first reduced resolution digital signal;

means for coding a second reduced resolution digital signal related to the picture elements of an even field of said received frame, employing, if said received frame is not the initial frame received, a prediction of said even field of said received frame based upon a previously coded even field from a previously received frame;

means for producing a temporal prediction of said even field of said received frame from said second reduced resolution digital signal;

means for producing a spatial prediction of said received frame based upon said temporal predictions produced from said first and second reduced resolution digital signals;

means for producing a temporal prediction of said received frame; and means for coding a third digital signal related to the picture elements of said received frame, adaptively employing an estimate based upon said temporal and said spatial predictions of said received frame.

32. The apparatus of claim 31 wherein said reduced resolution digital signal is of a format which is compatible with Motion Picture Experts Group Phase 1 standards.

33. The apparatus of claim 31 wherein said means for coding said third digital signal determines on a block basis if an estimate based upon said temporal prediction of said received frame, or an estimate based upon said spatial prediction of said received frame will be employed in the encoding of said third digital signal.

34. Method for encoding digital video signals, comprising:

receiving a digital video input signal including a succession of digital representations related to picture elements of at least two frames of a video image, each of said frames comprising a plurality of interlaced odd and even fields;

coding a first reduced resolution digital signal related to the picture elements of an odd field of a received frame, employing, if said received frame is not the initial frame received, a prediction of said odd field of said received frame based upon a previously coded odd field from a previously received frame;

producing a temporal prediction of said odd field of said received frame from said first reduced resolution digital signal;

coding a second reduced resolution digital signal related to the picture elements of an even field of said received frame, employing, if said received frame is not the initial frame received, a prediction of said even field of said received frame based upon a previously coded even field from a previously received frame;

producing a temporal prediction of said even field of said received frame from said second reduced resolution digital signal;

producing a spatial prediction of said received frame based upon said temporal predictions produced from said first and second reduced resolution digital signals;

producing a temporal prediction of said received frame; and coding a third digital signal related to the picture elements of said received frame, adaptively employing an estimate based upon said temporal and said spatial predictions of said received frame.

35. The method of claim 34 wherein said reduced resolution digital signal is of a format which is compatible with Motion Picture Experts Group Phase 1 standards.

36. The method of claim 34 wherein a determination as to employing an estimate based upon said temporal prediction of said received frame, or an estimate based upon said spatial prediction of said received frame is made on a block basis during the coding of said third digital signal.

37. Apparatus for decoding digital video signals, comprising:

means for receiving a first and second digital signals, said first digital signal representing a reduced resolution depiction of a first video image, and said second digital signal representing a full resolution depiction of said first video image;

means for decoding from said first digital signal said reduced resolution depiction of said first video image, employing in said decoding, if said first video image is not the initial image for which an input signal was received, a prediction of said first video image based upon a previously decoded video image from a previously received input signal;

means for producing a temporal prediction of said first video image from said decoded reduced resolution signal;

means for producing a spatial prediction of said received first video image based upon said reduced resolution video field; and means for decoding from said second digital signal a full resolution depiction of said first video image, adapted to determine if an estimate based upon said temporal prediction of said first video image, or an estimate based upon said spatial prediction of said first video image will be employed in the decoding of said second digital signal.

38. The apparatus of claim 37 wherein said reduced resolution digital signal is of a format which is compatible with Motion Picture Experts Group Phase 1 standards.

39. The apparatus of claim 37 wherein said means for decoding said second digital signal determines on a block basis if an estimate based upon said temporal prediction of said first video image, or an estimate based upon said spatial prediction of said first video image will be employed in the decoding of said second digital signal.

40. Method for decoding digital video signals, comprising the steps of:

receiving a first and second digital signals, said first digital signal representing a reduced resolution depiction of a first video image, and second digital signal representing a full resolution depiction of said first video image;

decoding from said first digital signal said reduced resolution depiction of said first video image, employing in said decoding, if said first video image is not the initial image for which an input signal was received, a prediction of said first video image based upon a previously decoded video image from a previously received input signal;

producing a temporal prediction of said first video image from said decoded reduced resolution signal;

producing a spatial prediction of said received first video image based upon said reduced resolution video field; and decoding from said second digital signal a full resolution depiction of said first video image, adapted to determine if an estimate based upon said temporal prediction of said first video image, or an estimate based upon said spatial prediction of said first video image will be employed in the decoding of said second digital signal.

41. The method of claim 40 wherein said reduced resolution digital signal is of a format which is compatible with Motion Picture Experts Group Phase 1 standards.

42. The method of claim 40 wherein a determination as to employing an estimate based upon said temporal prediction of said first video image, or an estimate based upon said spatial prediction of said first video image is made on a block basis during the decoding of said second digital signal.

43. Apparatus for decoding digital video signals, comprising:

means for receiving a first and second digital signals, said first digital signal representing a reduced resolution field of a first frame of video, and said second digital signal representing a full resolution field of said first frame of video;

means for decoding from said first digital signal said reduced resolution field, employing in said decoding, if said decoded reduced resolution field is not the initial field to be decoded by said apparatus, a prediction of said reduced resolution field based upon a previously decoded reduced resolution field from a previous frame;

means for producing a temporal prediction of said field of said first frame of video from said decoded reduced resolution field;

means for producing a spatial prediction of said video field of said first frame of video based upon said reduced resolution video field; and means for decoding from said second digital signal said full resolution video field, adapted to determine if an estimate based upon said temporal prediction of said field of said first frame of video, or an estimate based upon said spatial prediction of said field of said first frame of video will be employed in the decoding of said second digital signal.

44. The apparatus of claim 43 wherein said reduced resolution digital signal is of a format which is compatible with Motion Picture Experts Group Phase 1 standards.

45. The apparatus of claim 43 wherein said means for decoding said second digital signal determines on a block basis if an estimate based upon said temporal prediction of said field of said first frame of video, or an estimate based upon said spatial prediction of said field of said first frame of video will be employed in the decoding of said second digital signal.

46. Method for decoding digital video signals, comprising the steps of:
   receiving a first and second digital signals, said first digital signal representing a reduced resolution field of a first frame of video, and said second digital signal representing a full resolution field of said first frame of video;
   decoding from said first digital signal said reduced resolution field, employing in said decoding, if said decoded reduced resolution field is not the initial field to be decoded by said apparatus, a prediction of said reduced resolution field based upon a previously decoded reduced resolution field from a previous frame;
   producing a temporal prediction of said field of said first frame of video from said decoded reduced resolution field;
   producing a spatial prediction of said received first field of said first frame of video based upon said reduced resolution video field; and
   decoding from said second digital signal said full resolution video field, adapted to determine if an estimate based upon said temporal prediction of said field of said first frame of video, or an estimate based upon said spatial prediction of said field of said first frame of video will be employed in the decoding of said second digital signal.

47. The method of claim 46 wherein said reduced resolution digital signal is of a format which is compatible with Motion Picture Experts Group Phase 1 standards.

48. The method of claim 46 wherein a determination as to employing an estimate based upon said temporal prediction of said field of said first frame of video, or an estimate based upon said spatial prediction of said field of said first frame of video is made on a block basis during the decoding of said second digital signal.

49. Apparatus for decoding digital video signals, comprising:
   means for receiving a first and second digital signals, said first digital signal representing a reduced resolution odd field of a first frame of video, and said second digital signal representing a full resolution odd field of said first frame of video;
   means for decoding from said first digital signal said reduced resolution odd field, employing in said decoding, if said decoded reduced resolution odd field is not the initial odd field to be decoded by said apparatus, a prediction of said reduced resolution odd field based upon a previously decoded reduced resolution odd field from a previous frame;
   means for producing a temporal prediction of said odd field of said first frame from said decoded reduced resolution field;
   means for producing a spatial prediction of said odd field of said first frame based upon said reduced resolution odd field; and
   means for decoding from said second digital signal said full resolution odd field, adapted to determine if an estimate based upon said temporal prediction of said odd field of said first frame, or an estimate base upon said spatial prediction of said odd field of said first frame will be employed in the decoding of said second digital signal.

50. The apparatus of claim 49 wherein said reduced resolution digital signal is of a format which is compatible with Motion Picture Experts Group Phase 1 standards.

51. The apparatus of claim 49 wherein said means for decoding said second digital signal determines on a block basis if an estimate based upon said temporal prediction of said odd field of said first frame, or an estimate based upon said spatial prediction of said odd field of said first frame will be employed in the decoding of said second digital signal.

52. Method for decoding digital video signals, comprising the steps of:
   receiving a first and second digital signals, said first digital signal representing a reduced resolution odd field of a first frame of video, and said second digital signal representing a full resolution odd field of said first frame of video;
   decoding from said first digital signal said reduced resolution odd field, employing in said decoding, if said decoded reduced resolution odd field is not the initial odd field to be decoded by said apparatus, a prediction of said reduced resolution odd field based upon a previously decoded reduced resolution odd field from a previous frame;
   producing a temporal prediction of said odd field of said first frame from said decoded reduced resolution field;
   producing a spatial prediction of said odd field of said first frame based upon said reduced resolution odd field; and
   decoding from said second digital signal said full resolution odd field, adapted to determine if an estimate based upon said temporal prediction of said odd field of said first frame, or an estimate based upon said spatial prediction of said odd field of said first frame will be employed in the decoding of said second digital signal.

53. The method of claim 52 wherein said reduced resolution digital signal is of a format which is compatible with Motion Picture Experts Group Phase 1 standards.

54. The method of claim 52 wherein a determination as to employing an estimate based upon said temporal prediction of said odd field of said first frame, or an estimate based upon said spatial prediction of said odd field of said first frame is made on a block basis during the decoding of said second digital signal.

55. Apparatus for decoding digital video signals, comprising:
   means for receiving a first and second digital signals, said first digital signal representing a reduced resolution even field of a first frame of video, and said second digital signal representing a full resolution even field of said first frame of video;
   means for decoding from said first digital signal said reduced resolution even field, employing in said decoding, if said decoded reduced resolution even field is not the initial even field to be decoded by said apparatus, a prediction of said reduced resolution even field based upon a previously decoded reduced resolution even field from a previous frame;
   means for producing a temporal prediction of said even field of said first frame from said decoded reduced resolution field;
   means for producing a spatial prediction of said even field of said first frame based upon said reduced resolution even field; and means for decoding from said second digital signal said full resolution even field, adapted to determine if an estimate based upon said temporal prediction of said even field of said first frame, or an estimate based upon said spatial prediction of said even field of said first frame will be employed in the decoding of said second digital signal.

56. The apparatus of claim 55 wherein said reduced resolution digital signal is of a format which is compatible with Motion Picture Experts Group Phase 1 standards.

57. The apparatus of claim 55 wherein said means for decoding said second digital signal determines on a block basis if an estimate based upon said temporal prediction of said even field of said first frame, or an estimate based upon said spatial prediction of said even field of said first frame will be employed in the decoding of said second digital signal.

58. Method for decoding digital video signals, comprising the steps of:
receiving a first and second digital signals, said first digital signal representing a reduced resolution even field of a first frame of video, and said second digital signal representing a full resolution even field of said first frame of video;
decoding from said first digital signal said reduced resolution even field, employing in said decoding, if said decoded reduced resolution even field is not the initial even field to be decoded by said apparatus, a prediction of said reduced resolution even field based upon a previously decoded reduced resolution even field from a previous frame;
producing a temporal prediction of said even field of said first frame from said decoded reduced resolution field;
producing a spatial prediction of said even field of said first frame based upon said reduced resolution even field; and
decoding from said second digital signal said full resolution even field, adapted to determine if an estimate based upon said temporal prediction of said even field of said first frame, or an estimate based upon said spatial prediction of said even field of said first frame will be employed in the decoding of said second digital signal.

59. The method of claim 58 wherein said reduced resolution digital signal is of a format which is compatible with Motion Picture Experts Group Phase 1 standards.

60. The method of claim 58 wherein a determination as to employing an estimate based upon said temporal prediction of said even field of said first frame, or an estimate based upon said spatial prediction of said even field of said first frame is made on a block basis during the decoding of said second digital signal.

61. Apparatus for decoding digital video signals, comprising:
means for receiving a first and second digital signals, said first digital signal representing a reduced resolution frame of a first frame of video, and said second digital signal representing a full resolution frame of said first frame of video;
means for decoding from said first digital signal said reduced resolution frame, employing in said decoding, if said decoded reduced resolution frame is not the initial frame to be decoded by said apparatus, a prediction of said reduced resolution frame based upon a previously decoded reduced resolution even frame from a previous frame;
means for producing a temporal prediction of said first frame from said decoded reduced resolution field;
means for producing a spatial prediction of said first frame based upon said decoded reduced resolution frame; and
means for decoding from said second digital signal said full resolution frame of said first frame, adapted to determine if an estimate based upon said temporal prediction of said first frame, or an estimate based upon said spatial prediction of said first frame will be employed in the decoding of said second digital signal.

62. The apparatus of claim 61 wherein said reduced resolution digital signal is of a format which is compatible with Motion Picture Experts Group Phase 1 standards.

63. The apparatus of claim 61 wherein said means for decoding said second digital signal determines on a block basis if an estimate based upon said temporal prediction of said first frame, or an estimate based upon said spatial prediction of said first frame will be employed in the decoding of said second digital signal.

64. Method for decoding digital video signals, comprising the steps of:
receiving a first and second digital signals, said first digital signal representing a reduced resolution frame of a first frame of video, and said second digital signal representing a full resolution frame of said first frame of video;
decoding from said first digital signal said reduced resolution frame, employing in said decoding, if said decoded reduced resolution frame is not the initial frame to be decoded by said apparatus, a prediction of said reduced resolution frame based upon a previously decoded reduced resolution even frame from a previous frame;
producing a temporal prediction of said first frame from said decoded reduced resolution field;
producing a spatial prediction of said first frame based upon said decoded reduced resolution frame; and
decoding from said second digital signal said full resolution frame of said first frame, adapted to determine if an estimate based upon said temporal prediction of said first frame, or an estimate based upon said spatial prediction of said first frame will be employed in the decoding of said second digital signal.

65. The method of claim 64 wherein said reduced resolution digital signal is of a format which is compatible with Motion Picture Experts Group Phase 1 standards.

66. The method of claim 64 wherein a determination as to employing an estimate based upon said temporal prediction of said first frame, or an estimate based upon said spatial prediction of said first frame is made on a block basis during the decoding of said second digital signal.

67. Apparatus for decoding digital video signals, comprising:
means for receiving a first, second, and third digital signals, said first digital signal representing a reduced resolution frame of an odd field of a first frame of video, said second digital signal representing a reduced resolution frame of an even field of said first frame of video, and said third digital signal representing a full resolution frame of said first frame of video;

means for decoding from said first digital signal said reduced resolution odd field, employing in said decoding, if said first frame is not the initial frame being decoded by said apparatus, a prediction of said reduced resolution odd field based upon a previously decoded reduced resolution odd field from a previous frame;

means for producing a temporal prediction of said odd field of said first frame from said decoded reduced resolution odd field;

means for decoding from said second digital signal said reduced resolution even field, employing in said decoding, if said first frame is not the initial frame being decoded by said apparatus, a prediction of said reduced resolution even field based upon a previously decoded reduced resolution even field from a previous frame;

means for producing a temporal prediction of said even field of said first frame from said decoded reduced resolution even field;

means for producing a spatial prediction of said first frame based upon said temporal predictions produced from said first and second reduced resolution digital signals; and means for decoding from said third digital signal said full resolution frame of said first frame, adapted to determine if an estimate based upon said temporal prediction of said first frame, or an estimate based upon said spatial prediction of said first frame will be employed in the decoding of said second digital signal.

68. The apparatus of claim 67 wherein said reduced resolution digital signal is of a format which is compatible with Motion Picture Experts Group Phase 1 standards.

69. The apparatus of claim 67 wherein said means for decoding said third digital signal determines on a block basis if an estimate based upon said temporal prediction of said first frame, or an estimate based upon said spatial prediction of said first frame will be employed in the decoding of said third digital signal.

70. Method for decoding digital video signals, comprising:

receiving a first, second, and third digital signals, said first digital signal representing a reduced resolution frame of an odd field of a first frame of video, said second digital signal representing a reduced resolution frame of an even field of said first frame of video, and said third digital signal representing a full resolution frame of said first frame of video;

decoding from said first digital signal said reduced resolution odd field, employing in said decoding, if said first frame is not the initial frame being decoded by said apparatus, a prediction of said reduced resolution odd field based upon a previously decoded reduced resolution odd field from a previous frame;

producing a temporal prediction of said odd field of said first frame from said decoded reduced resolution odd field;

decoding from said second digital signal said reduced resolution even field, employing in said decoding, if said first frame is not the initial frame being decoded by said apparatus, a prediction of said reduced resolution even field based upon a previously decoded reduced resolution even field from a previous frame;

producing a temporal prediction of said even field of said first frame from said decoded reduced resolution even field;

producing a spatial prediction of said first frame based upon said temporal predictions produced from said first and second reduced resolution digital signals; and decoding from said third digital signal said full resolution frame of said first frame, adapted to determine if an estimate based upon said temporal prediction of said first frame, or an estimate based upon said spatial prediction of said first frame will be employed in the decoding of said second digital signal.

71. The method of claim 70 wherein said reduced resolution digital signal is of a format which is compatible with Motion Picture Experts Group Phase 1 standards.

72. The method of claim 70 wherein a determination as to employing an estimate based upon said temporal prediction of said first frame, or an estimate based upon said spatial prediction of said first frame is made on a block basis during the decoding of said third digital signal.

* * * * *